US012463438B2

(12) United States Patent
Yoon et al.

(10) Patent No.: US 12,463,438 B2
(45) Date of Patent: Nov. 4, 2025

(54) WEARABLE ELECTRONIC DEVICE INCLUDING MULTIPLE BATTERIES AND METHOD FOR OPERATING THE SAME

(71) Applicant: Samsung Electronics Co., Ltd., Gyeonggi-do (KR)

(72) Inventors: Jongmin Yoon, Gyeonggi-do (KR); Youngho Yoon, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 992 days.

(21) Appl. No.: 17/553,980

(22) Filed: Dec. 17, 2021

(65) Prior Publication Data

US 2022/0200318 A1    Jun. 23, 2022

Related U.S. Application Data

(63) Continuation of application No. PCT/KR2021/018736, filed on Dec. 10, 2021.

(30) Foreign Application Priority Data

Dec. 23, 2020  (KR) .................. 10-2020-0182507

(51) Int. Cl.
*H02J 7/34* (2006.01)
*G02B 27/01* (2006.01)
(Continued)

(52) U.S. Cl.
CPC ............ *H02J 7/0042* (2013.01); *G06F 1/188* (2013.01); *H01M 10/441* (2013.01);
(Continued)

(58) Field of Classification Search
CPC ...... H02J 7/0042; H02J 7/0013; H02J 7/0018; G06F 1/188; H01M 10/441
(Continued)

(56) References Cited

U.S. PATENT DOCUMENTS 5,814,972 A  *  9/1998  Shimada ............... H02J 1/10
                                              320/135
7,157,880 B2 *  1/2007  Kubota ............ G01R 31/3648
                                              320/DIG. 21
(Continued)

FOREIGN PATENT DOCUMENTS

JP            6773999       10/2020
KR         10-1474392       12/2014
(Continued)

OTHER PUBLICATIONS

International Search Report dated Mar. 21, 2022 issued in counterpart application No. PCT/KR2021/018736, 12 pages.

*Primary Examiner* — John T Trischler
(74) *Attorney, Agent, or Firm* — The Farrell Law Firm, P.C.

(57) ABSTRACT

An electronic device is provided, which includes a first structure provided on a first side, a connector disposed in the first structure and configured to receive external power, a first charging/discharging circuit disposed in the first structure and electrically connected to the connector, a first battery, and at least one first device electrically connected to the first charging/discharging circuit, a power line, a second structure provided on a second side, a second charging/discharging circuit disposed in the second structure and electrically connected with the connector through the power line, a second battery, and at least one second device electrically connected to the second charging/discharging circuit, and a processor configured to control the first charging/discharging circuit and the second charging/discharging circuit.

7 Claims, 27 Drawing Sheets

(51) Int. Cl.
  *G06F 1/16* (2006.01)
  *G06F 1/18* (2006.01)
  *G06F 1/26* (2006.01)
  *H01M 10/44* (2006.01)
  *H02J 7/00* (2006.01)

(52) U.S. Cl.
  CPC .......... *H02J 7/0013* (2013.01); *H02J 7/0018* (2013.01); *H02J 7/342* (2020.01); *G02B 27/017* (2013.01); *G02B 27/0176* (2013.01); *G02B 2027/0178* (2013.01); *G06F 1/163* (2013.01); *G06F 1/263* (2013.01); *H01M 2220/30* (2013.01); *H02J 7/0048* (2020.01); *H02J 7/0063* (2013.01); *H02J 7/007182* (2020.01); *H02J 2310/22* (2020.01)

(58) Field of Classification Search
  USPC .................................................. 320/107, 103
  See application file for complete search history.

(56) References Cited

U.S. PATENT DOCUMENTS

| | | | | |
|---|---|---|---|---|
| 8,203,309 | B2* | 6/2012 | Maegawa | H02J 7/342 320/128 |
| 8,390,254 | B2* | 3/2013 | Lin | H02J 7/0018 320/112 |
| 8,442,727 | B2* | 5/2013 | Yamamoto | B60K 6/445 320/109 |
| 8,863,540 | B2* | 10/2014 | Alston | F25B 27/00 62/236 |
| 9,240,700 | B2* | 1/2016 | Terlizzi | H02J 7/00 |
| 9,331,498 | B2* | 5/2016 | Albsmeier | H02J 7/1423 |
| 9,524,018 | B2* | 12/2016 | Sultenfuss | G06F 1/28 |
| 9,678,349 | B2* | 6/2017 | Yang | G02B 27/0093 |
| 9,851,803 | B2* | 12/2017 | Fisher | G06F 3/005 |
| 9,906,062 | B2* | 2/2018 | Terlizzi | H02J 7/00 |
| 9,960,458 | B2* | 5/2018 | Weicker | H02J 7/34 |
| 10,095,052 | B2* | 10/2018 | Bhatta | G02C 7/101 |
| 10,097,021 | B2* | 10/2018 | Horie | H02J 7/0042 |
| 10,199,872 | B2* | 2/2019 | Jung | H02J 7/00714 |
| 10,268,276 | B2* | 4/2019 | Fisher | G06F 3/017 |
| 10,288,888 | B2* | 5/2019 | Sugihara | G02C 11/10 |
| 10,291,039 | B2* | 5/2019 | Cha | H02J 7/0048 |
| 10,483,698 | B2* | 11/2019 | Lee | H01R 24/64 |
| 10,551,894 | B2* | 2/2020 | Li | G06F 1/3212 |
| 10,559,964 | B2* | 2/2020 | Kim | H04W 52/0209 |
| 10,678,314 | B2* | 6/2020 | Ho | H01M 50/569 |
| 10,700,534 | B2* | 6/2020 | Binder | G02B 27/017 |
| 10,714,972 | B2* | 7/2020 | Mio | B60L 58/20 |
| 10,742,042 | B2* | 8/2020 | Files | H01M 10/46 |
| 10,778,013 | B2* | 9/2020 | Kristjansson | H02J 7/0071 |
| 10,826,163 | B2* | 11/2020 | Moore | H01Q 9/42 |
| 10,862,316 | B2* | 12/2020 | Baby | G06F 1/26 |
| 10,886,672 | B2* | 1/2021 | Lee | H04B 1/18 |
| 10,908,428 | B2* | 2/2021 | Trail | G09G 5/006 |
| 10,910,870 | B2* | 2/2021 | Horie | H02J 7/0042 |
| 11,038,364 | B2* | 6/2021 | Kristjansson | H02J 7/34 |
| 11,055,056 | B1* | 7/2021 | Trail | G02B 27/017 |
| 11,101,680 | B2* | 8/2021 | Kristjansson | H02J 7/0014 |
| 11,133,535 | B2* | 9/2021 | Kim | H02J 7/0013 |
| 11,133,693 | B2* | 9/2021 | Obie | H02J 7/345 |
| 11,146,094 | B2* | 10/2021 | Ohashi | H02J 7/0068 |
| 11,165,265 | B2* | 11/2021 | Kristjansson | H02J 7/0013 |
| 11,201,477 | B2* | 12/2021 | Ohashi | H02J 7/0014 |
| 11,211,693 | B2* | 12/2021 | Moore | G02C 5/14 |
| 11,239,668 | B2* | 2/2022 | Nobre | H01M 50/262 |
| 11,258,280 | B2* | 2/2022 | Li | H01R 13/2421 |
| 11,258,303 | B2* | 2/2022 | Jung | H04B 5/79 |
| 11,283,270 | B2* | 3/2022 | Kim | G06F 1/263 |
| 11,283,301 | B2* | 3/2022 | Yahagi | G02B 27/017 |
| 11,296,518 | B2* | 4/2022 | Park | H01M 10/46 |
| 11,336,091 | B2* | 5/2022 | Sun | H02J 1/102 |
| 11,342,760 | B2* | 5/2022 | Ohashi | H02J 7/00032 |
| 11,349,330 | B2* | 5/2022 | Lee | H02J 50/402 |
| 11,351,940 | B2* | 6/2022 | Takahara | H02J 9/06 |
| 11,394,215 | B1* | 7/2022 | Bhagwan | H02J 7/0063 |
| 11,431,038 | B2* | 8/2022 | Jhawar | G06F 1/1632 |
| 11,444,466 | B2* | 9/2022 | Hira | H02J 3/381 |
| 11,495,978 | B2* | 11/2022 | Baby | G06F 1/1635 |
| 11,495,982 | B2* | 11/2022 | Trela | H02J 7/0013 |
| 11,515,712 | B2* | 11/2022 | Lee | H02J 7/0063 |
| 11,531,215 | B1* | 12/2022 | Moubedi | H01M 10/46 |
| 11,557,909 | B2* | 1/2023 | Juang | H02J 7/342 |
| 11,614,630 | B2* | 3/2023 | Yahagi | H01M 10/46 307/142 |
| 11,626,748 | B2* | 4/2023 | Jung | H02J 7/0063 307/104 |
| 11,646,599 | B2* | 5/2023 | Ino | H02J 7/342 320/128 |
| 11,695,287 | B2* | 7/2023 | Bristol | A45C 11/04 320/107 |
| 11,715,960 | B2* | 8/2023 | Gao | H02J 7/007188 320/107 |
| 11,733,747 | B2* | 8/2023 | Yeh | H02J 50/40 320/114 |
| 11,733,952 | B2* | 8/2023 | Yoon | A45C 11/04 345/156 |
| 11,742,690 | B2* | 8/2023 | Kristjansson | H02J 7/0068 320/103 |
| 11,750,009 | B2* | 9/2023 | Obie | G02B 27/0176 307/20 |
| 11,777,330 | B2* | 10/2023 | Justin | H02J 7/0071 320/162 |
| 11,789,294 | B2* | 10/2023 | Moubedi | H02J 50/005 351/158 |
| 11,841,754 | B2* | 12/2023 | Kristjansson | G06F 1/26 |
| 11,852,820 | B2* | 12/2023 | Yoon | G02B 27/0093 |
| 11,874,471 | B2* | 1/2024 | Lee | G02B 27/0176 |
| 11,927,751 | B2* | 3/2024 | Chelf | G02B 6/0031 |
| 11,927,985 | B2* | 3/2024 | Hong | G06F 3/013 |
| 11,953,695 | B2* | 4/2024 | Hong | G02B 27/0172 |
| 11,988,843 | B2* | 5/2024 | Yahagi | H02J 50/40 |
| 11,992,102 | B2* | 5/2024 | Yoon | A45C 13/005 |
| 12,027,906 | B2* | 7/2024 | Park | H02J 7/0047 |
| 12,029,014 | B2* | 7/2024 | Yoon | G06F 1/20 |
| 12,047,109 | B2* | 7/2024 | Yang | G02B 27/00 |
| 12,088,130 | B2* | 9/2024 | Carlson | G06F 1/1635 |
| 12,113,374 | B2* | 10/2024 | Yoon | H02J 50/80 |
| 12,113,381 | B2* | 10/2024 | Choi | H02J 7/0019 |
| 12,120,853 | B2* | 10/2024 | Uhm | H05K 1/144 |
| 12,135,426 | B2* | 11/2024 | Stephens | G02C 11/10 |
| 12,148,983 | B2* | 11/2024 | Yun | H01Q 21/28 |
| 12,155,251 | B2* | 11/2024 | Juang | H01M 50/502 |
| 12,155,252 | B2* | 11/2024 | Juang | H01M 10/425 |
| 12,174,389 | B2* | 12/2024 | Park | G06F 1/1688 |
| 12,174,688 | B2* | 12/2024 | Yoon | G06F 1/324 |
| 12,198,641 | B2* | 1/2025 | Lee | G01K 1/02 |
| 12,206,278 | B2* | 1/2025 | Jung | H04B 5/79 |
| 12,278,512 | B2* | 4/2025 | Schline | H02J 7/007182 |
| 12,289,420 | B2* | 4/2025 | Chang | H02J 7/0014 |
| 12,322,996 | B2* | 6/2025 | Kadirvel | H04R 1/1025 |
| 12,328,016 | B2* | 6/2025 | Yan | H02J 7/0063 |
| 2005/0231167 | A1* | 10/2005 | Kubota | G01R 31/3648 320/132 |
| 2008/0055537 | A1 | 3/2008 | Asran et al. | |
| 2009/0229288 | A1* | 9/2009 | Alston | B60H 1/00428 62/239 |
| 2010/0237828 | A1* | 9/2010 | Maegawa | H02J 7/0018 320/118 |
| 2011/0241620 | A1* | 10/2011 | Lin | H02J 7/0018 320/112 |
| 2012/0143425 | A1* | 6/2012 | Yamamoto | B60W 20/10 180/65.265 |
| 2014/0070760 | A1* | 3/2014 | Albsmeier | H02J 7/342 320/107 |
| 2014/0070774 | A1 | 3/2014 | Terlizzi et al. | |
| 2014/0161412 | A1* | 6/2014 | Chase | H04N 9/79 386/224 |
| 2014/0266013 | A1* | 9/2014 | Becker | H02J 7/0068 320/109 |

(56) References Cited

U.S. PATENT DOCUMENTS

| | | | |
|---|---|---|---|
| 2014/0266988 A1* | 9/2014 | Fisher | G06F 3/04886 345/8 |
| 2015/0042544 A1 | 2/2015 | Sugihara et al. | |
| 2015/0067362 A1* | 3/2015 | Sultenfuss | G06F 1/30 713/320 |
| 2016/0094061 A1* | 3/2016 | Terlizzi | H02J 7/00 320/106 |
| 2016/0238850 A1* | 8/2016 | Yang | G02B 27/0176 |
| 2016/0241066 A1* | 8/2016 | Kim | H02J 7/007184 |
| 2016/0285287 A1* | 9/2016 | Cha | H02J 7/0048 |
| 2016/0299569 A1* | 10/2016 | Fisher | G06F 3/011 |
| 2016/0380315 A1* | 12/2016 | Weicker | H02J 7/1423 320/136 |
| 2017/0054328 A1* | 2/2017 | Jung | H02J 7/00714 |
| 2017/0063123 A1* | 3/2017 | Horie | H02J 7/00712 |
| 2017/0068112 A1 | 3/2017 | Bhatta et al. | |
| 2017/0317490 A1* | 11/2017 | Penny | H02J 7/0042 |
| 2018/0120915 A1* | 5/2018 | Li | G06F 1/263 |
| 2018/0219389 A1* | 8/2018 | Binder | G06F 1/26 |
| 2018/0249133 A1* | 8/2018 | Thiel | G08B 25/016 |
| 2018/0366967 A1* | 12/2018 | Horie | H02J 7/007182 |
| 2019/0006722 A1* | 1/2019 | Kim | H01M 10/486 |
| 2019/0052119 A1* | 2/2019 | Hendrix | H02J 7/0018 |
| 2019/0081487 A1* | 3/2019 | Baby | G06F 1/1616 |
| 2019/0097365 A1 | 3/2019 | Lee et al. | |
| 2019/0165613 A1* | 5/2019 | Jung | H02J 7/00714 |
| 2019/0196228 A1 | 6/2019 | Moore et al. | |
| 2019/0198982 A1* | 6/2019 | Moore | H01Q 1/273 |
| 2019/0214831 A1* | 7/2019 | Kristjansson | G06F 1/263 |
| 2019/0214837 A1 | 7/2019 | Kristjansson | |
| 2019/0245379 A1* | 8/2019 | Mio | B60L 58/20 |
| 2019/0346895 A1* | 11/2019 | Ho | H05K 7/20381 |
| 2019/0356134 A1* | 11/2019 | Ohashi | H02J 7/0018 |
| 2019/0356157 A1* | 11/2019 | Ohashi | H02J 7/00304 |
| 2020/0006957 A1* | 1/2020 | Ohashi | H02J 1/082 |
| 2020/0036198 A1 | 1/2020 | Kim et al. | |
| 2020/0091662 A1* | 3/2020 | Lee | H04M 1/72409 |
| 2020/0096774 A1* | 3/2020 | Trail | G06T 7/70 |
| 2020/0099231 A1* | 3/2020 | Nobre | G06F 1/163 |
| 2020/0136422 A1 | 4/2020 | Lee et al. | |
| 2020/0161872 A1* | 5/2020 | Files | H02J 7/0068 |
| 2020/0169101 A1* | 5/2020 | Li | H02J 7/0063 |
| 2020/0313446 A1* | 10/2020 | Park | H01M 10/46 |
| 2020/0343775 A1* | 10/2020 | Yahagi | H02J 50/12 |
| 2020/0373764 A1* | 11/2020 | Lee | H02J 7/0063 |
| 2020/0395765 A1* | 12/2020 | Kristjansson | G06F 1/26 |
| 2020/0395778 A1* | 12/2020 | Obie | H02J 1/108 |
| 2020/0403278 A1* | 12/2020 | Jhawar | H01M 10/44 |
| 2020/0412132 A1* | 12/2020 | Kristjansson | H02J 7/0014 |
| 2020/0412136 A1* | 12/2020 | Kristjansson | H02J 7/00714 |
| 2021/0021136 A1* | 1/2021 | Gao | H02J 7/00712 320/107 |
| 2021/0135478 A1* | 5/2021 | Schline | G06F 1/3212 |
| 2021/0167611 A1* | 6/2021 | Baby | H02J 7/0014 |
| 2021/0234391 A1* | 7/2021 | Kristjansson | H01M 10/48 |
| 2021/0237670 A1* | 8/2021 | Takahara | H02J 9/06 |
| 2021/0349505 A1* | 11/2021 | Yeh | G06F 1/189 |
| 2021/0391620 A1* | 12/2021 | Porter | H01M 50/247 |
| 2021/0391738 A1* | 12/2021 | Obie | H02J 7/345 |
| 2022/0024326 A1* | 1/2022 | Kitamoto | H02J 7/0063 |
| 2022/0029439 A1* | 1/2022 | Justin | H02J 7/0071 |
| 2022/0037881 A1* | 2/2022 | Sun | H02J 7/0013 |
| 2022/0037900 A1* | 2/2022 | Hira | H02J 7/0013 |
| 2022/0060033 A1* | 2/2022 | Bang | H02J 7/00306 |
| 2022/0066221 A1* | 3/2022 | Yoon | G06F 3/017 |
| 2022/0069605 A1* | 3/2022 | Trela | B60L 3/0046 |
| 2022/0077695 A1* | 3/2022 | Choi | H02J 7/0016 |
| 2022/0097549 A1* | 3/2022 | Oishi | B60L 53/11 |
| 2022/0115895 A1* | 4/2022 | Park | H02J 7/0013 |
| 2022/0163809 A1* | 5/2022 | Lee | G02B 27/0176 |
| 2022/0166258 A1* | 5/2022 | Yahagi | H01M 10/46 |
| 2022/0173622 A1* | 6/2022 | Jung | H02J 7/342 |
| 2022/0190607 A1* | 6/2022 | Juang | H02J 7/007 |
| 2022/0210905 A1* | 6/2022 | Choi | G02B 27/0176 |
| 2022/0231523 A1* | 7/2022 | Bristol | H02J 7/0042 |
| 2022/0255326 A1* | 8/2022 | Carlson | G06F 1/1683 |
| 2022/0263337 A1* | 8/2022 | Mitani | H02J 7/00038 |
| 2022/0283439 A1* | 9/2022 | Hong | G02B 27/0172 |
| 2022/0285828 A1* | 9/2022 | Yun | G04G 21/04 |
| 2022/0322800 A1* | 10/2022 | Yoon | H05K 9/0067 |
| 2022/0329110 A1* | 10/2022 | Yoon | H02J 50/12 |
| 2022/0346268 A1* | 10/2022 | Park | G06F 1/1632 |
| 2022/0346277 A1* | 10/2022 | Yoon | G06F 1/20 |
| 2022/0350559 A1* | 11/2022 | Yoon | G06F 3/1423 |
| 2022/0357780 A1* | 11/2022 | Bhagwan | G06F 1/263 |
| 2022/0368145 A1* | 11/2022 | Yoon | H02J 7/00712 |
| 2022/0374040 A1* | 11/2022 | Hong | G02B 27/0172 |
| 2022/0400575 A1* | 12/2022 | Uhm | G06F 1/163 |
| 2022/0416562 A1* | 12/2022 | Ino | H02J 7/00714 |
| 2023/0032559 A1* | 2/2023 | Moubedi | H01M 10/44 |
| 2023/0035299 A1* | 2/2023 | Yoon | G02B 27/0172 |
| 2023/0069217 A1* | 3/2023 | Yoon | H02J 50/80 |
| 2023/0076226 A1* | 3/2023 | Yang | H01Q 21/28 |
| 2023/0095408 A1* | 3/2023 | Takamatsu | H02M 3/158 307/20 |
| 2023/0096836 A1* | 3/2023 | Kadirvel | H02J 7/00302 320/134 |
| 2023/0120402 A1* | 4/2023 | Juang | H02J 7/007 307/19 |
| 2023/0161400 A1* | 5/2023 | Yoon | G06F 1/3265 713/323 |
| 2023/0163616 A1* | 5/2023 | Juang | B60L 58/20 307/19 |
| 2023/0164703 A1* | 5/2023 | Yoon | H04W 52/285 455/522 |
| 2023/0204965 A1* | 6/2023 | Park | G06F 1/163 345/8 |
| 2023/0204985 A1* | 6/2023 | Yang | G06F 1/1635 351/158 |
| 2023/0205319 A1* | 6/2023 | Kim | G06F 3/011 345/633 |
| 2023/0229006 A1* | 7/2023 | Yahagi | H01M 10/488 307/104 |
| 2023/0236321 A1* | 7/2023 | Song | G01S 7/497 356/4.01 |
| 2023/0246475 A1* | 8/2023 | Jung | H04B 5/79 |
| 2023/0251362 A1* | 8/2023 | Cho | G01S 7/4865 356/5.01 |
| 2023/0253805 A1* | 8/2023 | Wang | B60R 16/033 320/118 |
| 2023/0261502 A1* | 8/2023 | Yoon | H01M 10/44 320/150 |
| 2023/0269313 A1* | 8/2023 | Chang | G06F 1/1683 455/572 |
| 2023/0275452 A1* | 8/2023 | Li | H02J 7/0063 320/126 |
| 2023/0283087 A1* | 9/2023 | Meador | H01M 10/46 307/29 |
| 2023/0283090 A1* | 9/2023 | Yoon | H10N 10/17 |
| 2023/0307926 A1* | 9/2023 | Binder | H02J 7/0042 |
| 2023/0327476 A1* | 10/2023 | Rothkopf | G06F 1/163 320/103 |
| 2023/0333306 A1* | 10/2023 | Chelf | G02C 11/10 |
| 2023/0333375 A1* | 10/2023 | Stephens | G02B 25/004 |
| 2023/0333381 A1* | 10/2023 | Chelf | G02B 27/0149 |
| 2023/0333392 A1* | 10/2023 | Chelf | G02B 27/0179 |
| 2024/0036323 A1* | 2/2024 | Uhm | G02B 27/0172 |
| 2024/0073508 A1* | 2/2024 | Yoon | H04N 23/90 |
| 2024/0074028 A1* | 2/2024 | Yoon | H01L 23/427 |
| 2024/0077753 A1* | 3/2024 | Isaacs | H02J 7/00714 |
| 2024/0096254 A1* | 3/2024 | Son | G09G 3/00 |
| 2024/0103289 A1* | 3/2024 | Yoon | G06F 1/163 |
| 2024/0111334 A1* | 4/2024 | Yang | G06F 1/16 |
| 2024/0143092 A1* | 5/2024 | Lim | G02C 5/20 |
| 2024/0160024 A1* | 5/2024 | Choi | G02B 27/0172 |
| 2024/0168522 A1* | 5/2024 | Choi | G06F 1/163 |
| 2024/0169935 A1* | 5/2024 | Lee | G09G 3/3406 |
| 2024/0171894 A1* | 5/2024 | Yoon | G06F 3/165 |
| 2024/0222998 A1* | 7/2024 | Kim | H02J 7/00 |
| 2024/0250538 A1* | 7/2024 | Cao | H02J 7/00047 |
| 2024/0322575 A1* | 9/2024 | Yue | H02J 7/00032 |
| 2024/0407137 A1* | 12/2024 | Yoon | H05K 7/20172 |

(56) References Cited

U.S. PATENT DOCUMENTS

| | | | | |
|---|---|---|---|---|
| 2024/0419397 A1* | 12/2024 | Jo | ............................ | G06F 3/167 |
| 2025/0016456 A1* | 1/2025 | Yoon | ........................ | G06F 3/013 |
| 2025/0047108 A1* | 2/2025 | Yan | ........................ | H02J 7/0048 |

FOREIGN PATENT DOCUMENTS

| | | |
|---|---|---|
| KR | 1020150036765 | 4/2015 |
| KR | 1020150049340 | 5/2015 |
| KR | 1020190036300 | 4/2019 |
| KR | 1020200012105 | 2/2020 |
| KR | 1020200048975 | 5/2020 |
| WO | WO 2020/142757 | 7/2020 |

* cited by examiner

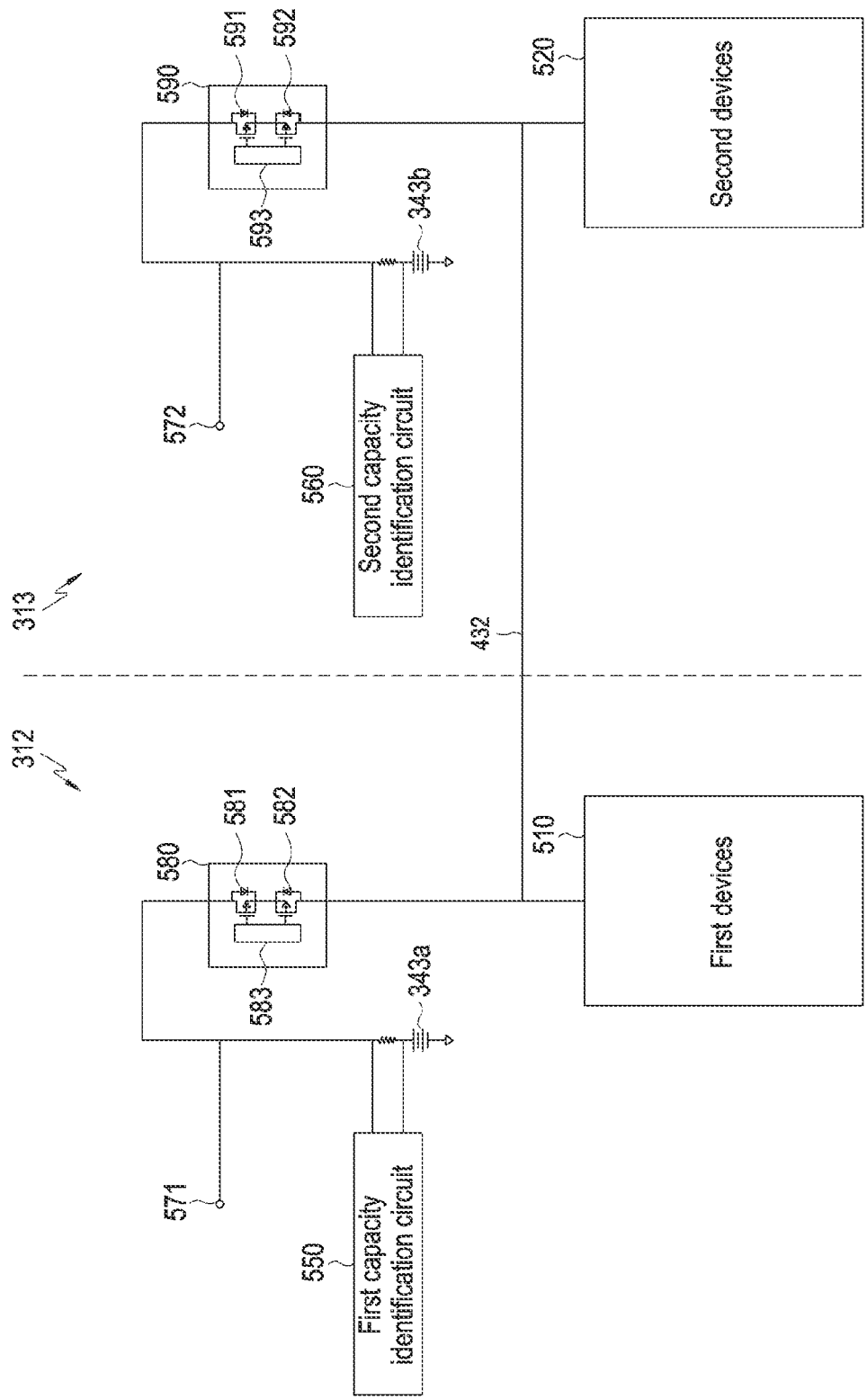

WEARABLE ELECTRONIC DEVICE INCLUDING MULTIPLE BATTERIES AND METHOD FOR OPERATING THE SAME

CROSS-REFERENCE TO RELATED APPLICATIONS

This application is a Bypass Continuation of International Application No. PCT/KR2021/018736, which was filed on Dec. 10, 2021, and is based on and claims priority under 35 U.S.C. § 119 to Korean Patent Application No. 10-2020-0182507, which was in the Korean Intellectual Property Office filed on Dec. 23, 2020, the entire disclosure of each of which is incorporated herein by reference.

BACKGROUND

1. Field

The disclosure relates to a wearable electronic device including a plurality of batteries and a method for operating the same.

2. Description of Related Art

With the development of electronics and communication technologies, electronic devices may come in a more compact and lightweight form factor to be worn on the user's body without discomfort. For example, commercially available wearable electronic devices include head-mounted devices (HMDs), smart watches (or bands), contact lens-type devices, ring-type devices, glove-type devices, shoe-type devices, or clothing-type devices. Since the wearable electronic device is directly worn on a user's body, more portability and user accessibility may be obtained.

The head mounting device is a device used while being worn on the user's head or face and may provide augmented reality (AR) to the user. For example, a glasses-type head mounting device providing augmented reality may provide information regarding objects in the form of images or text to the user in at least a partial space of the user's field of view (FOV). The head mounting device may provide virtual reality (VR) to the user. For example, the head mounting device may output independent images to the user's eyes and output the content, provided from an external input to the user, in the form of an image or audio, thereby providing a superb sense of immersion.

A glasses-type wearable electronic device may include structures (e.g., lens frames and wearing members) provided on a first side (e.g., left side) and a second side (e.g., right side) and devices disposed in the structures to provide functions (e.g., batteries, displays, a communication module, a camera, and/or various circuits (e.g., a power management circuit)). The glasses-type wearable electronic device may control to charge the batteries disposed in the structures on the first and second sides, provide driving power to the devices, and discharge the batteries for power balancing of the devices. However, as a plurality of power lines for charging, providing the driving power, and/or power balancing are provided inside the glasses-type wearable electronic device, the electrical resistance of the wearable electronic device may increase due to each of the plurality of power lines. If the plurality of power lines in the wearable electronic device are thickened to reduce the resistance, the efficiency of arrangement of the devices in the wearable electronic device may be significantly reduced.

According to various embodiments, an electronic device and method for operating the same may reduce electrical resistance and increase efficiency of an arrangement of devices in a wearable electronic device by providing a single power line for charging, providing driving power, and/or power balancing. According to various embodiments, an electronic device and method for operating the same may optimally maintain power balancing in the electronic device by controlling charging and discharging of a battery through a single power line.

SUMMARY

An aspect of the disclosure is to provide an electronic device and method for operating the same, which may reduce the electrical resistance and increase the efficiency of arrangement of the devices in the wearable electronic device by providing a single power line for charging, providing driving power, and/or power balancing.

An aspect of the disclosure is to provide an electronic device and method for operating the same, which may optimally maintain power balancing in the electronic device by controlling the charging and discharging of the battery through a single power line.

In accordance with an aspect of the disclosure, an electronic device is provided, which includes a first structure provided on a first side, a connector disposed in the first structure and configured to receive external power, a first charging/discharging circuit disposed in the first structure and electrically connected to the connector, a first battery and at least one first device electrically connected to the first charging/discharging circuit, a power line, a second structure provided on a second side, a second charging/discharging circuit disposed in the second structure and electrically connected with the connector through the power line, a second battery and at least one second device electrically connected to the second charging/discharging circuit, and a processor configured to control the first charging/discharging circuit to provide first power from the first battery through the power line based on a first remaining capacity of the first battery and a remaining capacity of the second battery satisfying a first condition and control the second charging/discharging circuit to provide second power from the second battery through the power line based on the first remaining capacity of the first battery and the second remaining capacity of the second battery satisfying a second condition different from the first condition.

In accordance with an aspect of the disclosure, an electronic device is provided, which includes a first structure provided on a first side, a first connector disposed in the first structure to receive first external power, a first battery and at least one first device electrically connected to the first connector, a power line, a second structure provided on a second side, a second connector disposed in the second structure to receive second external power, a second battery and at least one second device electrically connected with the second connector, the first battery electrically connected with the second battery through the power line, and a processor configured to control an amount of a first current transferred from the first battery through the power line and an amount of a second current transferred from the second battery through the power line, based on a difference between a first remaining capacity of the first battery and a second remaining capacity of the second battery.

Various embodiments of the disclosure are not limited to the foregoing aspects, and other aspects may be readily appreciated by a skilled artisan from the following detailed description taken in conjunction with the accompanying drawings.

BRIEF DESCRIPTION OF THE DRA WINGS

The above and other aspects, features, and advantages of various embodiments will be more apparent from the following description taken in conjunction with the accompanying drawings, in which:

FIG. 5D is a view illustrating an example of a configuration of the electronic device illustrated in FIG. 5C according to various embodiments;

DETAILED DESCRIPTION

Figure 1:
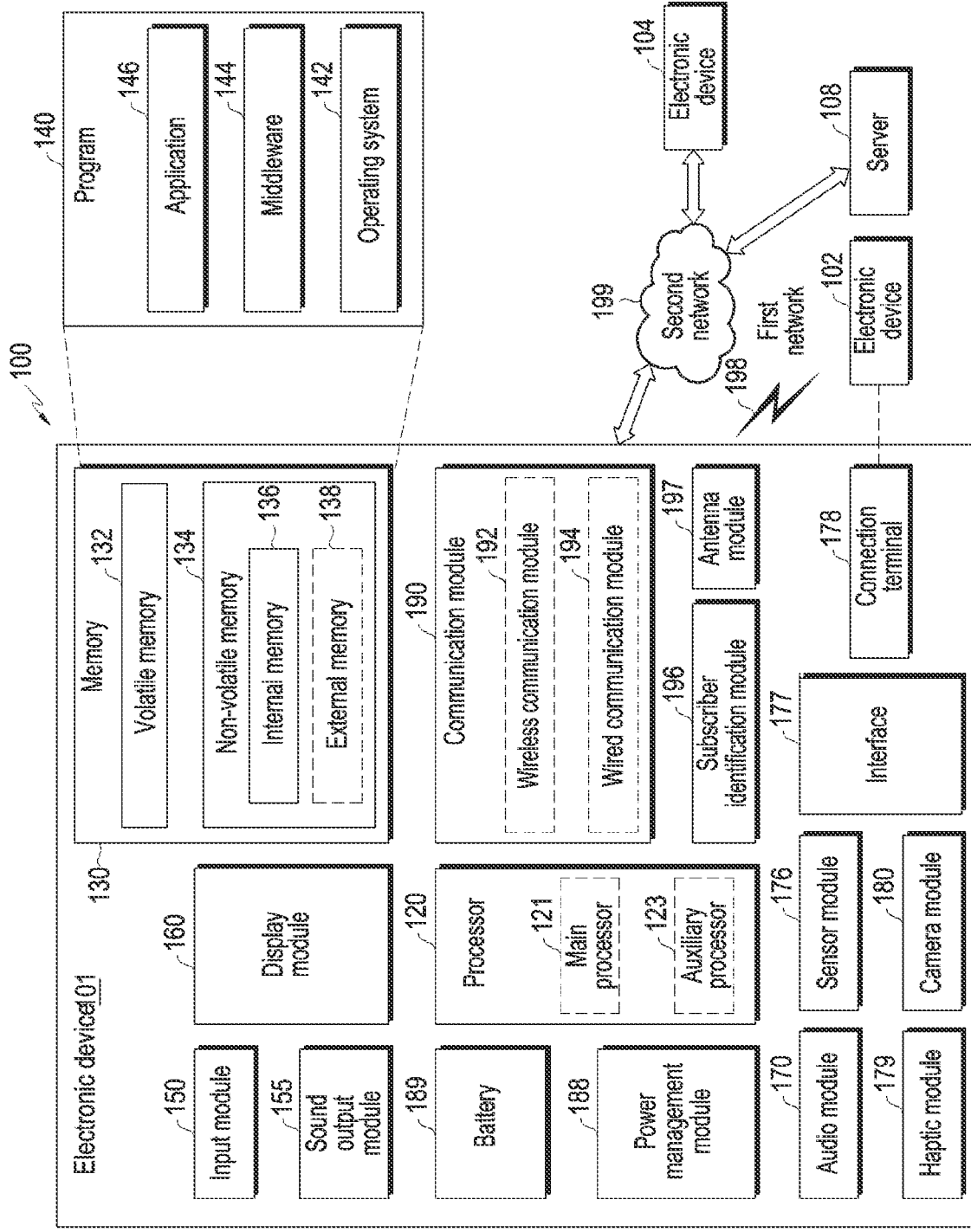
FIG. 1 is a block diagram illustrating an electronic device in a network environment according to various embodiments.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120 and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network, or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150 or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., a local area network (LAN) or a wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., a radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or MEC. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, examples of an electronic device and a communication device insertable into the electronic device according to various embodiments are described. The description of the electronic device 101 provided in the network environment 100 described above in connection with FIG. 1 is applicable to the electronic device and communication device of FIG. 2 (e.g., the electronic device 200, the external electronic device 205, or the charging device 207), and thus, no duplicate description is given below.

Figure 2:
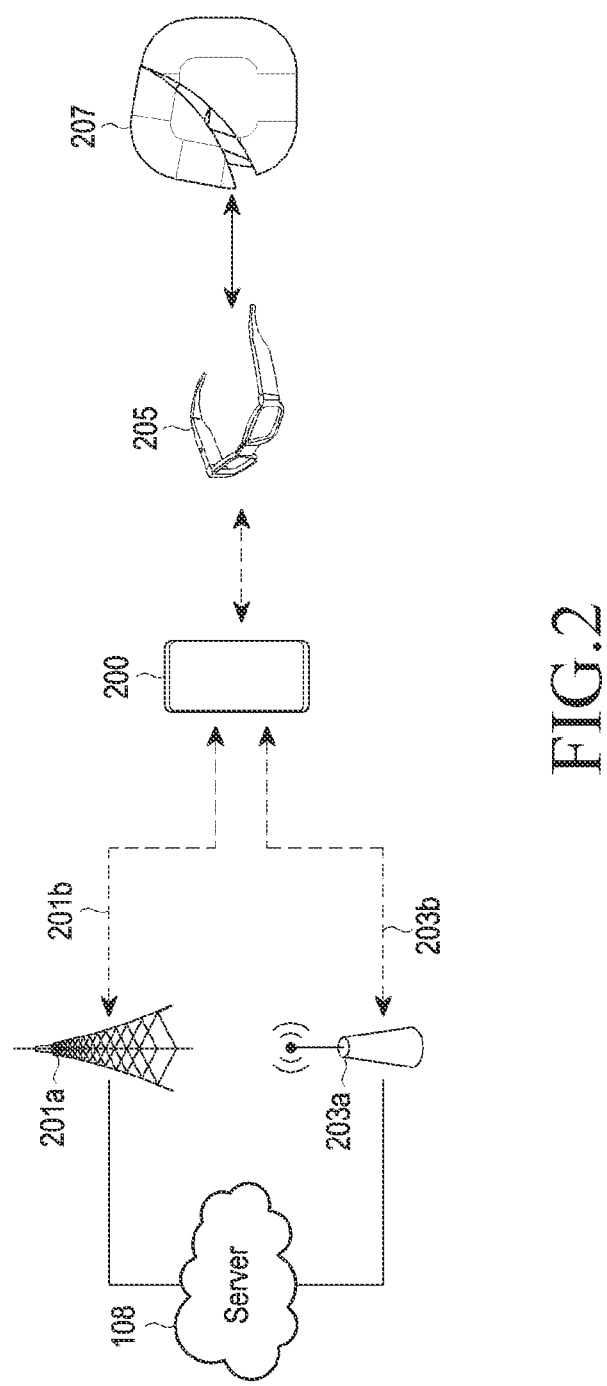
FIG. 2 is a view illustrating an example of a system for providing augmented reality, according to various embodiments.

FIG. 2 is a view illustrating an example of a system for providing augmented reality, according to various embodiments.

Referring to FIG. 2, a system for providing augmented reality may include an electronic device 200 (e.g., the electronic device 101 of FIG. 1), an external electronic device 205 (e.g., the electronic device 102 or 104 of FIG. 1) and/or a server 108, and/or a charging device 207. For example, the electronic device 200 may a portable terminal, such as a smartphone. For example, the external electronic device 205 may include an augmented reality (AR) device for providing an augmented reality image, such as AR glasses, a virtual reality (VR) device for providing a virtual reality image, such as VR glasses, and/or a mixed reality (MR) device for providing a mixed image of an AR image and a VR image or simultaneously providing the AR image and the VR image. For example, the server 108 may include a cloud server.

According to various embodiments, the electronic device 200 may transmit and/or receive data to/from the external electronic device 205 through a first network (e.g., the first network 198 of FIG. 1) and/or a second network (e.g., the second network 199 of FIG. 1). For example, the electronic device 200 may receive sensing data and/or image data from the external electronic device 205. As another example, the electronic device 200 may provide various types of content (e.g., AR content or VR content) to the external electronic device 205. For example, data transmission and/or reception between the electronic device 200 and the external electronic device 205 may be performed through a Bluetooth communication scheme or a Wi-Fi direct communication scheme. For example, data transmission and/or reception between the electronic device 200 and the external electronic device 205 may be performed through a Wi-Fi communication scheme through an access point (AP). When the electronic device 200 and the external electronic device 205 are connected through a Wi-Fi direct communication scheme or a Wi-Fi communication scheme, a wireless communication protocol defined by the IEEE 802.11 wireless local area network (WLAN) standard may be used. In addition to the above-described examples, the electronic device 200 may be connected to the external electronic device 205 through the second network 199 like a cellular communication scheme.

According to various embodiments, the electronic device 200 may transmit and/or receive data to/from the server 108 through a first network (e.g., the first network 198 of FIG. 1) and/or a second network (e.g., the second network 199 of FIG. 1). For example, the electronic device 200 may receive various types of information for providing various contents from the server 108. For example, data transmission and/or reception between the electronic device 200 and the server 108 may be performed through a connection 201*b* through a cellular communication scheme using a base station 201*a* and/or a connection 203*b* through a Wi-Fi communication scheme using an access point (AP) 203*a*.

According to various embodiments, the external electronic device 205 may provide AR content, VR content, and/or MR content to the user based on information and/or data received from the outside. For example, the external electronic device 205 may receive various information and/or data from the electronic device 200 or, although not shown, may directly receive various information and/or data from the server 108 through a first network (e.g., the first network 198 of FIG. 1 and/or the second network (e.g., the second network 199 of FIG. 1)).

According to various embodiments, the external electronic device 205 may receive external power for charging the battery provided in the external electronic device 205. For example, the external electronic device 207 may be mounted on a separately provided charging device (e.g., the case-type charging device 207 of FIG. 2) as illustrated in FIG. 2 and be electrically connected to the charging device to receive external power from the charging device. Without being limited thereto, the charging device may be implemented not as a case-type charging device but as other various types of charging devices including a structure (e.g., a connector) connected to the external electronic device 205 via a wire (e.g., a USB cable or a cable including a connector including a designated number of pins). As another example, although not shown, the external electronic device 205 may receive external power from a charging device that wirelessly supplies power. In this case, the external electronic device 205 may further include a power receiving coil for wireless power reception.

According to various embodiments, when the electronic device 200 or the external electronic device 205 performs a specific operation, it may mean, e.g., that a processor (e.g., the processor 120 of FIG. 1) included in the electronic device 200 or the external electronic device 205 performs the specific operation or controls other hardware (e.g., the wireless communication module 192) to perform the specific operation. Alternatively, when the electronic device 200 or the external electronic device 205 performs a specific operation, it may mean, e.g., that as at least one instruction stored in a memory (e.g., the memory 130 of FIG. 1) included in the electronic device 200 or the external electronic device 205 is executed, the processor performs the specific operation or controls other hardware (e.g., the wireless communication module 192) to perform the specific operation.

Hereinafter, an example of the above-described external electronic device 205 (hereinafter, electronic device 300) is described.

Figure 3A:
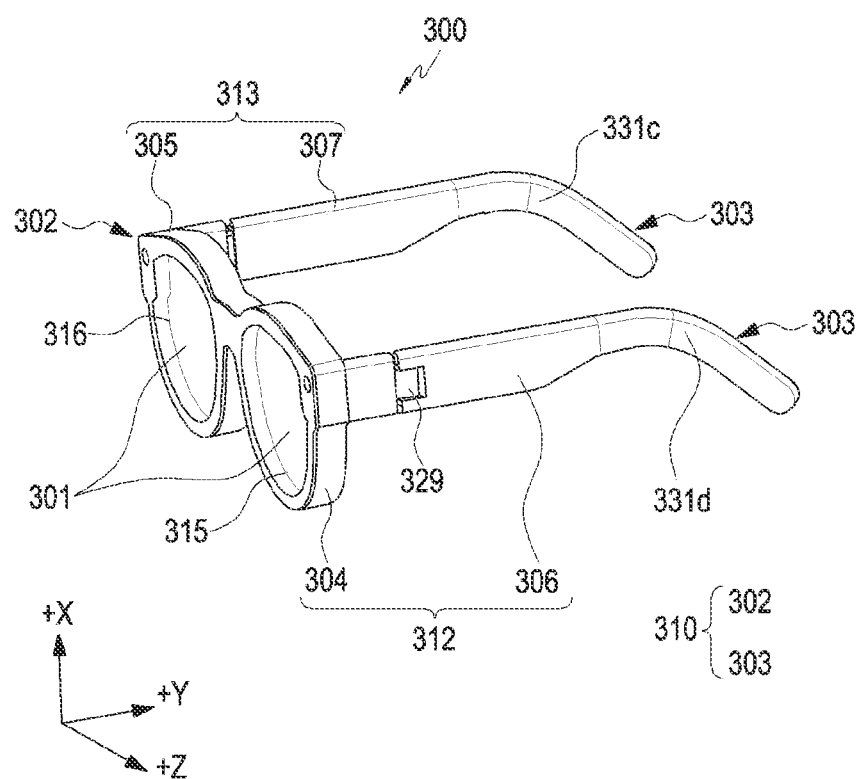
FIG. 3A is a perspective view illustrating a wearable electronic device according to various embodiments.

FIG. 3A is a perspective view illustrating a wearable electronic device according to various embodiments.

Referring to FIG. 3A, the electronic device 300 may be a glasses-type electronic device, and the user may visually recognize her surrounding objects or environment while wearing the electronic device 300. For example, the electronic device 300 may be a device in the form of a head-mounted device (HMD) or smart glasses capable of providing images directly in front of the user's eyes.

According to various embodiments, as illustrated in FIG. 3A, the electronic device 300 may include a housing 310 that forms an exterior of the electronic device 300. The housing 310 may provide a space in which components of the electronic device 300 may be disposed. For example, the housing 310 may include a lens frame 302 and at least one wearing member 303. In one embodiment, the housing 310 may include a first structure 312 provided on a first side (e.g., left side, +z-axis direction) and a second structure 313 provided on a second side (e.g., right side, −z-axis direction). For example, the lens frame 302 and the at least one wearing member 303 may be divided into the first structure 312 provided on the first side (e.g., left side, z-axis direction) and the second structure 313 provided on the second side (e.g., right side, −z-axis direction). For example, the lens frame 302 may include a first lens frame 304 provided on the first side (e.g., left side, +z-axis direction) (i.e., classified as the first structure 312) and a second lens frame 305 provided on the second side (e.g., right side, −z-axis direction) (i.e., classified as the right structure 313), as illustrated in FIG. 3A. As another example, the at least one wearing member 303 may include a first wearing member 306 provided on the first side (e.g., left side, +z-axis direction) (i.e., classified as the first structure 312) and a second wearing member 307 provided on the second side (e.g., right side, −z-axis direction) (i.e., classified as the second structure 313). Different types of components or devices may be disposed in the first structure 312 and the second structure 313. For example, as described below, first devices (e.g., a camera, a display, a power management IC, or a battery) may be disposed in the first structure 312, and second devices (e.g., a camera, a display, a communication module, or a battery) may be disposed in the second structure 313. As the components or devices disposed in the first structure 312 and the second structure 313 differ in type, the remaining battery times of the batteries (e.g., a first battery 343*a* and a second battery 343*b*) disposed in the structures may differ.

According to various embodiments, the electronic device 300 may include a display device 301 as illustrated in FIG. 3A. The display device 301 may include a display module, a projector, or a touch circuitry-mounted sensor, and the display of the display module may be a transparent or semi-transparent display. As another example, the display device 301 may include a window member (e.g., a transparent member), and the window member may include a light adjusting member which is disposed in at least a portion of the window member. The light adjusting member may be a semi-transparent glass or a member the light transmittance of which may be adjusted as the coloring concentration is adjusted. As another example, the display device 301 may include a lens including a waveguide or a reflective lens, and each lens may transmit light from an output device to the user's eyes. According to an embodiment, a pair of display devices 301 may be provided and disposed to correspond to the user's left and right eyes, respectively, with the electronic device 300 worn on the user's body.

According to various embodiments, the lens frame 302 may receive at least a portion of the display device 301. For example, the display devices 301 may include a first display 315 provided in the first lens frame 304 which is the first structure 312 and a second display 316 provided in the second lens frame 305 which is the second structure 313. Each lens frame 302 may surround at least a portion of the edge of each display device 301 (e.g., the first display 315 and the second display 316). According to an embodiment, the lens frame 302 may position at least one of the display devices 301 to correspond to the user's eye. According to an embodiment, the lens frame 302 may be the rim of a normal eyeglass structure. According to an embodiment, the lens frame 302 may include at least one closed loop surrounding the display devices 301.

According to various embodiments, the wearing members 303 (e.g., the first wearing member 306 and the second wearing member 307) may extend from the lens frame 302 (e.g., the first lens frame 304 and the second lens frame 305). For example, the wearing members 303 extends from ends of the lens frame 302 and, together with the lens frame 302, may be supported and/or positioned on a part (e.g., ears) of the user's body. According to an embodiment, the wearing members 303 may be rotatably coupled to the lens frame 302 through hinge structures 329. According to an embodiment, the wearing member 303 may include an inner side surface 331c configured to face the user's body and an outer side surface 331d opposite to the inner side surface.

According to various embodiments, the electronic device 300 may include the hinge structures 329 configured to fold the wearing members 303 on the lens frame 302. The hinge structure 329 may be disposed between the lens frame 302 and the wearing member 303. While the electronic device 300 is not worn, the user may fold the wearing members 303 on the lens frame 320 to carry or store the electronic device 300.

Hereinafter, examples of the above-described wearable electronic device (e.g., the external electronic device 205 of FIG. 2 and the electronic device 300 of FIG. 3A) are described below in detail.

Figure 3B:
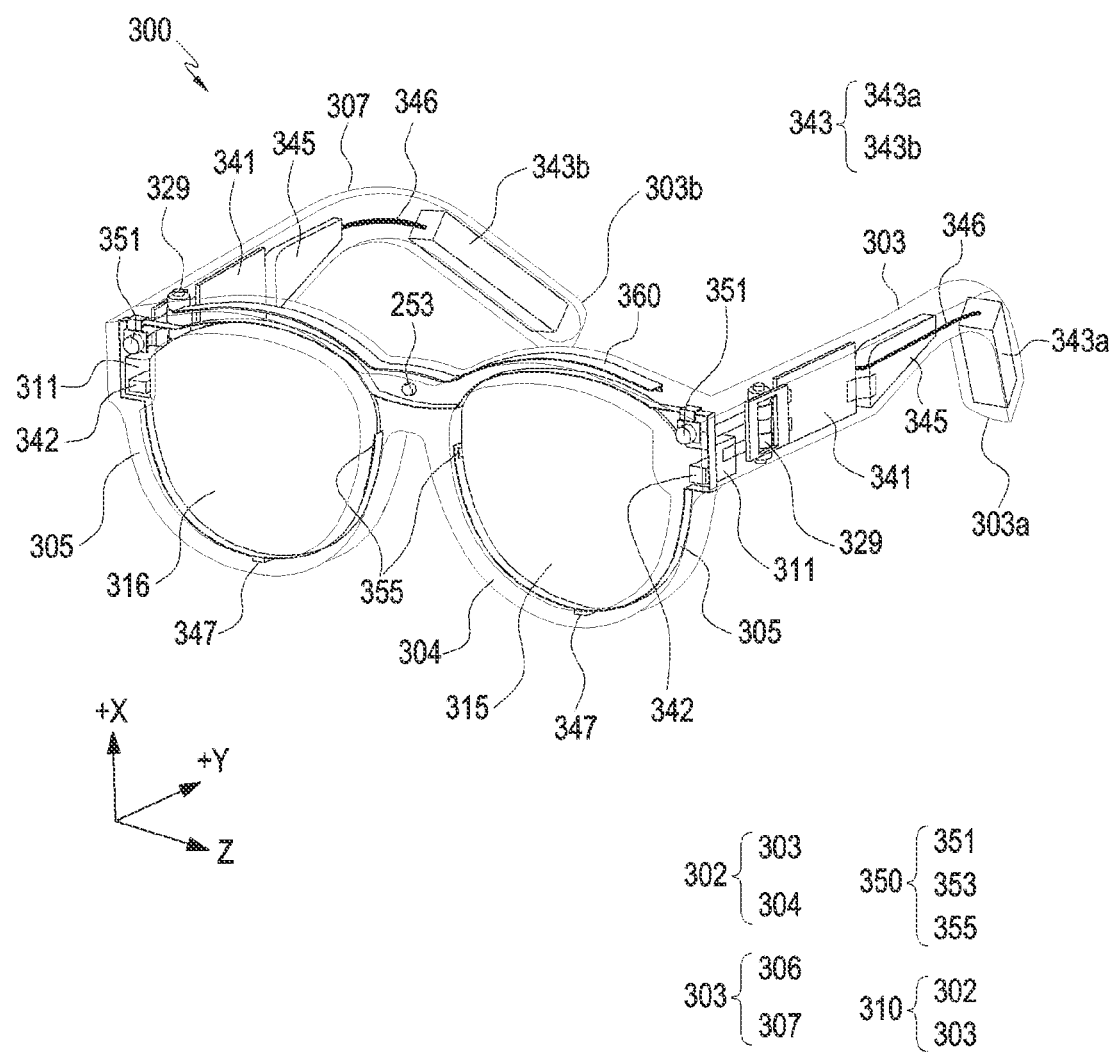
FIG. 3B is a perspective view illustrating an internal configuration of a wearable electronic device according to various embodiments.
Figure 3C:
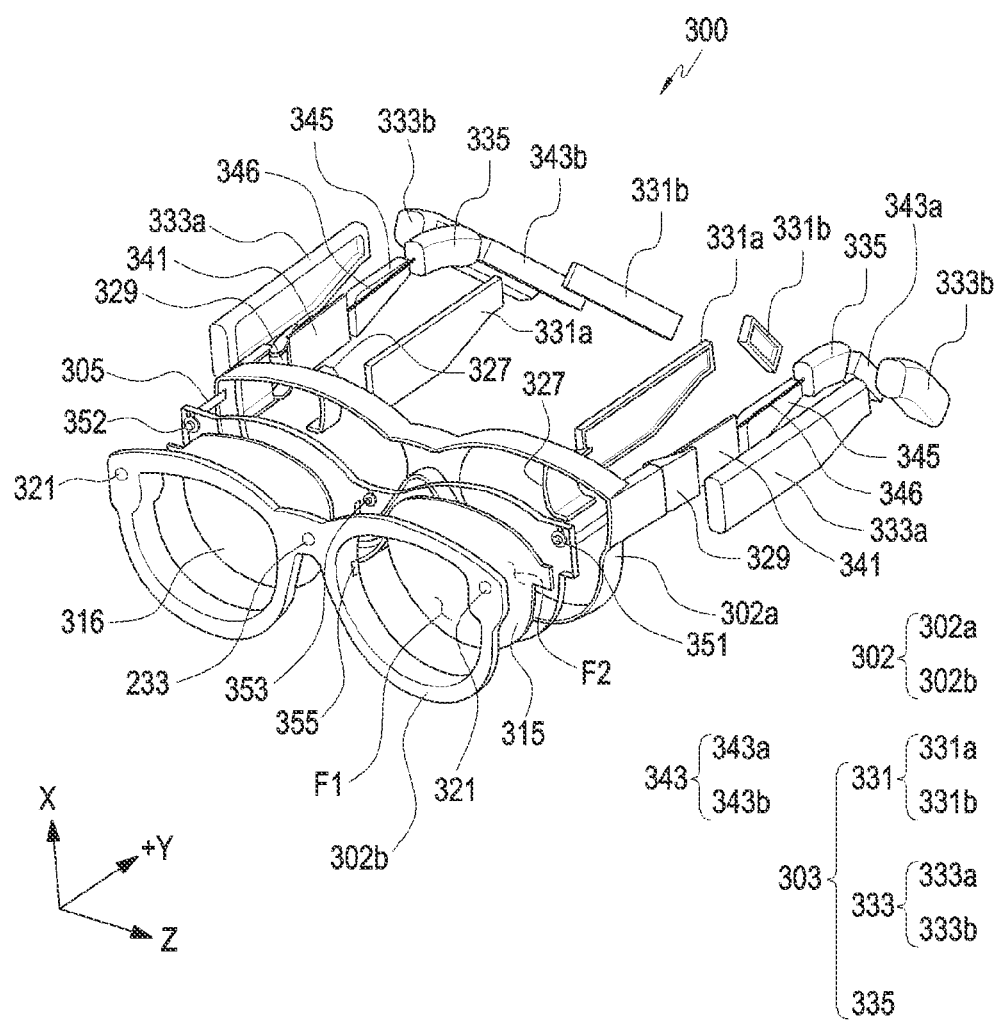
FIG. 3C is an exploded perspective view illustrating a wearable electronic device according to various embodiments.

FIG. 3B is a perspective view illustrating an internal configuration of a wearable electronic device according to an embodiment of the disclosure. FIG. 3C is an exploded perspective view illustrating a wearable electronic device according to various embodiments.

Referring to FIGS. 3B and 3C, an electronic device 300 may include components received in the housing 310 (e.g., at least one circuit board 341 (e.g., a printed circuit board (PCB), a printed board assembly (PBA), a flexible PCB (FPCB), or a rigid-flexible PCB (RFPCB)), at least one battery 343, at least one speaker module 345, at least one power transfer structure 346, and a camera module 350. The configuration of the housing 310 of FIG. 3B may be identical in whole or part to the configuration of the display device 301, the lens frame 302, the wearing members 303, and the hinge structures 329 of FIG. 3A.

According to various embodiments, the electronic device 300 may obtain and/or recognize a visual image regarding an object or environment in the direction (e.g., −y direction) in which the electronic device 300 faces or the direction in which the user gazes, using the camera module 350 (e.g., the camera module 180 of FIG. 1) and may receive information regarding the object or environment from an external electronic device (e.g., the electronic device 102 or 104 or the server 108 of FIG. 1) through a network (e.g., the first network 198 or second network 199 of FIG. 1). In another embodiment, the electronic device 300 may provide the received object- or environment-related information, in the form of an audio or visual form, to the user. The electronic device 300 may provide the received object- or environment-related information, in a visual form, to the user through the display device 301, using the display module (e.g., the display module 160 of FIG. 1). For example, the electronic device 300 may implement augmented reality (AR) by implementing the object- or environment-related information in a visual form and combining it with an actual image of the user's surrounding environment.

According to various embodiments, the display device 301 may include a first surface F1 facing in a direction (e.g., −y direction) in which external light is incident and a second surface F2 facing in a direction (e.g., +y direction) opposite to the first surface F1. When the user wears the electronic device 300, the second surface F2 of the display device 301 is disposed to face the user's left and/or right eye and at least partially transmits the light or image incident through the first surface F1 to the user's left eye and/or right eye.

According to various embodiments, the lens frame 302 may include at least two or more frames. For example, the lens frame 302 may include a first frame 302a and a second frame 320b. According to an embodiment, when the user wears the electronic device 300, the first frame 302a may be a frame of the portion facing the user's face, and the second frame 302b may be a portion of the lens frame 302 spaced from the first frame 302a in the gazing direction (e.g., −y direction) in which the user gazes.

According to various embodiments, the light output module 311 may provide an image to the user. For example, the light output module may include a display panel (not shown) capable of outputting an image and a lens (e.g., the first lens 311a of FIG. 3E) corresponding to the user's eye and guiding the image to the display device 301. For example, the user may obtain the image output from the display panel of the light output module 311 through the lens of the light output module 311. According to various embodiments, the light output module 311 may include a device configured to display various information. For example, the light output module 311 may include at least one of a liquid crystal display (LCD), a digital mirror device (DMD), a liquid crystal on silicon (LCoS), or an organic light emitting diode (OLED), or a micro light emitting diode (micro LED). According to an embodiment, when the light output module 311 and/or the display device 301 includes one of an LCD, a DMD, or an LCOS, the electronic device 300 may include a light output module 311 and/or a light source emitting light to the display area of the display device 301. According to another embodiment, when the light output module 311 and/or the display device 301 may include OLEDs or micro LEDs, the electronic device 300 may provide virtual images to the user without a separate light source.

According to various embodiments, the light output module 311 may be at least partially disposed in the housing 310.

For example, the light output module 311 may be disposed in the wearing member 303 or the lens frame 302 to correspond to each of the user's right eye and left eye. According to an embodiment, the light output module 311 may be connected to the display device 301, and it may provide images to the user through the display device 301.

According to various embodiments, the circuit board 341 may include components for driving the electronic device 300. For example, the circuit board 341 may include at least one integrated circuit chip. Further, at least one of the processor 120, the memory 130, the power management module 188, or the communication module 190 of FIG. 1 may be provided in the integrated circuit chip. Although described below in connection with FIGS. 7 to 5A to 5D, charging/discharging circuits and various control circuits may be provided without being limited to what has been described. According to an embodiment, a circuit board 341 may be disposed in the wearing member 303 of the housing 310. According to an embodiment, the circuit board 341 may be electrically connected to the battery 343 through the power transfer structure 346. According to an embodiment, the circuit board 341 may be connected to the flexible printed circuit board 352 and may transfer electrical signals to the electronic components (e.g., the light output module 311, the camera module 350, and the speaker module 345) of the electronic device through the flexible printed circuit board 352. According to an embodiment, the circuit board 341 may be a circuit board including an interposer. The circuit board 341 may be provided with a processor (e.g., the processor 401 of FIG. 4) described below, and the processor 401 may be electrically and/or operatively connected with components (e.g., the devices of FIGS. 5A to 5D) disposed in each of the first structure 312 (e.g., the first lens frame and the first wearing member 306) and the second structure 313 (e.g., the second lens frame 305 and the second wearing member 307) through the interposer.

According to various embodiments, the flexible printed circuit board 352 may extend from the circuit board 341 through the hinge structure 329 to the inside of the lens frame 302 and may be disposed in at least a portion of the inside of the lens frame 302 around the display device 301.

According to various embodiments, the electronic device 300 may include at least one light emitting unit 342. According to an embodiment, the light emitting unit 342 may emit light in a visible light band or an infrared (IR) band. According to an embodiment, the light emitting unit 342 may include a light emitting diode (LED). For example, the light emitting unit 342 may provide, e.g., information about the state of the electronic device 300 in the form of light. According to various embodiments, the light emitting unit 342 may provide a light source that interacts with, e.g., the operation of the first camera module 351. For example, the light emitting unit 342 may include an LED, an IR LED, and/or a xenon lamp.

According to various embodiments, the battery 343 (e.g., the battery 189 of FIG. 1) may be electrically connected with the light output module 311, the circuit board 341, the speaker module 345, the microphone module 347, and the camera module 350 of the electronic device 300 and may supply power to the light output module 311, the circuit board 341, the speaker module 345, the microphone module 347, and the camera module 350.

According to various embodiments, at least a portion of the battery 343 may be disposed in the wearing member 303. According to an embodiment, the battery 343 may be disposed in an end of the wearing member 303. For example, the batteries 343 may include a first battery 343a disposed in a portion 303a of the first wearing member of the wearing members 303 and a second battery 343b disposed in a portion 303b of the second wearing member. As described below, the electronic device 300 (e.g., the processor 401 of FIGS. 4 and 5A to 5D) may control to charge each battery (e.g., the first battery 343a and the second battery 343b) or to output (or discharge) a designated amount of current from each battery based on the power received from the outside (e.g., the power received from the charging device 207 of FIG. 2).

According to various embodiments, the speaker module 345 (e.g., the audio module 170 or the sound output module 155 of FIG. 1) may convert an electrical signal into sound. At least a portion of the speaker module 345 may be disposed in the wearing member 303 of the housing 310. According to an embodiment, the speaker module 345 may be located in the wearing member 303 to correspond to the user's ear. For example, the speaker module 345 may be disposed between the circuit board 341 and the battery 343.

According to various embodiments, the power transfer structure 346 may transfer the power from the battery 343 to an electronic component (e.g., the light output module 311) of the electronic device 300. For example, the power transfer structure 346 may be electrically connected to the battery 343 and/or the circuit board 341, and the circuit board 341 may transfer the power received from the battery 343 to the light output module 311 through the power transfer structure 346. According to an embodiment, the power transfer structure 346 may be connected to the circuit board 341 through the speaker module 345. For example, when the electronic device 300 is viewed from a side (e.g., in the Z-axis direction), the power transfer structure 346 may at least partially overlap the speaker module 345.

According to various embodiments, the power transfer structure 346 may be a component capable of transferring power. For example, the power transfer structure 346 may include a flexible printed circuit board or wiring. For example, the wiring may include a plurality of cables (not shown). The plurality of cables (e.g., two to six cables) may be connected (e.g., tied) in at least one set. According to various embodiments, the cross section of the power transfer structure 346 (e.g., the wire) may be formed in a circular or rectangular shape. In various embodiments, various changes may be made to the shape of the power transfer structure 346 considering the number and/or type of the cables. According to an embodiment, the power transfer structure 346 may include a single power line (e.g., a Vbus line or Vsys line) for charging the first battery 343a and the second battery 343b, providing power to the components or devices disposed in each of the first structure 312 and the second structure 313, and/or discharging to maintain power balancing. This is described below in detail.

According to various embodiments, the microphone module 347 (e.g., the input module 150 and/or the audio module 170 of FIG. 1) may convert a sound into an electrical signal. According to an embodiment, the microphone module 347 may be disposed in at least a portion of the lens frame 302. For example, at least one microphone module 347 may be disposed on a lower end (e.g., in the −x-axis direction) and/or on an upper end (e.g., in the +x-axis direction) of the electronic device 300. According to various embodiments, the electronic device 300 may more clearly recognize the user's voice using voice information (e.g., sound) obtained by the at least one microphone module 347. For example, the electronic device 300 may distinguish the voice information from the ambient noise based on the obtained voice information and/or additional information (e.g., low-frequency vibration of the user's skin and bones). For example, the electronic device 300 may clearly recognize the user's voice and may perform a function of reducing ambient noise (e.g., noise canceling).

According to various embodiments, the camera module 350 may capture a still image and/or a video. The camera module 350 may include at least one of a lens, at least one image sensor, an image signal processor, or a flash. According to an embodiment, the camera module 350 may be disposed substantially in the lens frame 302 and may be disposed around the display device 301.

According to various embodiments, the camera module 350 may include at least one first camera module 351. According to an embodiment, the first camera module 351 may capture the user's motion through a first optical hole 321 formed in the lens frame 302. For example, the first camera module 351 may capture the user's gesture (e.g., a hand gesture). The first camera module 351 and/or the first optical hole 321 may be disposed in each of two opposite ends of the lens frame 302 (e.g., a side end of the first lens frame 304 connected with the first wearing member 306 and a side end of the second lens frame 305 connected with the second wearing member 307). According to an embodiment, the first camera module 351 may be a global shutter (GS)-type camera. For example, the first camera module 351 may be a camera supporting 3DoF (degrees of freedom) or 6DoF, which may provide position recognition and/or motion recognition in a 360-degree space (e.g., omni-directionally). According to an embodiment, the first camera modules 351 may be stereo cameras and may perform the functions of simultaneous localization and mapping (SLAM) and user motion recognition using a plurality of global shutter-type cameras with the same specifications and performance.

According to an embodiment, the first camera module 351 may include an infrared (IR) camera (e.g., a time of flight (TOF) camera or a structured light camera). For example, the IR camera may be operated as at least a portion of a sensor module (e.g., the sensor module 176 of FIG. 1) for detecting a distance from the subject.

According to various embodiments, the camera modules 350 may include at least one second camera module 353. According to an embodiment, the second camera module 353 may capture an external image. According to an embodiment, the second camera module 353 may be a global shutter-type or rolling shutter (RS)-type camera. According to an embodiment, the second camera module 353 may capture an external image through the second optical hole 233 formed in the second frame 302b. For example, the second camera module 353 may include a high-resolution color camera, and it may be a high resolution (HR) or photo video (PV) camera. Further, the second camera module 353 may provide an auto-focus (AF) function and an optical image stabilizer (OIS) function.

According to various embodiments (not shown), the electronic device 300 may include a light emitting unit (not shown) in a position adjacent to the second camera module 353. For example, the light emitting unit (not shown) may provide light for increasing brightness (e.g., illuminance) around the electronic device 300 when an external image is obtained by the second camera module 353, thereby reducing difficulty in obtaining an image due to the dark environment, the mixing of various light beams, and/or the reflection of light.

According to various embodiments, the camera modules 350 may include at least one third camera module 355. According to an embodiment, the third camera module 355 may capture the trajectory of the user's eye (e.g., a pupil) or gaze. For example, the third camera module 355 may capture the reflection pattern of the light emitted by the light emitting unit 342 to the user's eyes. For example, the light emitting unit 342 may emit light in an infrared band for tracking the trajectory of the gaze using the third camera module 355. For example, the light emitting unit 342 may include an IR LED. According to an embodiment, the processor (e.g., the processor 120 of FIG. 1) may adjust the position of the virtual image so that the virtual image projected on the display device 301 corresponds to the direction in which the user's pupil gazes. According to an embodiment, the third camera module 355 may include a global shutter (GS)-type camera and may track the trajectory of the user's eye or gaze using a plurality of third camera modules 355 having the same specifications and performance.

According to various embodiments, the third camera module 355 may periodically or aperiodically transmit information related to the trajectory of the user's eye or gaze (e.g., trajectory information) to the processor. According to another embodiment, when the third camera module 355 detects a change in the user's gaze based on the trajectory information (e.g., when the user's eyes move more than a reference value with the head positioned still), the third camera module 355 may transmit the trajectory information to the processor.

According to an embodiment, at least one of the first camera module 351 and the third camera module 355 may be replaced with a sensor module (e.g., the sensor module 176 of FIG. 1). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be referred to as a photo detector or a photo sensor.

According to an embodiment, at least one of the first camera module 351, the second camera module 353, and the third camera module 355 may include a plurality of camera modules (not shown). For example, the second camera module 353 may include a plurality of lenses (e.g., wide-angle and telephoto lenses) and image sensors and may be disposed on one surface (e.g., a surface facing in the −Y axis) of the electronic device 300. For example, the electronic device 300 may include a plurality of camera modules having different properties (e.g., angle of view) or functions and control to change the angle of view of the camera module based on the user's selection and/or trajectory information. At least one of the plurality of camera modules may be a wide-angle camera and at least another of the plurality of camera modules may form a telephoto camera.

According to various embodiments, the processor (e.g., processor 120 of FIG. 1) may determine the motion of the electronic device 300 and/or the user's motion using information for the electronic device 300 obtained using at least one of a gesture sensor, a gyro sensor, or an acceleration sensor of the sensor module (e.g., the sensor module 176 of FIG. 1) and the user's action (e.g., approach of the user's body to the electronic device 300) obtained using the first camera module 351. According to an embodiment, in addition to the above-described sensor, the electronic device 300 may include a magnetic (geomagnetic) sensor capable of measuring an orientation using a magnetic field and magnetic force lines and/or a hall sensor capable of obtaining motion information (e.g., moving direction or distance) using the strength of a magnetic field. For example, the processor may determine the motion of the electronic device 300 and/or the user's motion based on information obtained from the magnetic (geomagnetic) sensor and/or the hall sensor.

According to various embodiments (not shown), the electronic device 300 may perform an input function (e.g., a touch and/or pressure sensing function) capable of interacting with the user. For example, a component configured to perform a touch and/or pressure sensing function (e.g., a touch sensor and/or a pressure sensor) may be disposed in at least a portion of the wearing member 303. The electronic device 300 may control the virtual image output through the display device 301 based on the information obtained through the components. For example, a sensor associated with a touch and/or pressure sensing function may be configured in various types, e.g., a resistive type, a capacitive type, an electro-magnetic (EM) type, or an optical type. According to an embodiment, the component configured to perform the touch and/or pressure sensing function may be identical in whole or part to the configuration of the input module 150 of FIG. 1.

According to various embodiments, the electronic device 300 may including a reinforcing member 360 that is disposed in an inner space of the lens frame 302 and formed to have a higher rigidity than that of the lens frame 302.

According to various embodiments, the lens frame 302 may include a hinge cover 327 that may conceal a portion of the hinge structure 329. Another part of the hinge structure 329 may be received or hidden between an inner case 331 and an outer case 333, which are described below.

According to various embodiments, the wearing member 303 may include the inner case 331 and the outer case 333. The inner case 331 may be, e.g., a case configured to face the user's body or directly contact the user's body and may be formed of a material having low thermal conductivity, e.g., a synthetic resin. According to an embodiment, the inner case 331 may include an inner side surface 331c facing the user's body. The outer case 333 may include, e.g., a material (e.g., a metal) capable of at least partially transferring heat and may be coupled to the inner case 331 to face each other. According to an embodiment, the outer case 333 may include an outer side surface 331d opposite to the inner side surface 331c. In an embodiment, at least one of the circuit board 341 or the speaker module 345 may be received in a space separated from the battery 343 in the wearing member 303. In the illustrated embodiment, the inner case 331 may include a first case 331a including the circuit board 341 or the speaker module 345 and a second case 331b receiving the battery 343, and the outer case 333 may include a third case 333a coupled to face the first case 331a and a fourth case 333b coupled to face the second case 331b. For example, the first case 331a and the third case 333a may be coupled (hereinafter, "first case portions 331a and 333a") to receive the circuit board 341 and/or the speaker module 345, and the second case 331b and the fourth case 333b may be coupled (hereinafter, "second case portions 331b and 333b") to receive the battery 343 or a connecting terminal (e.g., the connecting terminal 348 of FIG. 3D).

According to various embodiments, the first case portions 331a and 333a may be rotatably coupled to the lens frame 302 through the hinge structure 329, and the second case portions 331b and 333b may be connected or mounted to the ends of the first case portions 331a and 333a through the connecting member 335. In some embodiments, a portion of the connecting member 335 in contact with the user's body may be formed of a material having low thermal conductivity, e.g., an elastic material, such as silicone, polyurethane, or rubber, and another portion thereof which does not come into contact with the user's body may be formed of a material having high thermal conductivity (e.g., a metal). For example, when heat is generated from the circuit board 341 or the battery 343, the connecting member 335 may block heat transfer to the portion in contact with the user's body while dissipating or discharging heat through the portion not in contact with the user's body. According to an embodiment, a portion of the connecting member 335 configured to come into contact with the user's body may be interpreted as a portion of the inner case 331, and a portion of the connecting member 335 that does not come into contact with the user's body may be interpreted as a portion of the outer case 333.

According to various embodiments, other components (e.g., the antenna module 197 of FIG. 1) may be further included in addition to the illustrated components, and information regarding an object or environment may be received from an external electronic device (e.g., the electronic device 102 or 104 or server 108 of FIG. 1) through a network (e.g., the first network 198 or second network 199 of FIG. 1) using the communication module 190.

Figure 3D:
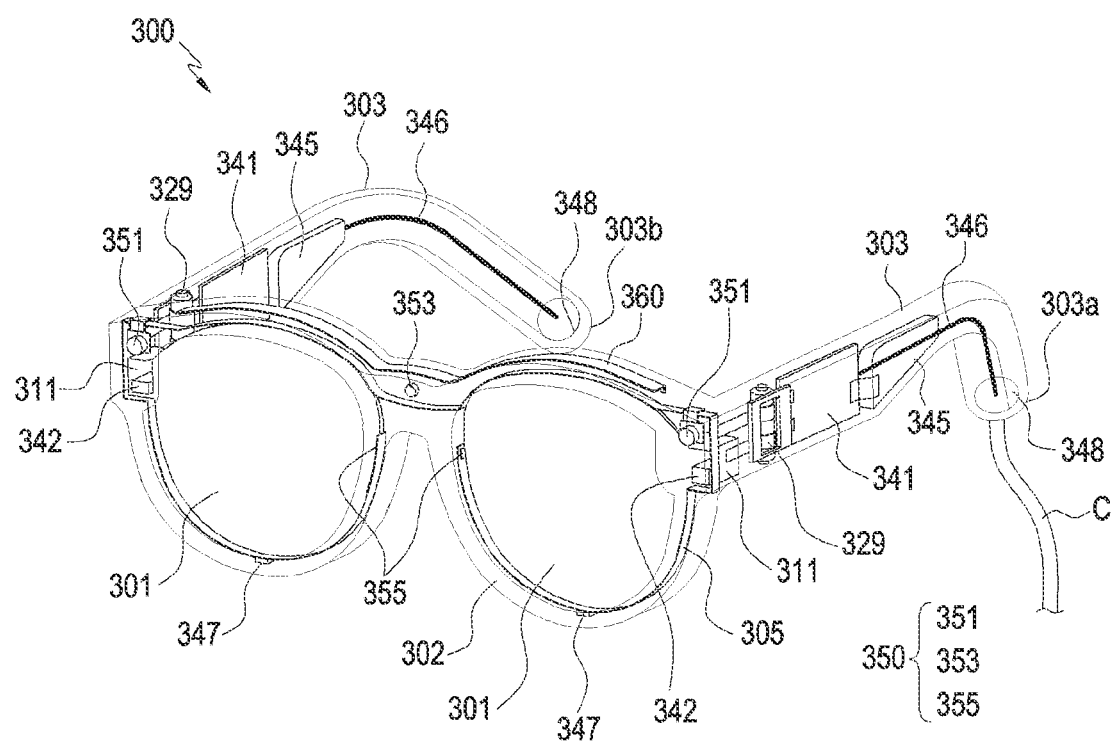
FIG. 3D is a perspective view illustrating an internal configuration of a wearable electronic device according to various embodiments.

FIG. 3D is a perspective view illustrating an internal configuration of a wearable electronic device according to various embodiments.

Referring to FIG. 3D, the electronic device 300 may receive power from an external electronic device (e.g., the electronic device 102 or 104 of FIG. 1, and the charging device 207 of FIG. 2). For example, the electronic device 300 does not include a battery (e.g., the battery 343 of FIG. 3B) therein and supplies power to electronic components (e.g., the light output module 311, the speaker module 345, and the camera module 350) using an external power supply source. The configuration of the housing 300, the light output module 311, the speaker module 345, the power transfer structure 346, and the camera module 350 of FIG. 3D may be identical in whole or part to the configuration of the housing 300, the light output module 311, the speaker module 345, the power transfer structure 346, and the camera module 350 of FIGS. 3B and 3C.

According to various embodiments, the electronic device 300 may include a connecting terminal 348 (e.g., the connecting terminal 178 of FIG. 1) configured to be electrically connected with an external electronic device (e.g., the electronic device 102 or 104 of FIG. 1, and the charging device 207 of FIG. 2). According to an embodiment, the connecting terminal 348 may be a universal serial bus (USB) connector.

According to various embodiments, the power transfer structure 346 may be electrically connected with the external electronic device (e.g., the electronic device 102 or 104 of FIG. 1 and the charging device 207 of FIG. 2) through the connecting terminal 348 and may transfer the power received from the external electronic device to an electronic component (e.g., the circuit board 341) of the electronic device 300.

According to various embodiments, the connecting terminal 348 may be disposed in at least a portion of the display member 303. According to an embodiment, the speaker module 345 may be disposed between the circuit board 341 and the connecting terminal 348. According to an embodiment, the connecting terminal 348 may be disposed in at least one of the ends 303a and 303b of the wearing member 303. For example, the electronic device 300 may use a connecting terminal 348 disposed in the first end 303a and/or a connecting terminal (e.g., 348) disposed in the second end 303b to receive power from external electronic device (e.g., the electronic device 102 or 104 of FIG. 1, and the charging device 207 of FIG. 2). For example, the connecting terminal 348 of the electronic device 300 may be electrically connected with the external electronic device (e.g., the electronic device 102 or 104 of FIG. 1 and the charging device 207 of FIG. 2) using the cable C.

Figure 3E:
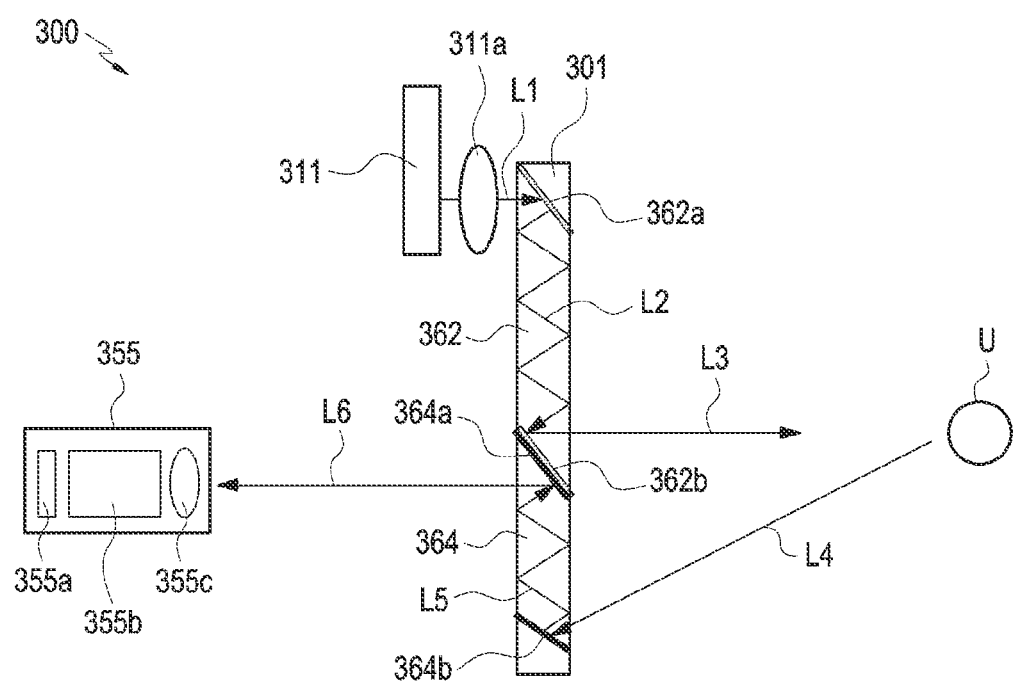
FIG. 3E is a view schematically illustrating a display device according to various embodiments of the disclosure.

FIG. 3E is a view schematically illustrating a display device according to various embodiments.

Referring to FIG. 3E, an electronic device 300 may include a display device 301 and a third camera module 355. The configuration of the display device 301 and the third camera module 355 of FIG. 3E may be identical in whole or part to the configuration of the display device 301 and the third camera module 355 of FIG. 3B.

According to various embodiments, the display device 301 may transfer the light transferred from the light output module 311 to the user U (e.g., the user's eyes). According to an embodiment, the display device 301 may include a first waveguide 362 (e.g., a waveguide) for guiding the light generated by the light output module 311. For example, first light L1 emitted from the light output module 311 may be transferred to the first waveguide 362 through the lens 311a. The first waveguide 362 may include an input optical member 362a and an output optical member 362b. The propagation direction of the light (e.g., the first light L1) transferred to the first waveguide 362 may be changed by the optical member (e.g., the input optical member 362a or the output optical member 362b). For example, the first light L1 is incident on the first waveguide 362 by the input optical member 362a (e.g., second light L2), and the propagation direction of the light emitted from the first waveguide 362 may be changed by the output optical member 362b to the user U (e.g., third light L3).

According to various embodiments, the display device 301 may transfer the image of the user U's eye to the third camera module 355. For example, the display device 301 may include the second waveguide 364 for guiding the light (e.g., fourth light L4) reflected from the user U's eye (e.g., the pupil) to the third camera module 355. The light reflected from the user U's eye may be transferred to the display device 301 through the second waveguide 364, and the light (e.g., fifth light L5) transferred to the display device 301 may be transferred to the third camera module 355. According to an embodiment, the second waveguide 364 may include a second light splitter 364b configured to change the direction of the light (e.g., the fourth light L4) incident from the outside of the electronic device 300 and a first light splitter 364a configured to change the direction of the light (e.g., the fifth light L5) that has passed through the second waveguide 364. According to an embodiment, the light (e.g., the fifth light L5) passing through the second waveguide 364 may be changed in propagation direction by the first light splitter 364a to the third camera module 355 (e.g., sixth light L6).

According to various embodiments, the third camera module 355 may include an image sensor 355a, an optical system 355b, and at least one lens 355c. The third camera module 355 may use the image sensor 355a, the optical system 355b, and at least one lens 355c to capture the trajectory of the user U's eye (e.g., pupil). For example, the third camera module 355 may use the light (e.g., the sixth light L6) reflected by the first light splitter 364a of the second waveguide 364 to capture the trajectory of the user U's eye (e.g., pupil).

According to various embodiments, the first waveguide 362 and/or the second waveguide 364 may be free-form waveguides. The free-form first waveguide 362 may provide the light generated by the light output module 311 to the user U using the input optical member 362a and the output optical member 362b. The free-form second waveguide 364 may transfer the light reflected from the user U to the third camera module 355 using the first optical splitter 364a and the second optical splitter 364b. According to an embodiment, the position of the light provided from the light output module 311 to the user U may be determined based on the light (e.g., the trajectory of the gaze) reflected from the user U transferred to the third camera module 355.

According to various embodiments, the input optical member 362a and the output optical member 362b of the first waveguide 362, and the first optical splitter 364a and the second optical splitter 364b of the second waveguide 364 may include at least one of at least one diffractive element (e.g., a diffractive optical element (DOE), a holographic optical element) and/or at least one reflective element (e.g., a reflective mirror). According to an embodiment, the at least one diffractive element may include the input optical member 362a and/or the output optical member 362b. According to an embodiment, the at least one reflective element may include the first optical splitter 364a and/or the second optical splitter 364b configured to perform total internal reflection (TIR). According to various embodiments, the first waveguide 362 and/or the second waveguide 364 may include glass, plastic, or a polymer, and a grating structure may be included in at least a portion (inside or outside) of the first waveguide 362 and/or the second waveguide 364. The grating structure may be formed in a polygonal or curved shape, and it may include a nanopattern. For example, the light (e.g., the first light L1 or the fourth light L4) transferred from the light output module 311 and/or the user U may be changed in propagation direction by the nanopattern.

A configuration of the above-described wearable device (e.g., the external electronic device 205 of FIG. 2 or the electronic device 300 of FIGS. 3A and 3B) (hereinafter, an electronic device 400) is described below.

Figure 4:
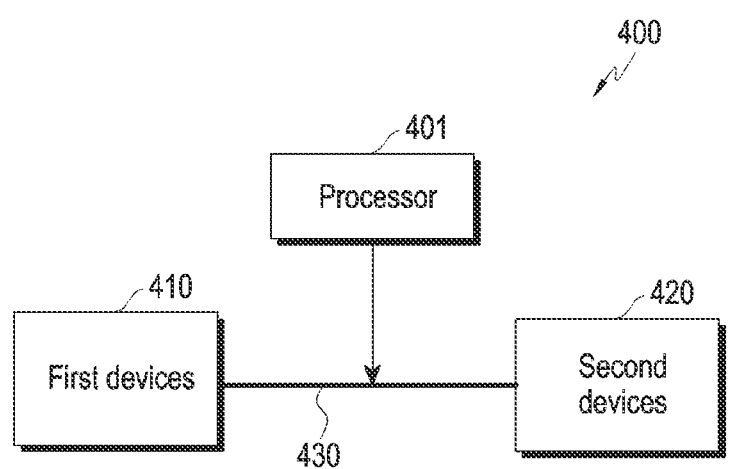
FIG. 4 is a view illustrating an example of a configuration of a wearable device according to various embodiments.

FIG. 4 is a view illustrating an example of a configuration of a wearable device according to various embodiments.

According to various embodiments, the electronic device 400 may include a first devices 410, a second devices 420, a power line (or power lane) 430 connecting the first devices 410 and the second devices, and/or a processor 401 (e.g., the processor 120 of FIG. 1) as illustrated in FIG. 4.

According to various embodiments, the first devices 410 and the second devices 420 may be disposed in different portions of the electronic device 400. For example, the first devices 410 may include devices disposed in the first structure 312 (e.g., the first lens frame 304 and the first wearing member 306), and the second devices 420 may include devices disposed in the second structure 313 (e.g., the second lens frame 305 and the second wearing member 307). The first devices 410 and the second devices 420 may include various devices (e.g., the display device 301, the light output module 311, and the circuit board 341) as described above with reference to FIGS. 3A to 3E.

According to various embodiments, different types of devices may be disposed in the first structure 312 and the second structure 313. For example, as described below, the first devices 410 disposed in the first structure 312 may include a camera (e.g., some of the camera modules 350 of FIGS. 3B to 3D, disposed in the first structure 312), a display (e.g., some of the display devices 301 of FIGS. 3A to 3D, disposed in the first structure 312), a power management IC (e.g., the power management module 188 of FIG. 1), a speaker (e.g., some of the speaker modules 345 of FIGS. 3B to 3D, disposed in the first structure 312), and a battery (e.g., the first battery 343a of FIGS. 3B to 3D), and the second devices 420 disposed in the second structure 313 may include a camera (e.g., some of the camera modules 350 of FIGS. 3B to 3D, disposed in the second structure 313), a display (e.g., some of the display devices 301 of FIGS. 3A to 3D, disposed in the second structure 313), a communication module (e.g., the communication module 190 of FIG. 1), a speaker (e.g., some of the speaker modules 345 of FIGS. 3B to 3D, disposed in the second structure 313), various driver circuits (not shown), a touch sensor circuit (not shown), and a battery (e.g., the second battery 343b of FIGS. 3B to 3D). The devices included in the first devices 410 and the second devices 420 are merely examples and are not limited thereto and may include various types of components and/or devices. As the components or devices disposed in the first structure 312 and the second structure 313 differ in type, the remaining battery times of the batteries (e.g., a first battery 343a and a second battery 343b) disposed in the structures may differ. Meanwhile, without limitations to what has been described, the devices included in the first structure 312 and the second structure 313 may be implemented to correspond in type to each other (or identical).

According to various embodiments, the first devices 410 and the second devices 420 may include a single power lane (or power line) 430 as illustrated in FIG. 4. The description of the power transfer structure 364 made in connection with FIGS. 3A to 3E may be applied to the power line 430, and no duplicate description is thus given below. For example, the first battery 343a may be electrically connected to at least some of the second devices 420 through the power line 430, and that the second battery 343b may be electrically connected to at least some of the first devices 410 through the power line 430. A first end and second end of the single power line 430 may be connected to the first devices 410 or the second devices 420, as various examples. For example, the type of the single power line 430 may include a Vbus line and a Vsys line. An embodiment of the power line 430 is described below with reference to FIGS. 5A to 5D. As charging and discharging of the batteries disposed in the structures are controlled through the single power line 430 rather than a plurality of power lines, the resistance in the electronic device 400 may be reduced, and the efficiency of arrangement of the devices (e.g., the first devices 410 and the second devices 420) may be increased.

According to various embodiments, the processor 401 may be electrically and/or operatively connected to the first devices 410 and the second devices 420. The electrical connection means that the processor 401 is connected with the devices (e.g., the first devices 410 and the second devices 420) so that power, signals (e.g., control signals from the processor 401), information, and/or data may be transmitted and/or received therebetween. The operative connection may mean that the processor 401 is connected with the devices so that operations of the devices (e.g., the first devices 410 and the second devices 420) may be controlled by the processor 401.

According to various embodiments, the processor 401 may control charging and discharging of each of the first battery 343a and the second battery 343b based on designated information. The charging may be defined as providing power and/or current to the battery (first battery 343a or second battery 343b). The discharging may be defined as the output of power and/or current from the battery (the first battery 343a or the second battery 343b). For example, the processor 401 may control charging of each of the first battery 343a and the second battery 343b based on external power received from the electronic device 400. As another example, the processor 401 may control the amount of power (or the amount of current output from the first battery 343a) discharged from the first battery 343a through the power line 430 and the amount of power (or the amount of current output from the second battery 343b) discharged from the second battery 343b. For example, the processor 401 may control discharging of each battery (e.g., the first battery 343a and the second battery 343b) (e.g., control the amount of current output) based on the current capacity (or remaining capacity) of the first battery 343a and the current capacity (or, remaining capacity) of the second battery 343b. The current capacity may be referred to a remaining power, and/or a battery level. As another example, the processor 401 may control discharging of each battery (e.g., the first battery 343a and the second battery 343b) based on the usage time (or time driven) of the first devices 410 and the usage time (or time driven) of the second devices 420. An example operation for controlling charging and discharging of each battery (e.g., the first battery 343a and the second battery 343b) of the electronic device 400 (e.g., the processor 401) is described below in connection with FIGS. 7 to 18.

Examples of the above-described electronic device 400 of FIG. 4 (the electronic device 501 of FIG. 5A and the electronic device 502 of FIG. 5B) are described below in greater detail with reference to FIGS. 5A to 5D.

First, an example of an electronic device 501 including a first power line 431 (e.g., a Vbus line) that electrically connects the first charging/discharging circuit 530 and the second charging/discharging circuit 540 is described below.

Figure 5A:
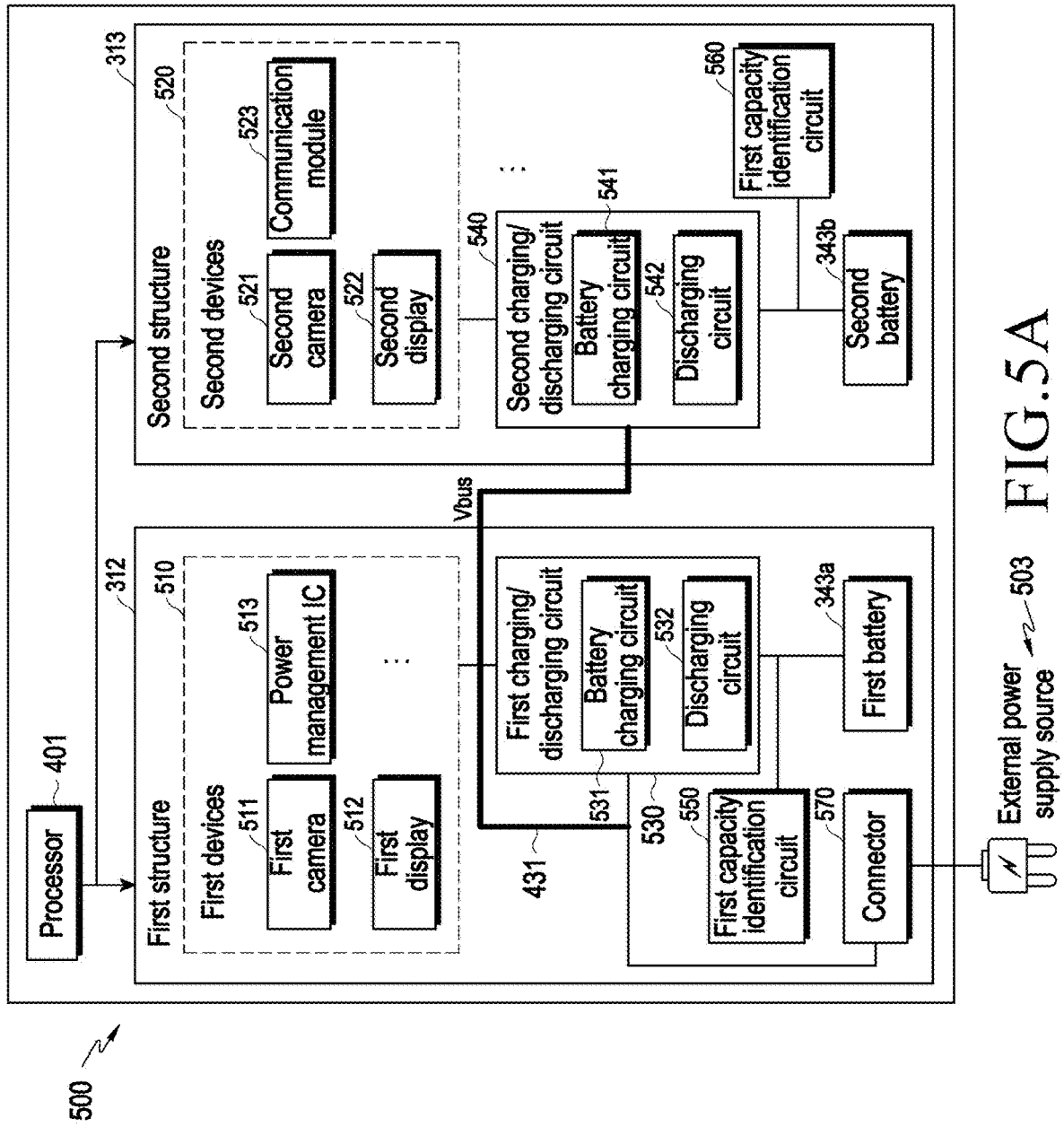
FIG. 5A is a view illustrating an example of a configuration of an electronic device including a first power line according to various embodiments.
Figure 5B:
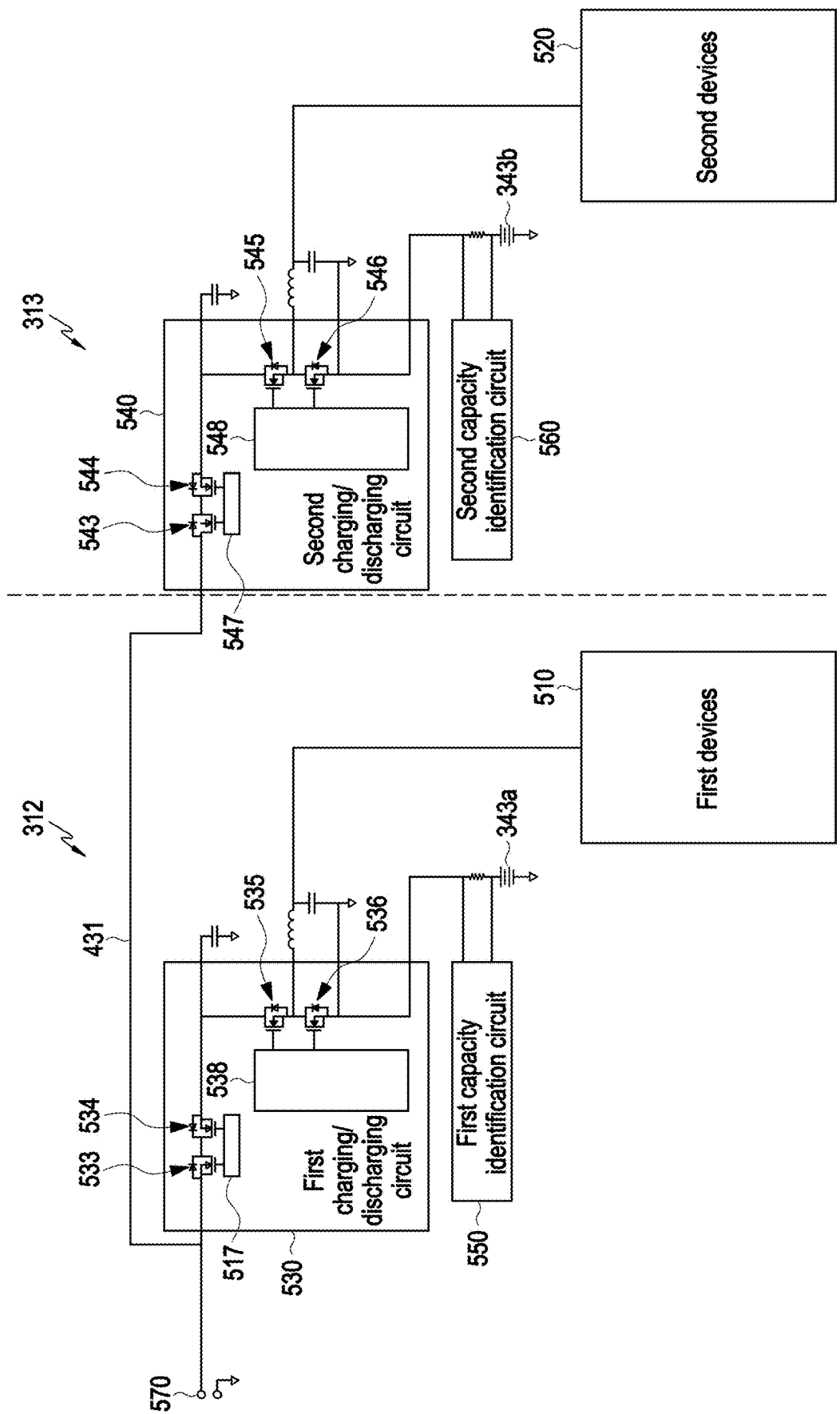
FIG. 5B is a view illustrating an example of a configuration of the electronic device illustrated in FIG. 5A according to various embodiments.

FIG. 5A is a view illustrating an example of an electronic device 501 including a first power line 431 according to various embodiments. Hereinafter, a configuration of the electronic device 601 of FIG. 5A is described with reference to FIG. 5B. FIG. 5B is a view illustrating an example of a configuration of the electronic device 501 of FIG. 5A according to various embodiments. Meanwhile, without being limited thereto, the electronic device 400 may be implemented to include more components or fewer components than those illustrated in FIGS. 5A and 5B. For example, the first devices 510 and the second devices 520 may include various types of devices (not shown) (e.g., speakers (e.g., the speaker modules 345 of FIGS. 3B to 3D, various driver circuits (not shown), and touch sensor circuits (not shown)) described above in connection with FIG. 4, in addition to a first camera 511, a first display 512, a power management IC 513, a second camera 521, a second display 522, and a communication module 523.

According to various embodiments, as illustrated in FIG. 5A, the electronic device 501 may include components (e.g., a connector 570, a plurality of first devices 510, a first charging/discharging circuit 530, a first capacity identification circuit 550, and a first battery 243a) provided in the above-described first structure 312 (e.g., the first lens frame 304 and the first wearing member 306), components (e.g., a plurality of second devices 520, a second charging/discharging circuit 540, a second capacity identification circuit 560, and a second battery 343b) provided in the above-described second structure 313 (e.g., the second lens frame 305 and the second wearing member 307), a first power line 431, and a processor 401. As described above, the processor 401 may be electrically and/or operatively connected with the devices (e.g., the first devices 510, the first charging/discharging circuit 530, the first capacity identification circuit 550, the second devices 520, the second charging/discharging circuit 540, and the second capacity identification circuit 560) provided in the structures of the electronic device 501. The first devices 510 and the second devices 520 may be implemented as the first devices 410 and the second devices 420 described above in connection with FIG. 4, and no duplicate description thereof is given below.

According to various embodiments, the first power line 431 (e.g., a Vbus line) may electrically connect the components for charging the batteries included in the structures (e.g., the first structure 312 and the second structure 313). For example, the first charging/discharging circuit 530 and the second charging/discharging circuit 540 may be electrically connected through the first power line 431, and the connector 570 may be electrically connected with the second charging/discharging circuit 540 through the first power line 431. A first end of the first power line 431 may be electrically connected to the connector 570 and the first charging/discharging circuit 530, and a second end of the first power line 431 may be electrically connected to the second charging/discharging circuit 540.

According to various embodiments, the electronic device 501 may receive external power through the connector 570 provided in the first structure 312. For example, the electronic device 501 may receive external power from an external power supply source 503 (e.g., the charging device 207 of FIG. 2) implemented to provide external power through the connector 570. The connector 570 may include connectors including a USB connector (e.g., a USB C type connector) and/or a designated number of pins (e.g., 5-pin, 8-pin, 11-pin, 24-pin, or 30-pin). The external power received through the connector 570 may be transferred to the first charging/discharging circuit 530 and the second charging/discharging circuit 540, which is described below with reference to FIGS. 6 to 8. According to various embodiments, the electronic device 501 (e.g., the processor 401) may use charging/discharging circuits (e.g., the first charging/discharging circuit 530 and the second charging/discharging circuit 540) to supply power (or current) to other components. Each of the charging/discharging circuits may include elements (e.g., resistors, capacitors, inductors, and field effect transistors (e.g., MOSFETs), junction-type transistors (e.g., bipolar junction transistors (BJTs)) for providing the function of supplying power (or current) to other components and various control circuits for controlling the devices. For example, as illustrated in FIG. 5B, each of the charging/discharging circuits 530 and 540 may include a plurality of MOSFETs 533, 534, 535, and 536, and 543, 544, 545, and 546, and control circuits 537 and 538 and 547 and 548 to control the plurality of MOSFETs 533, 534, 545 and 536, and 543, 544, 545 and 546 (e.g., controlling whether to apply voltage to the gate to thereby control the turn-on or off the MOSFET). The processor 401 may directly control the elements included in the charging/discharging circuits or may control the control circuits to thereby supply power (or current) to other components. Each example (e.g., power supply to the batteries and power supply to other charging/discharging circuits) is described below.

For example, each charging/discharging circuit (e.g., the first charging/discharging circuit 530 or the second charging/discharging circuit 540) may include a battery charging circuit 531 and/or 541 implemented to charge (or having charging functionality) the battery by transferring (or supplying) the external power (or current) received through the connector 570 to the battery (e.g., the first battery 243a and/or the second battery 243b). For example, referring to FIG. 5B, each charging/discharging circuit (e.g., the first charging/discharging circuit 530 and/or the second charging/discharging circuit 540 may include four same-type (e.g., n-type) MOSFETs (e.g., first to fourth MOSFETs 533, 534, 545 and 536, or fifth to eighth MOSFETs 543, 544, 545 and 546), as the battery charging circuit 531 and/or 541, and power (or current) may be supplied to the battery or power supply may be cut off depending on a change in the state of the MOSFETs (e.g., the state of the MOSFET is turned on or off according to the voltage application to the gate of the MOSFET). An operation for charging each battery (e.g., the first battery 343a or the second battery 343b) using the battery charging circuit 531 or 541 (e.g., the charging circuit of the first battery 343a or the charging circuit of the second battery 343b) of the electronic device 501 (e.g., the processor 401) is described below with reference to FIGS. 6 to 8.

As another example, each charging/discharging circuit (e.g., the first charging/discharging circuit 530 and/or the second charging/discharging circuit 540) may including a discharging control circuit 532 and/or 542 implemented to transfer (or supply) power (or current) to the other charging/discharging circuit (e.g., the second charging/discharging circuit 540 and/or first charging/discharging circuit 540) disposed in the other structure. For example, the discharging control circuit 532 or 542 may include a circuit to boost the voltage at one end of one charging/discharging circuit connected to the first power line 431 to allow current to be provided to a component (e.g., the other charging/discharging circuit) of the other structure through the first power line 431. For example, the discharging control circuit 532 and/or 542 may include an OTG circuit having an OTG power supply function for providing current to the other structure or may be implemented as a switched capacitor for boosting voltage and providing current to the other structure. Further, the charging/discharging circuit (e.g., the first charging/discharging circuit 530 and/or the second charging/discharging circuit 540) may include elements to control the current discharged from the battery (e.g., control the amount of current), as the discharging control circuit 532 or 542. For example, referring to FIG. 5B, each charging/discharging circuit (e.g., the first charging/discharging circuit 530 or the second charging/discharging circuit 540) may include four same-type (e.g., n-type) MOSFETs (e.g., first to fourth MOSFETs 533, 534, 535 and 536, or fifth to eighth MOSFETs 543, 544, 545 and 546), as the discharging control circuit 532 or 542, and power (or current) may be transferred from the battery (e.g., the first battery 343a or the second battery 343b) disposed in one structure to the charging/discharging circuit disposed in the other structure depending on a change in the state of the MOSFETs (e.g., the turn-on or turn-off according to application of a gate voltage). An operation for controlling the charging of each battery (e.g., the first battery 343a or the second battery 343b) using the discharging control circuit (e.g., the first discharging control circuit 532 and the second discharging control circuit 542) of the electronic device 501 (e.g., the processor 401) is described below with reference to FIGS. 13 to 15.

Meanwhile, each charging/discharging circuit (e.g., the first charging/discharging circuit 530 and the second charging/discharging circuit 540) may be implemented to provide functions implemented in a well-known charging circuit other than those described above, and no detailed description thereof is presented below. For example, although not shown, each charging/discharging circuit may further include circuits, such as an AC/DC converter circuit or a rectifier circuit.

According to various embodiments, each capacity identification circuit (e.g., the first capacity identification circuit 550 or the second capacity identification circuit 560) may be implemented to identify the current capacity of each battery (e.g., the first battery 343a or the second battery 343a). Each capacity identification circuit may identify the current capacity of the battery based on the amount of current output from or transferred to the respective battery. For example, the capacity identification circuits may include a fuel gauge (or a gas gauge) implemented to detect the capacity of battery with a current integration scheme, as illustrated in FIG. 5B. The fuel gauge may include a resistor connected in series to the power line connected to one end of each battery (e.g., the first battery 243a or the second battery 243b) and a control circuit for measuring current, electrically connected in parallel to the resistor. The capacity identification circuits (e.g., the first capacity identification circuit 550 and the second capacity identification circuit 560) may identify the amount of current (e.g., the amount of current flowing per hour) output from or transferred to the batteries (e.g., measures the magnitude of the voltage applied to the resistor per time using the control circuit for measuring current and identifies the magnitude of current per hour based on the magnitude of the voltage and the resistance) and integrate the magnitude of the current per hour, thereby detecting the capacity of the battery. Further, without limitations to those described above, the above-described capacity identification circuits may include various circuits for detecting the current capacity (or, remaining capacity) of the battery other than the fuel gauge. The current capacity may be referred to a remaining power, and/or a battery level. As described below, the processor 401 may detect whether each battery is fully charged using the capacity identification circuit and may stop charging the battery when it is detected that the battery is fully charged. Further, without limitations to those described above, the electronic device 501 may include, instead of the capacity identification circuits, a full-charge identification circuit (not shown), which provides other functions to detect the full charge (e.g., a time control type, a charged voltage detection type (e.g., identify the reverse charged voltage near the full charge time or identify a charged voltage not less than a predetermined value), a type of identifying a temperature not lower than a predetermined value, or a type of identifying a temperature increment per hour) and detect whether the battery is fully charged using the included full-charge identification circuit.

An example of the electronic device 502 including a second power line 432 (e.g., a Vsys line) that electrically connects the first devices 510 and the second devices 520 is described below.

Figure 5C:
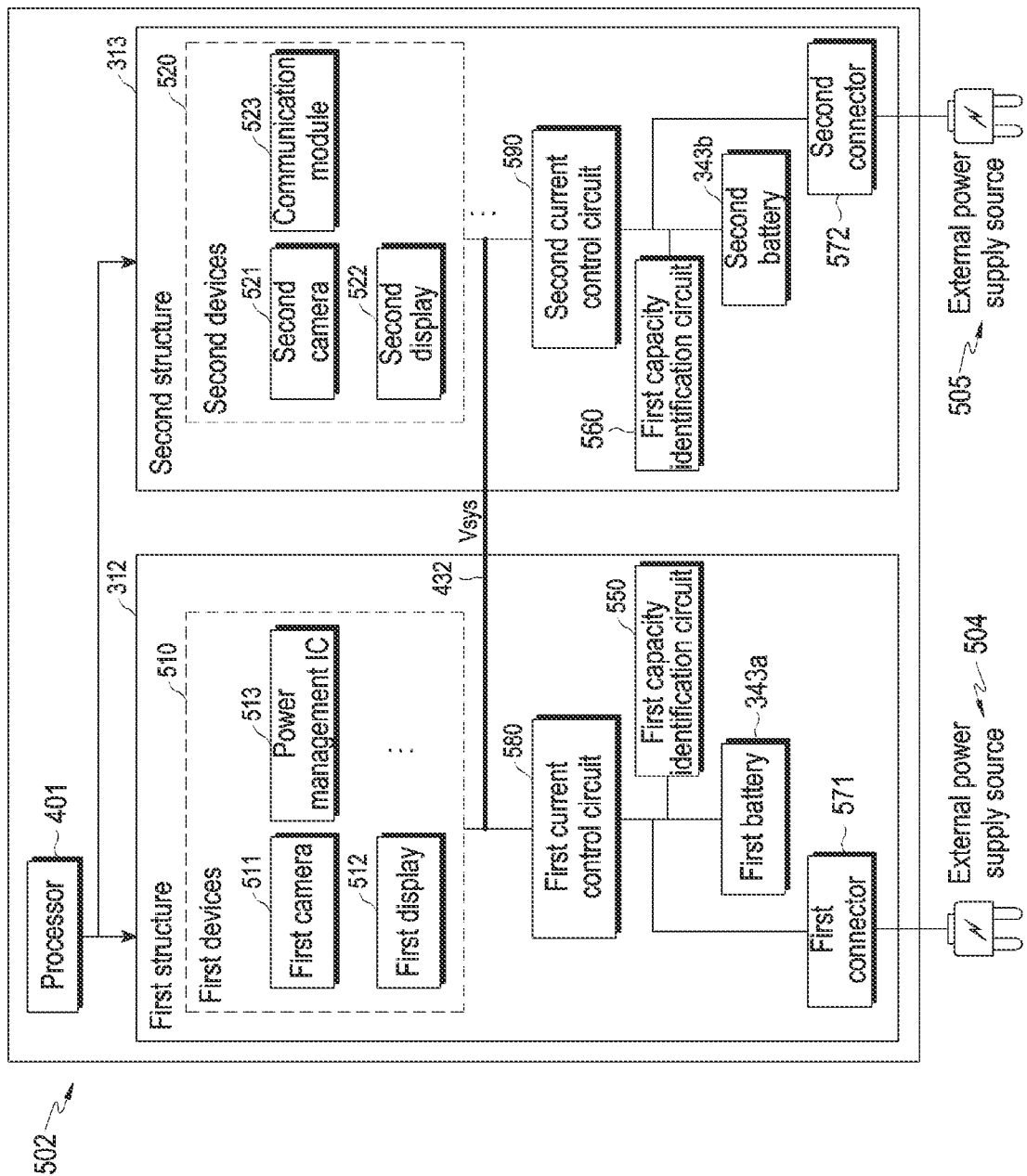
FIG. 5C is a view illustrating an example of a configuration of an electronic device including a second power line according to various embodiments.

FIG. 5C is a view illustrating an example of an electronic device 502 including a second power line 432 according to various embodiments. Hereinafter, a configuration of the electronic device 502 of FIG. 5C is described with reference to FIG. 5D. FIG. 5D is a view illustrating an example of a configuration of the electronic device 502 illustrated in FIG. 5C according to an embodiment.

According to various embodiments, as illustrated in FIG. 5C, the electronic device 502 may include components (e.g., a plurality of first devices 580, a first current control circuit 580, a first connector 571, a first capacity identification circuit 550, and a first battery 343a) provided in the above-described first structure 312 (e.g., the first lens frame 304 and the first wearing member 306), components (e.g., a plurality of second devices 520, a second current control circuit 590, a second connector 572, a second capacity identification circuit 560, and a second battery 343b) provided in the above-described second structure 313 (e.g., the second lens frame 305 and the second wearing member 307), a second power line 432, and a processor 401. No duplicate description of the components (e.g., the first and second devices 510 and 520, the capacity identification circuits 550 and 560, and the processor 401) described above in connection with FIG. 5A is given below.

According to various embodiments, the second power line 432 (e.g., a Vsys line) may electrically connect the first devices 510 and the second devices 520 included in the structures (e.g., the first structure 312 and the second structure 313). For example, a first end of the second power line 432 may be electrically connected to a power line connected to the plurality of first devices 510, and a second end of the second power line 432 may be electrically connected to a power line connected to the plurality of second devices 520.

According to various embodiments, each battery (e.g., first battery 343a and second battery 343b) may receive external power from an external power supply source 504 or 505 through a respective connector 570 (e.g., the first connector 571 or the second connector 572). For example, when the electronic device 502 is mounted on a charging device (e.g., the charging device 207 of FIG. 2), the first connector 571 of the electronic device 502 may be electrically connected to one connector of the charging device 207, and the second connector 572 may be electrically connected to another connector of the charging device 207. The charging device 207 may include the components of the charging/discharging circuits (e.g., 530 and 540) described above with reference to FIG. 5A. Further, the charging device 207 may include its own processor 401 and a communication module for communication with the electronic device 502. Without being limited thereto, the first connector 571 and the second connector 572 of the electronic device 502 may be electrically connected to an external power supply source other than the charging device 207.

According to various embodiments, the electronic device 502 (e.g., the processor 401) may use current control circuits (e.g., the first current control circuitry 580 and the second current control circuitry 590) to control the amount of current and/or the amount of power transferred from the battery disposed in one structure through the second power line 432 to the components (e.g., the other battery or devices) disposed in the other structure. For example, the first current control circuitry 580 and the second current control circuitry 590 may be implemented to control the amount of current output from the respective batteries (e.g., the first battery 343a or the second battery 343b) and block the current transferred to the respective batteries 343a and 343b. For example, the current control circuits 580 and 590 may include a limiter circuit and a clipper circuit. As an example, as illustrated in FIG. 5D, the current control circuit (e.g., the first current control circuit 580 or the second current control circuit 590) may include same-type (e.g., n-type) MOSFETs 581 and 582 and 591 and 592 and may include control circuits 583 and 593 for controlling the MOSFETs (e.g., control the turn-on or turn-off the MOSFET by controlling whether to apply voltage to the gate). The current control circuit illustrated in FIG. 5D is merely an implementation example and may be implemented as a limiter circuit or a clipper circuit providing the function of the current control circuit in various implementation examples (e.g., various elements). The electronic device 502 (e.g., the processor 401) may control each MOSFET or the control circuit, controlling the amount of current output from one battery through the current control circuit and controlling to cut off the current received from another component (e.g., through the second power line 432 from the other battery) to the current control circuit. A charging operation using the current control circuits of the electronic device 502 (e.g., the processor 401) is described below with reference to FIGS. 6 to 8, and a discharging operation is described below with reference to FIGS. 16 to 18.

Examples of operations of a wearable device (hereinafter, the electronic device 400) according to various embodiments are described below.

According to various embodiments, the electronic device 400 may charge batteries disposed in the structures based on external power received through the connector 570.

Figure 6:
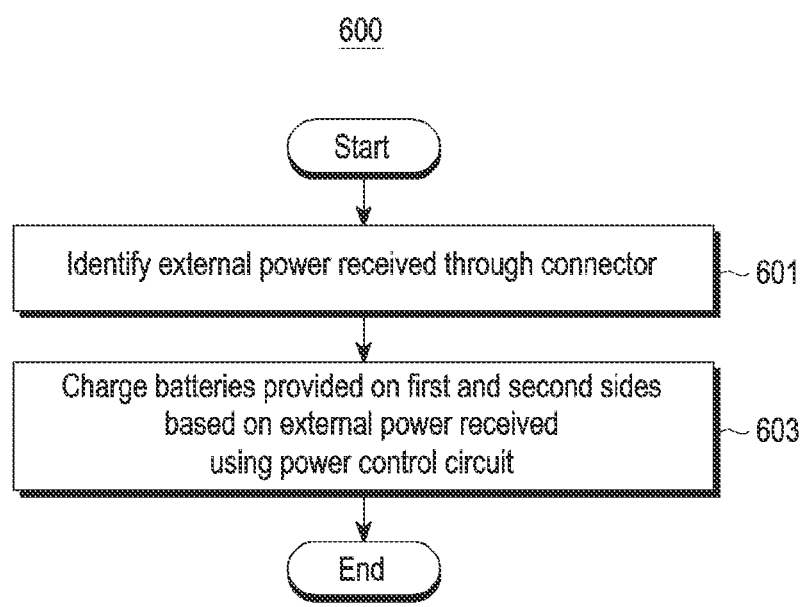
FIG. 6 is a flowchart illustrating an example of an operation of a wearable device according to various embodiments.

FIG. 6 is a flowchart 600 illustrating an example of an operation of a wearable device according to various embodiments. According to various embodiments, the operations shown in FIG. 6 are not limited to the shown order but may rather be performed in other various orders. According to various embodiments, more or less operations than those of FIG. 6 may be performed. FIG. 6 is described below with reference to FIGS. 7 and 8A and 8B

Figure 7:
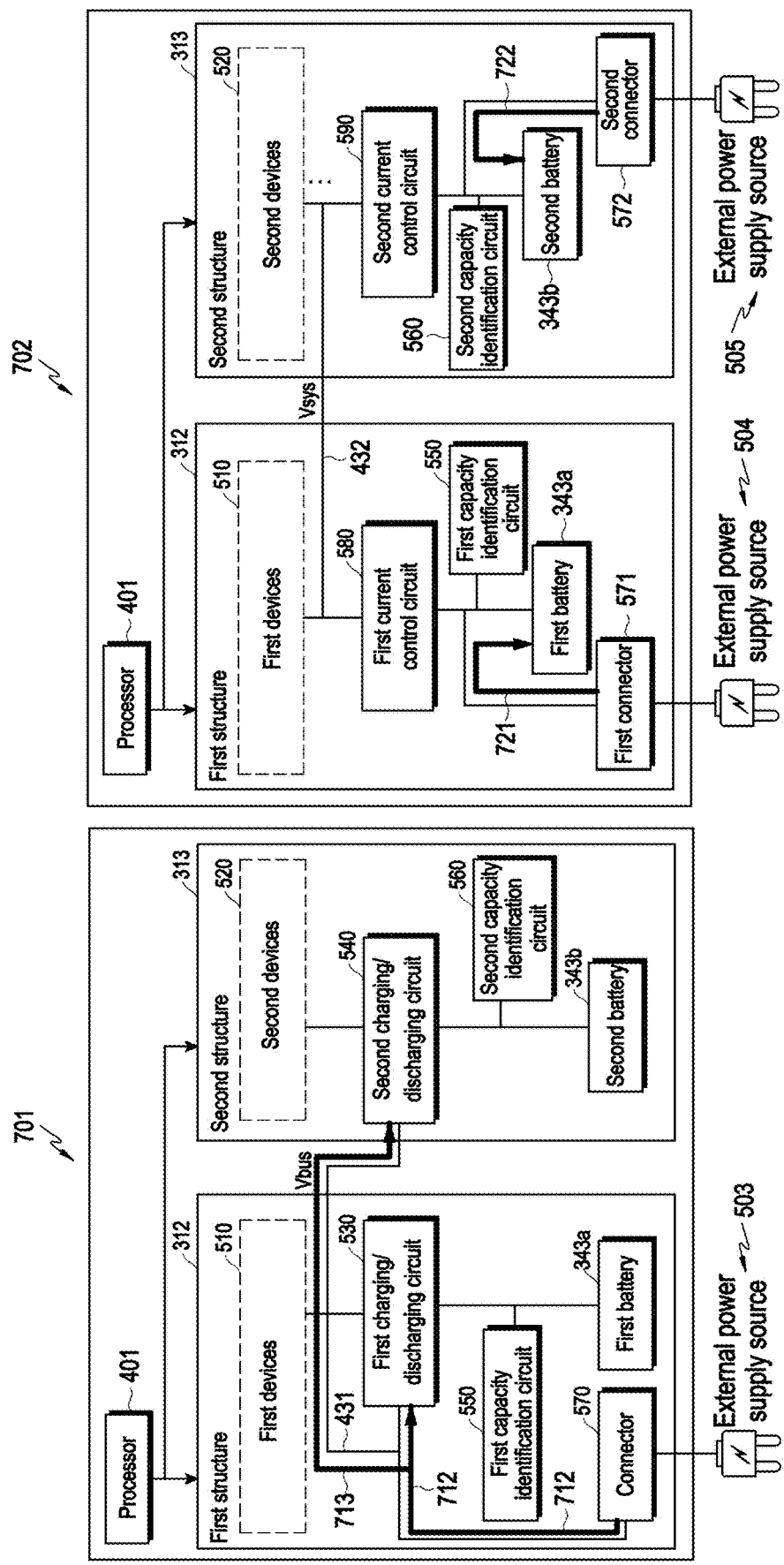
FIG. 7 is a view illustrating an example of a battery charging operation of a wearable device according to various embodiments.
Figure 8A:
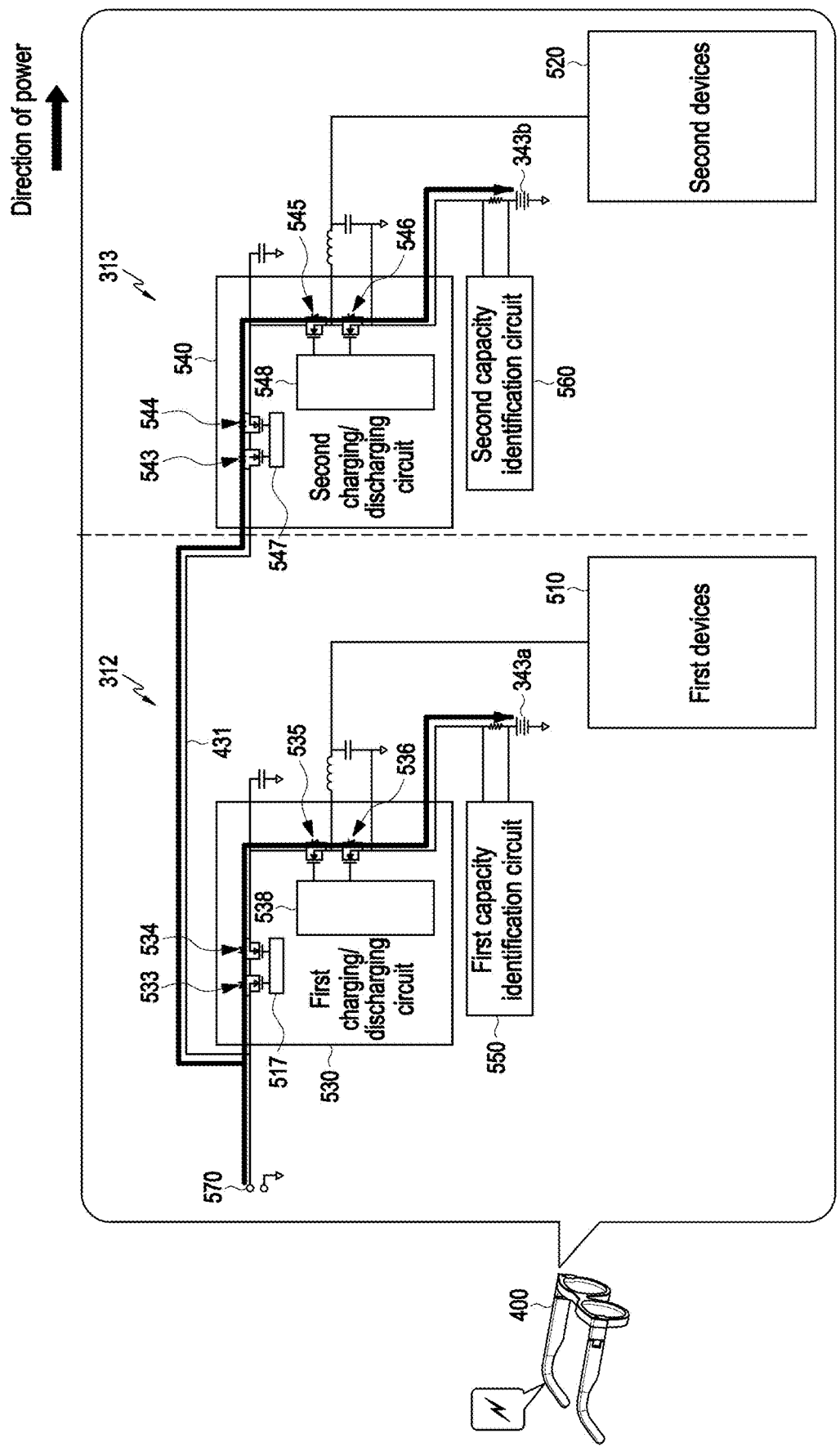
FIG. 8A is a view illustrating an example of a charging operation of a wearable device including a first power line (e.g., Vbus line) according to various embodiments.
Figure 8B:
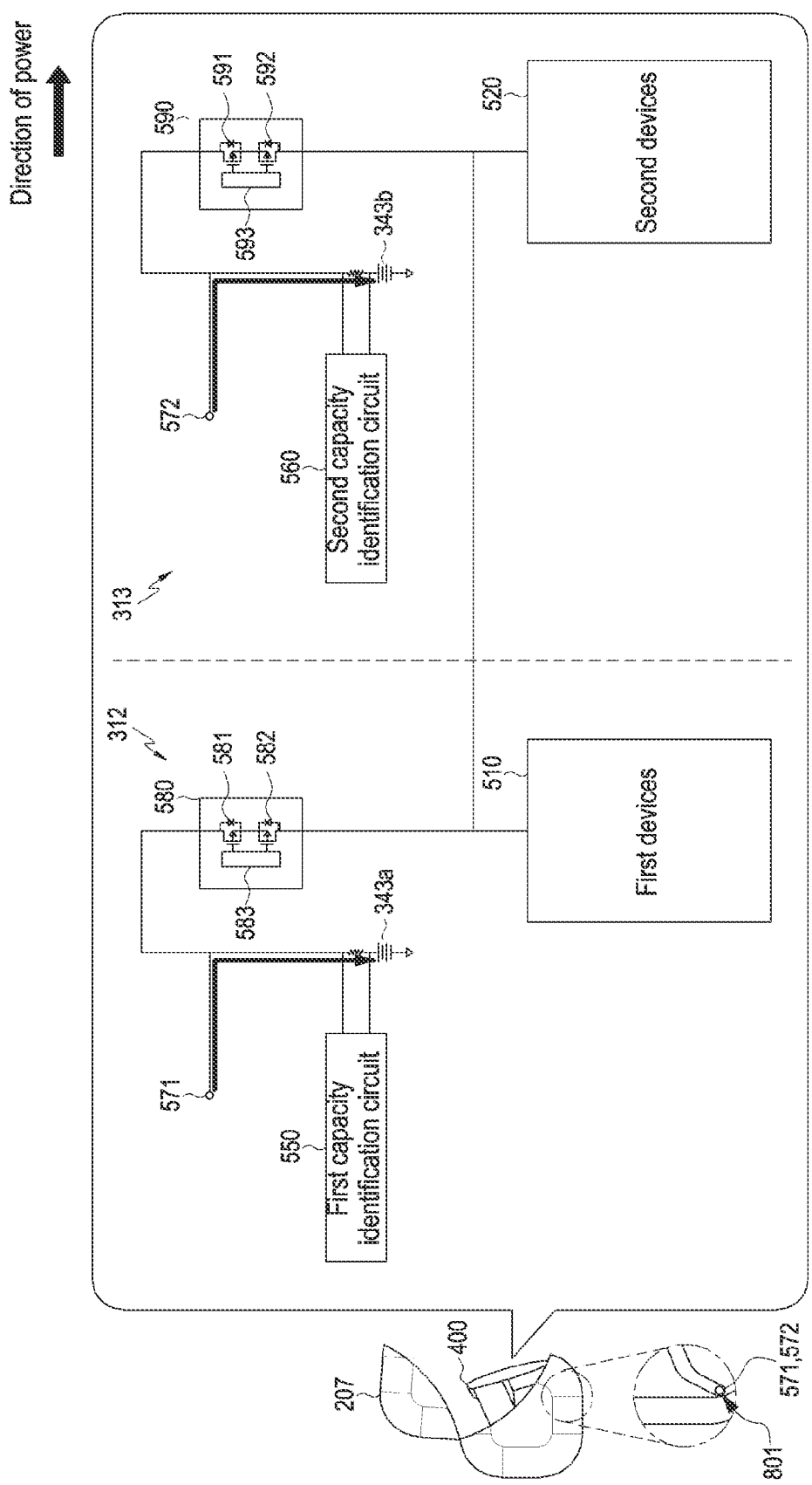
FIG. 8B is a view illustrating an example of a charging operation of a wearable device including a second power line (e.g., Vsys line) according to various embodiments.

FIG. 7 is a view illustrating an example of a battery charging operation of a wearable device according to various embodiments. FIG. 8A is a view illustrating an example of a charging operation of a wearable device including a first power line 431 (e.g., Vbus line) according to various embodiments. FIG. 8B is a view illustrating an example of a charging operation of a wearable device including a second power line 432 (e.g., Vsys line) according to various embodiments.

According to various embodiments, the electronic device 400 (e.g., the processor 401) may identify external power received through the connector 570 in operation 601. The electronic device 400 may be electrically connected to an external power supply source through the connector 570 and may identify reception of external power from the electrically connected external power supply source. For example, the electronic device 400 may be mounted on a charging device (e.g., the case-type charging device 207 of FIG. 2) and may be electrically connected to a connector included in the charging device through the connector 570 included in the electronic device 400. As another example, the electronic device 400 may be electrically connected to an external power supply source other than the charging device through the connector 570. An example of a charging operation according to implementation examples (e.g., the first power line 431 (Vbus line) of FIGS. 5A and 5B and the second power line 432 (Vsys line) of FIGS. 5C to 5D) of the power line of the above-described electronic device 400 is described below.

An example of a charging operation of the electronic device 501 including the first power line 431 described above with reference to FIGS. 5A and 5B is described below.

According to various embodiments, the electronic device 400 (e.g., the processor 401) may identify external power transferred through a connector 570 provided in one structure (or one side) to the charging/discharging circuit (e.g., the first charging/discharging circuit 530 or the second charging/discharging circuit 540) provided in each of the two structures (e.g., the first structure 312 and the second structure 313). For example, the connector 570 provided in (or provided on one side) of one structure (e.g., the first structure 312) of the electronic device 400 may be electrically connected to an external power supply source 503 and may receive external power (or external current). The external power (or external current) 711 received through the connector 570 may be transferred to the first charging/discharging circuit 530 through a line (e.g., a power line) connecting the connector 570 and the first charging/discharging circuit 530 as illustrated in 701 of FIG. 7. Further, the external power 711 received from the connector 570 may be transferred 713 to the second charging/discharging circuit 540 through the first power line 431 as illustrated in 701 of FIG. 7. The electronic device 400 (e.g., the first processor 401) may identify the external power 712 transferred to the first charging/discharging circuit 530 and the external power 713 transferred to the second charging/discharging circuit 540 based on the operation of controlling the first charging/discharging circuit 530 and the operation of controlling the second charging/discharging circuit 540, respectively. For example, as illustrated in FIG. 8A, the electronic device 400 may identify the external power received by the first MOSFET 533 of the first charging/discharging circuit 530 connected to the connector 570 and identify the external power received by the fifth MOSFET 543 of the second charging/discharging circuit 540 connected to the first power line 431.

An example of a charging operation of the electronic device 502 including the second power line 432 described above with reference to FIGS. 5C and 5D is described below.

According to various embodiments, the electronic device 400 (e.g., the processor 401) may identify external power transferred through each of the connectors 570 (e.g., the first connector 571 and the second connector 572) provided in two structures (or on two opposite sides) to the battery (e.g., the first battery 343a or the second battery 343b) of each of the two structures (e.g., the first structure 312 and the second structure 313). For example, the first connector 571 and the second connector 572 each provided in one structure (or on one side) of the electronic device 400, respectively, may be electrically connected to external power supply sources 504 and 505 (e.g., the connector (e.g., 801 of FIG. 8B) of the case-type charging device 207 of FIG. 2) to receive external power (or external current). The external power (or, external current) received through the first connector 571 may be transferred 721 to the first battery 343a through the power line connecting the first connector 571 and the first battery 343a as illustrated in 702 of FIG. 7. Further, the external power received from the second connector 572 may be transferred 722 to the second battery 343b through the power line as illustrated in 702 of FIG. 7. The electronic device 400 (e.g., the first processor 401) may identify the external power 721 and 722 received by the batteries 343a and 343b using the capacity identification circuits 550 and 560. For example, the electronic device 400 may detect a change in the amount of current (e.g., identify the amount of the current) transferred to each of the batteries (e.g., the first battery 343a and the second battery 343b) using the capacity identification circuit (e.g., the first capacity identification circuit 550 or the second capacity identification circuit 560) and may identify that the external power is transferred to each battery, based on the detection.

According to various embodiments, the electronic device 400 (e.g., the processor 401) may receive the external power based on information about the capacity of each of the batteries (e.g., the first battery 343a and the second battery 343b). For example, the electronic device 400 may wiredly and/or wirelessly transfer the information about the current capacity of the batteries (e.g., the first battery 343a and second battery 343b) using the capacity identification circuit (e.g., the first capacity identification circuit 550 or the second capacity identification circuit 560) to the charging device (e.g., the charging device 207 of FIG. 2). The current capacity may be referred to a remaining power, and/or a battery level. The information about the current capacities of the batteries may include at least one of information about the current remaining capacities of the batteries and information about the total capacity of the batteries, or information about the capacities required for the batteries. The charging device 207 may provide an amount of current corresponding to the remaining capacity of each battery to the respective battery based on the information about the capacities of the batteries. According to another embodiment, the electronic device 400 (e.g., the processor 401) may send a request for the required power (or current) to the charging device 207 based on the information about the current capacities of the batteries (e.g., the first battery 343a and the second battery 343b) detected using the capacity identification circuits (e.g., the first capacity identification circuit 550 and the second capacity identification circuit 560). As described below, since the remaining capacities of the batteries differ depending on the operation modes of the electronic device 400, the amounts of currents transferred to the batteries may be different.

According to various embodiments, the electronic device 400 (e.g., the processor 401) may charge the batteries (e.g., the first battery 343a and the second battery 343b) provided on the first and second sides based on the external power received in operation 603. For example, the electronic device 400 may transfer the external power to the batteries (e.g., the first battery 343a and the second battery 343b) provided in the two structures (e.g., the first structure 312 and the second structure 313) until a designated condition is met, thereby charging the batteries. For example, the designated condition may include when the capacity of the batteries (e.g., the first battery 343a and the second battery 343b) reaches a designated capacity or is identified as greater than or equal to the designated capacity. As another example, the designated condition may include when the full charging of the batteries is identified by the above-described full-charge identification circuit (not shown) (e.g., a circuit for identifying whether the battery is fully charged in a time control scheme, a scheme of detecting the charging voltage (e.g., identify the reverse charging voltage near the time of full charging or identify the charging voltage not less than a predetermined value), and/or a scheme of identifying the temperature not less than a predetermined value, or a scheme of identifying a temperature increment per hour).

An example of a charging operation of the electronic device 501 including the first power line 431 described above with reference to FIGS. 5A and 5B is described below.

According to various embodiments, the electronic device 400 (e.g., the processor 401) may charge the batteries (e.g., first battery 343a and second battery 343b) disposed in the respective structures (e.g., the first structure 312 and second structure 313) using the charging/discharging circuits (e.g., the first charging/discharging circuit 530 and the second charging/discharging circuit 540). For example, the electronic device 400 (e.g., the processor 401) may control each charging/discharging circuit to charge the respective battery (e.g., the first battery 343a and the second battery 343b) based on the external power received by each charging/discharging circuit (e.g., the first charging/discharging circuit 530 and the second charging/discharging circuit 540). As an example, as illustrated in FIG. 8A, the electronic device 400 (e.g., the first processor 401) may control to allow the external current (or external power) received by the first charging/discharging circuit 530 through the connector 570 to turn on the first to fourth MOSFETs 533, 534, 535, and 536 (e.g., apply voltage to the gate) so that the external current is transferred to the first battery 343a. In this case, the electronic device 400 (e.g., the processor 401) may charge the batteries in a charging scheme, such as a constant voltage (CV) scheme or a constant current (CC) scheme using each charging/discharging circuit. For example, the electronic device 400 may control the magnitude of the gate voltage applied to the first to fourth MOSFETs 533, 534, 545, and 536 illustrated in FIG. 8A to thereby control the amount of current output from each of the first to fourth MOSFETs 533, 534, 545, and 536, thereby controlling the amount of current transferred to the first battery 343a and/or the magnitude of the voltage applied to two opposite terminals of the first battery 343a upon charging the first battery 343a. As an example, like what has been described above, as illustrated in FIG. 8A, the electronic device 400 (e.g., the first processor 401) may control to allow the external current (or external power) received by the second charging/discharging circuit 540 from the connector 570 through the first power line 431 to turn on the fifth to eighth MOSFETs 543, 544, 545, and 546 (e.g., apply voltage to the gate) so that the external current is transferred to the second battery 343b. In this case, the electronic device 400 (e.g., the first processor 401) may identify whether each battery (e.g., the first battery 343a and the second battery 343b) is fully charged using the capacity identification circuit or a full-charge identification circuit (not shown) and, if full charging of each battery (e.g., the first battery 343a and second battery 343b) is identified, stop (or pause) the operation of charging each battery (e.g., the first battery 343a and the second battery 343b). For example, referring to FIG. 8A, the electronic device 400 (e.g., the first processor 401) may turn off the first and second MOSFETs 533 and 534 and the fifth and sixth MOSFETs 543 and 544, stopping (or blocking) the transfer of the external current (or external power) to each charging/discharging circuit.

An example of a charging operation of the electronic device 502 including the second power line 432 described above with reference to FIGS. 5C and 5D is described below.

According to various embodiments, the electronic device 400 (e.g., the processor 401) may transfer the external current (or external power) received through each connector 570 (e.g., the first connector 571 and the second connector 572) to the batteries (e.g., first battery 343a and second battery 343b) disposed in the respective structures (e.g., the first structure 312 and second structure 313), thereby charging the batteries. As illustrated in FIG. 7B, the electronic device 400 may identify whether each battery (e.g., the first battery 343a and the second battery 343b) is fully charged using the capacity identification circuit or a full-charge identification circuit (not shown) and, if full charging of each battery (e.g., the first battery 343a and second battery 343b) is identified, transfer information indicating the full charging of each battery (e.g., the first battery 343a and the second battery 343b) to the charging device (e.g., the charging device 207 of FIG. 2). The charging device (e.g., the charging device 207 of FIG. 2) may stop (pause) the operation of charging the batteries (e.g., the first battery 343a and the second battery 343b) in response to receiving the information. According to another embodiment, the electronic device 400 (e.g., the processor 401) may identify whether each battery (e.g., the first battery 343a and the second battery 343b) is fully charged using the capacity identification circuit or full-charge identification circuit (not shown) and, if full charging of the battery (e.g., the first battery 343a and the second battery 343b) is identified, request the charging device 207 to stop request for power (or current) to the charging device 207.

Examples of operations of a wearable device (hereinafter, the electronic device 400) according to various embodiments are described below.

According to various embodiments, the electronic device 400 may drive the devices disposed in each structure using the batteries provided in the structures (e.g., the first structure 312 and the second structure 313) (or two opposite sides).

Figure 9:
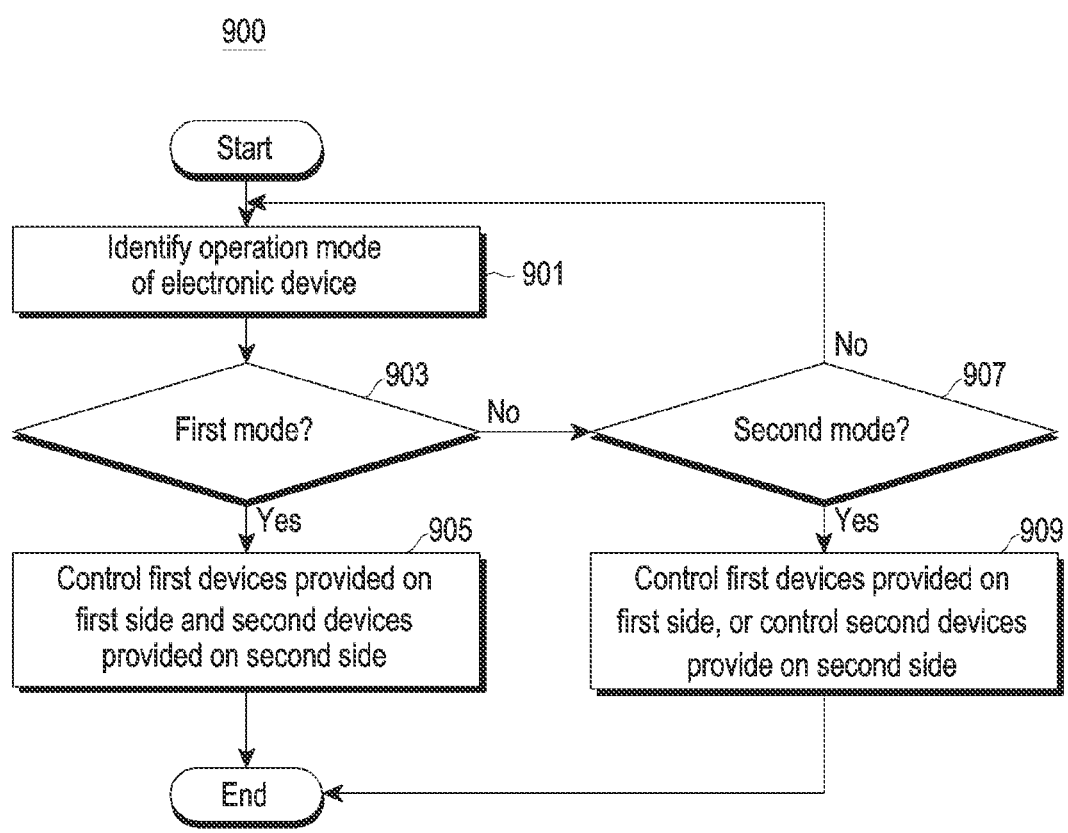
FIG. 9 is a flowchart illustrating an example of an operation of a wearable device according to various embodiments.

FIG. 9 is a flowchart 900 illustrating an example of an operation of a wearable device according to various embodiments. According to various embodiments, the operations shown in FIG. 9 are not limited to the shown order but may rather be performed in other various orders. According to various embodiments, more or less operations than those of FIG. 9 may be performed. FIG. 9 is described below with reference to FIGS. 10, 11, and 12A and 12B.

Figure 10:
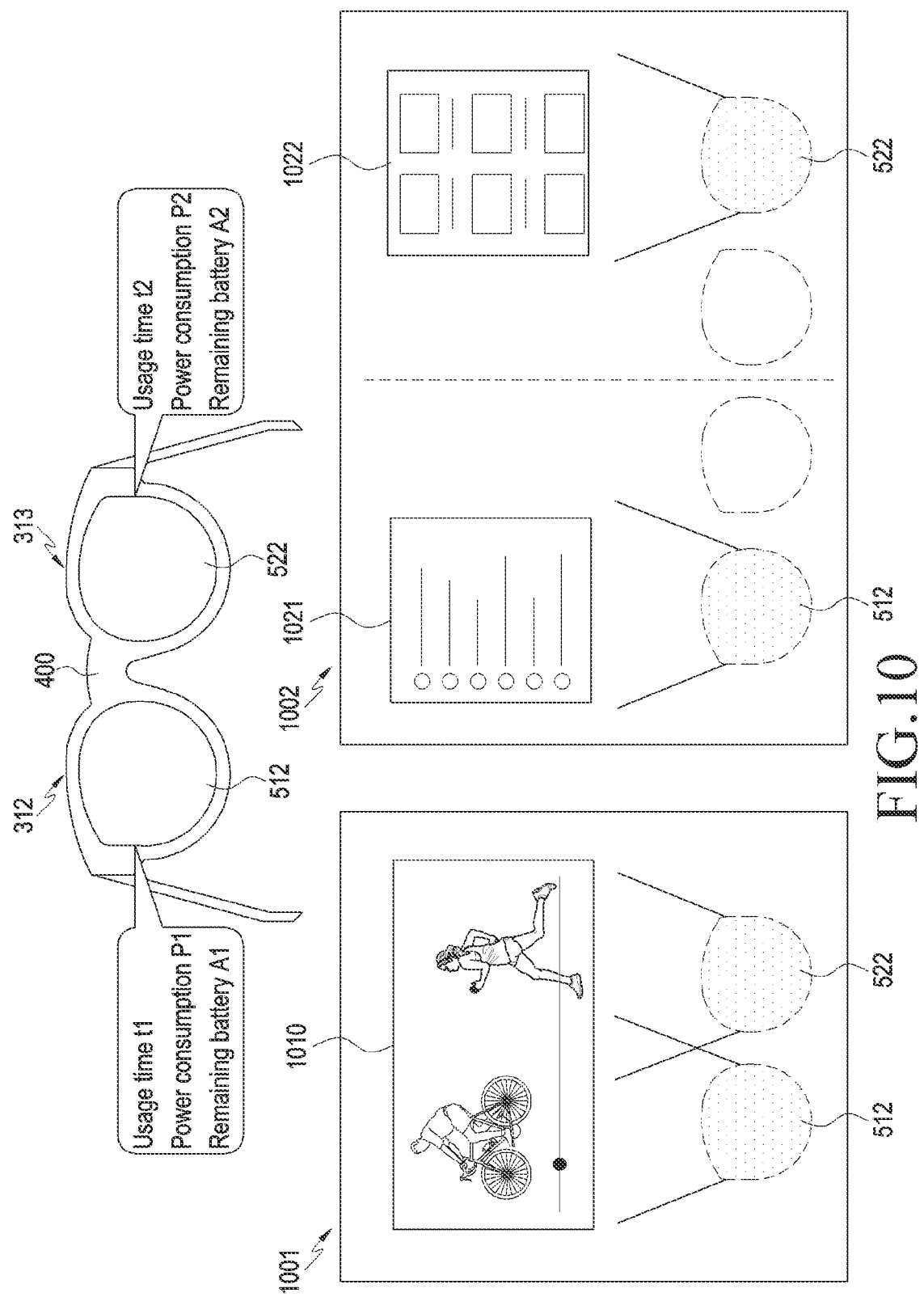
FIG. 10 is a view illustrating an example of an operation for controlling devices provided in each structure (e.g., a first structure and a second structure) according to an operation mode of a wearable device according to various embodiments.
Figure 11:
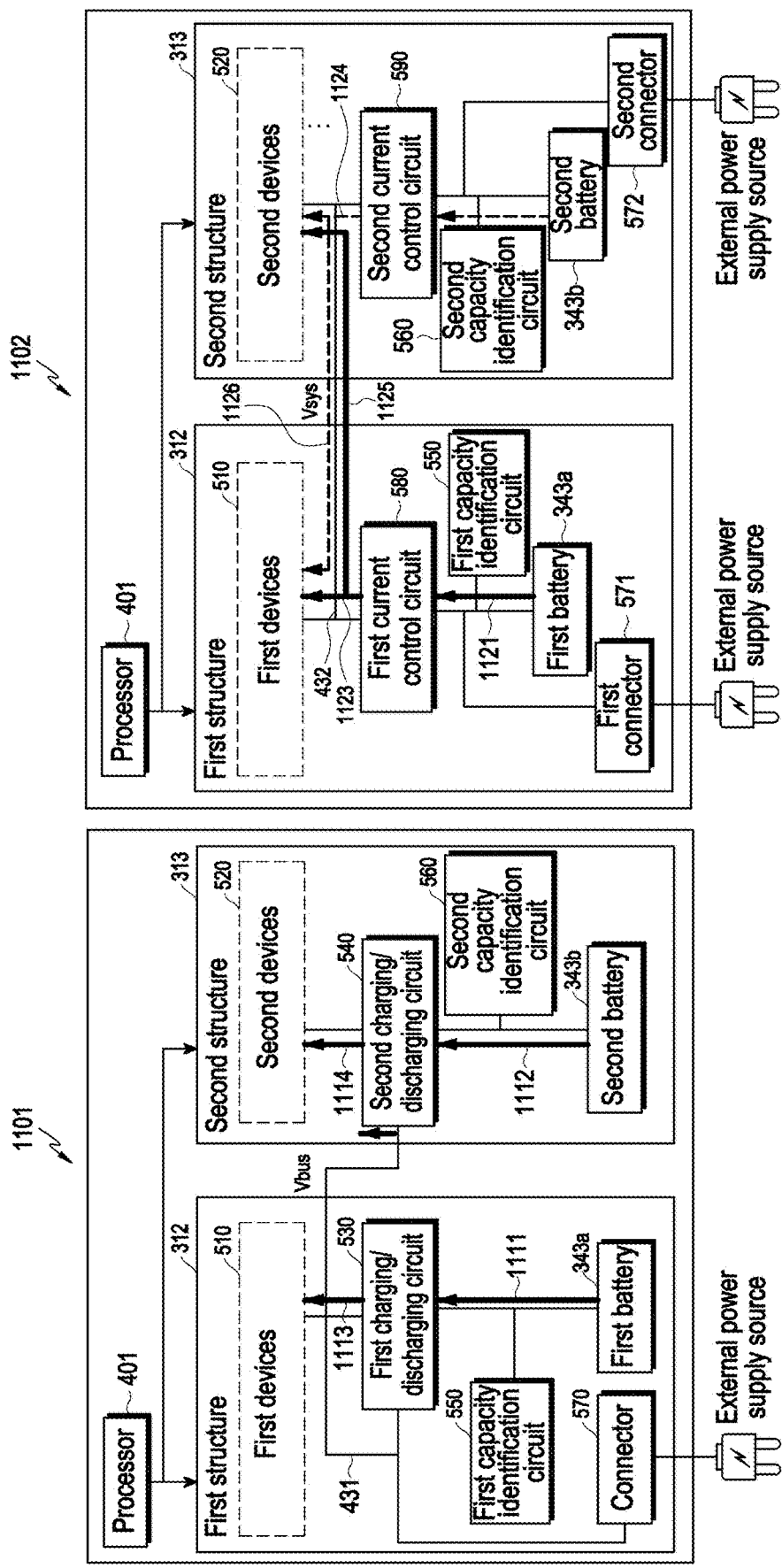
FIG. 11 is a view illustrating an example of a battery discharging operation of a wearable device according to various embodiments.
Figure 12A:
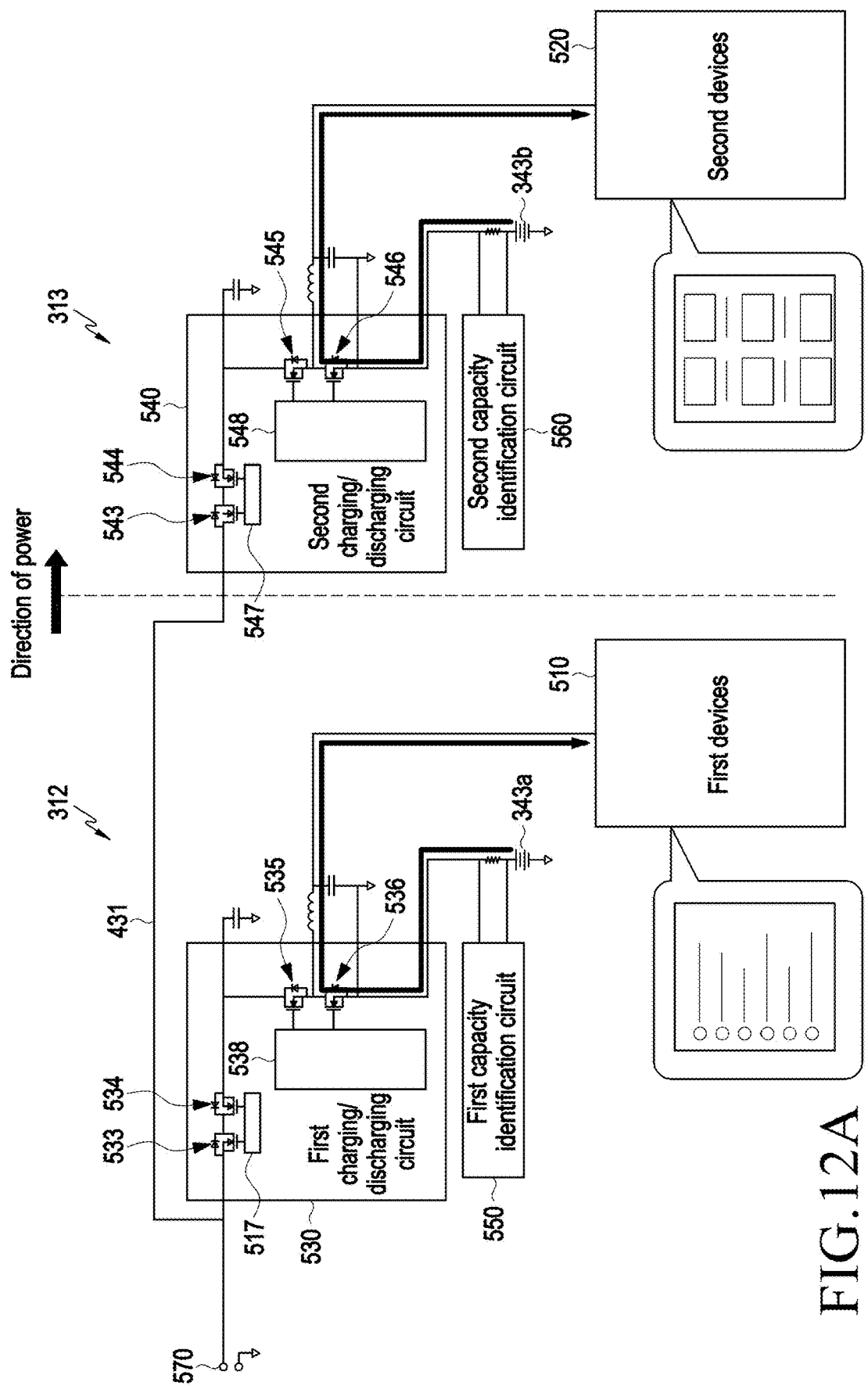
FIG. 12A is a view illustrating an example of a discharging operation of a wearable device including a first power line (e.g., Vbus line) according to various embodiments.
Figure 12B:
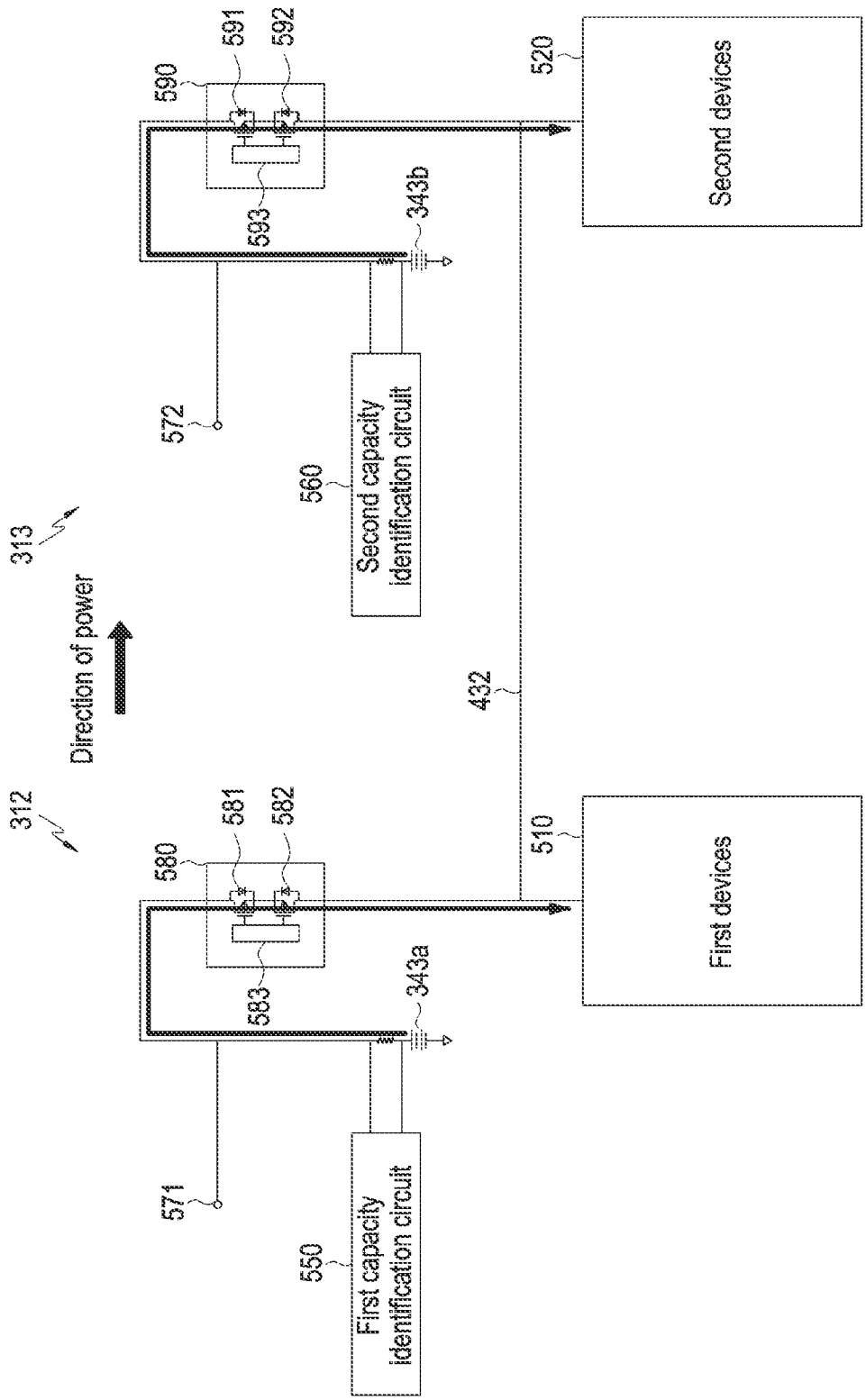
FIG. 12B is a view illustrating an example of a discharging operation of a wearable device including a second power line (e.g., Vsys line) according to various embodiments.

FIG. 10 is a view illustrating an example of an operation for controlling devices provided in each structure (e.g., the first structure 312 and the second structure 313) according to an operation mode of a wearable device (e.g., the electronic device 400) according to various embodiments of the disclosure. FIG. 11 is a view illustrating an example of a battery discharging operation of a wearable device (e.g., the electronic device 400) according to various embodiments. FIG. 12A is a view illustrating an example of a discharging operation of a wearable device (e.g., the electronic device 400) including a first power line 431 (e.g., Vbus line) according to various embodiments. FIG. 12B is a view illustrating an example of a discharging operation of a wearable device (e.g., the electronic device 400) including a second power line 432 (e.g., Vsys line) according to various embodiments.

According to various embodiments, the electronic device 400 may identify the operation mode of the electronic device 400 in operation 901. For example, referring to FIG. 10, the operation mode of the electronic device 400 may include a first mode 1001 and a second mode 1002. For example, the operation mode may include a first mode (1001 of FIG. 10) in which a difference (|P1-P2|) in power consumption between the devices according to the driving of the devices (e.g., the first devices 510 and the second devices 520) respectively provided in the two structures (e.g., the first structure 312 and the second structure 313) is less than a designated value and a second mode (1002 of FIG. 10) in which the difference (|P1-P2|) in power consumption between the devices according to the driving of the devices (e.g., the first devices 510 and the second devices 520) is not less than the designated value. For example, if the operation mode of the electronic device 400 is set to the first mode 1001, the electronic device 400 may supply power (or current) to the devices (e.g., the first devices 510 and the second devices 520) provided in the two structures (e.g., the first structure 312 and the second structure 313). The difference in transferred power between the devices may be a first difference or less. If the operation mode of the electronic device 400 is set to the second mode 1002, the electronic device 400 may supply power (or current) to the devices provided in the two structures. The difference in transferred power between the devices may be the first difference or more and a second difference or less. For example, the first mode 1001 may be an operation mode set to drive both the displays (e.g., the first display 512 and the second display 522) provided on both sides, and the second mode 1002 may be an operation mode set to drive only the display (e.g., the first display 512 or the second display 522) provided on one side. As another example, the difference (|t1-t2|) between the usage time t1 of the first device 510 and the usage time t2 of the second device 520 in the first mode (1001 in FIG. 10) may be smaller than the difference (|t1-t2|) between the usage time t1 of the first device 510 and the usage time t2 of the second device 520 in the second mode (1002 in FIG. 10). As another example, the difference (|A1-A2|) between the remaining capacity A1 of the first battery 343a and the remaining capacity A2 of the second battery 343b in the first mode (1001 in FIG. 10) may be smaller than the difference (|A1-A2|) between the remaining capacity A1 of the first battery 343a and the remaining capacity A2 of the second battery 343b in the second mode (1002 of FIG. 10).

According to various embodiments, the electronic device 400 may set the mode of the electronic device 400 to the first mode 1001 or the second mode 1002 based on the execution and/or driving of an application (or program). For example, the electronic device 400 may set the first mode 1001 or the second mode 1002, which has been set to correspond to the type of an application executed and/or being driven, as the operation mode of the electronic device 400. The application may be an application that is executed and/or driven on the electronic device 400 or an external electronic device (e.g., a terminal or the electronic device 200 of FIG. 2) operatively connected with the electronic device 400 (e.g., the electronic device 400 is communicatively connected with the external electronic device to receive information). If the application is executed and/or driven on the external electronic device, the electronic device 400 may receive identification information about the application from the external electronic device and identify the type of the application corresponding to the identification information. As an example of setting the operation mode of the electronic device 400 to correspond to the type of application, the electronic device 400 may execute a media application, identify the first mode 1001 set to correspond to the executed media application, and set the first mode 1001 as the operation mode of the electronic device 400. As another example, the electronic device 400 may execute a setting application, identify the second mode 1002 set to correspond to the executed setting application, and set the second mode 1002 as the operation mode of the electronic device 400. The described example is merely an example and, without limitations thereto, the first mode or the second mode may be set for each of various types of applications. As another example, the electronic device 400 may obtain information, data, and/or content according to the execution and/or driving of the application and may set the operation mode of the electronic device 400 depending on the types of devices to process the obtained information, data and/or content. As an example, if the electronic device 400 obtains content (e.g., a video to be played) as one application (e.g., a media application) is executed, the electronic device 400 may identify the type (e.g., the first display 512 and the second display 522) of the devices to handle the content (e.g., play video). The electronic device 400 may identify the position of the devices of the identified type and, if it is identified that the devices are disposed in the two structures, the electronic device 400 may set the operation mode to the first mode 1001 while if it is identified that the devices are disposed in one structure, the electronic device 400 may set the operation mode of the electronic device 400 to the second mode 1002.

Without being limited thereto, the first mode 1001 and the second mode 1002 may be manually set by the user.

According to various embodiments, if the identified operation mode is identified as the first mode in operation 903, the electronic device 400 may control the first devices 510 provided on one side and the second devices 520 on the other side in operation 905. For example, as illustrated in FIG. 1101 of FIG. 11, the electronic device 400 may drive some (e.g., the first display 512) of the first devices 510 provided in the first structure 312 and some (e.g., the second display 522) of the second devices 520 provided in the second structure 313 (e.g., control the two displays to display content 1010). To provide the power consumed as each device is driven, the electronic device 400 may discharge the batteries to provide the power stored in the batteries from the batteries (e.g., the first battery 343*a* and the second battery 343*b*) to the respective devices. Examples of an operation of discharging the batteries of the electronic device 400 according to implementation examples (e.g., the first power line 431 of FIGS. 5A and 5B and the second power line 432 of FIGS. 5C to 5D) of the power line of the above-described electronic device 400 are described below.

An example of a battery discharging operation of the electronic device 501 including the first power line 431 described above with reference to FIGS. 5A and 5B is described below.

According to various embodiments, as illustrated in 1101 of FIG. 11, the electronic device 400 may provide power 1111 and 1112 from the batteries to some (e.g., the first display 512) of the first devices 510 and some (e.g., the second display 522) of the second devices 520 using the charging/discharging circuits (e.g., the first charging/discharging circuit 530 and the second charging/discharging circuit 540). For example, if each device consumes power as the electronic device 400 drives some of the first devices 510 and some of the second devices 520, power may be provided from the batteries to the devices as illustrated in FIG. 12A. The electronic device 400 may convert the power output from one battery (e.g., the first battery 343*a* or the second battery 343*b*) into the magnitude required for each device (e.g., the first display 512 or the second display 522) using a converter circuit (not shown) (e.g., a DC/DC converter) and transfer the same. In this case, as illustrated in FIG. 12A, the electronic device 400 (e.g., the first processor 401) may turn off at least some of the MOSFETs of the charging/discharging circuit to allow no current to be transferred through the first power line 431 through one charging/discharging circuit, thereby preventing the current output from one battery (e.g., the first battery 343*a* or the second battery 343*b*) from being transferred to other components through one charging/discharging circuit.

An example of a battery discharging operation of the electronic device 502 including the second power line 432 described above with reference to FIGS. 5C and 5D is described below.

According to various embodiments, as illustrated in 1102 of FIG. 11, the electronic device 400 may provide power (or current) 1121 to 1124 from the batteries to some (e.g., the first display 512) of the first devices 510 and some (e.g., the second display 522) of the second devices 520 using the current control circuits (e.g., the first current control circuit 580 and the second current control circuit 590). For example, when the electronic device 400 drives the first devices 510 and the second devices 520, the current may be output (or discharged) from the first battery 343*a* and transferred 1121 to some (e.g., the first display 512) of the first devices 510 to provide power consumed by the first devices 510, and the current output (or discharged) from the first battery 343*a* may be transferred 1122 to some (e.g., the second display 522) of the second devices 520 through the second power line 432 to provide power consumed by the second devices 520. Likewise, the current may be output (or discharged) from the second battery 343*b* and transferred 1123 to some (e.g., the second display 522) of the second devices 520 to provide power consumed by the second devices 520, and the current output (or discharged) from the second battery 343*b* may be transferred 1124 to some (e.g., the first display 512) of the first devices 510 through the second power line 432 to provide power consumed by the first devices 510. The electronic device 400 (e.g., processor 401) may control the amount of current output from each battery (e.g., the first battery 343*a* and the second battery 343*b*) using the current control circuits 580 and 590 disposed in the structures (e.g., the first structure 312 or the second structure 313). For example, the electronic device 400 (e.g., the processor 401) may control the amount of current output from each battery (e.g., the first battery 343*a* and the second battery 343*b*) based on a designated condition (e.g., the difference ΔA in capacity between the two batteries), which is described below with reference to FIGS. 13 to 15.

According to various embodiments, if the identified operation mode is not identified as the first mode in operation 903, the electronic device 400 may identify whether the identified operation mode is the second mode in operation 907.

According to various embodiments, if the identified operation mode is identified as the second mode in operation 907, the electronic device 400 may control the first devices 510 provided on one side or the second devices 520 on the other side in operation 909. For example, as illustrated in 1002 of FIG. 10, the electronic device 400 may drive some (e.g., the first display 512) of the first devices 510 provided in the first structure 312 (e.g., display a first menu screen 1021) and drive some (e.g., the second display 522) of the second devices 520 provided in the second structure 313 (e.g., display a second menu screen 1022). For example, as illustrated in 1101 of FIG. 11, the electronic device 400 may control the first charging/discharging circuit 530 to provide 1113 the power of the first battery 343*a* to some of the first devices 510 to drive some of the first devices 510 disposed in the first structure 312 or control the second charging/discharging circuit 540 to provide 1114 the power of the second battery 343*b* to some of the second devices 520 to drive some of the second devices 520 disposed in the second structure 313. For example, as illustrated in FIG. 12A, if the electronic device 400 includes a first power line 431 (e.g., a Vbus line), the electronic device 400 may provide the power of the first battery 343*a* to some of the first devices 510 using the first charging/discharging circuit 530 or provide the power of the second battery 343*b* to some of the second devices 520 using the second charging/discharging circuit 540. Since the operation of discharging the battery of the electronic device 400 including the first power line 431 may be performed as described above in operations 902 to 903, a redundant description will be omitted. In this case, the electronic device 400 (e.g., the processor 401) may transfer power from one battery of one structure through the first power line 431 to the components (e.g., the other charging/discharging circuit) of the other structure using the charging/discharging circuit provided in the one structure based on a designated condition (e.g., the difference ΔA in capacity between the two batteries). This is described below in connection with FIGS. 13 to 15. As another example, as illustrated in 1102 of FIG. 11, to drive some of the first devices 510 disposed in the first structure 312, the electronic device 400 may control the first current control circuit 580 to provide 1123 the power of the first battery 343*a* to some of the first devices 510 and may control the second current control circuit 590 to provide 1126 the power of the second battery 343*b* through the second power line 432 (Vsys line) to some of the first devices 510. Or, as illustrated in 1102 of FIG. 11, to drive some of the second devices 520 disposed in the second structure 313, the electronic device 400 may control the second current control circuit 590 to provide 1124 the power of the second battery 343*b* to some of the second devices 520 and may control the first current control circuit 580 to provide 1125 the power of the first battery 343*a* through the second power line 432 (Vsys line) to some of the second devices 520. As illustrated in FIG. 12B, if the electronic device 400 includes the second power line 432 (Vsys line), the current output from the first battery 343*a* or the current output from the second battery 343*b* through the second power line 432 may be transferred to some of the first devices 510, or the current output from the second battery 343*b* or the current output from the first battery 343*a* through the second power line 432 may be transferred to some of the second devices 520. Since the operation of discharging the battery of the electronic device 400 including the second power line 432 may be performed as described above in operations 902 to 903, a redundant description will be omitted. In this case, the electronic device 400 (e.g., the processor 401) may control the amount of current output from the batteries (e.g., the first battery 343*a* and the second battery 343*b*) based on a designated condition (e.g., the difference ΔA in capacity between the two batteries), which is described below with reference to FIGS. 16 to 18. Meanwhile, without limitations thereto, not only is one display driven, but both the displays (e.g., the first display 512 and the second display 522) may be driven, at a lower power level for one of the two displays than the other display.

Examples of operations of a wearable device (hereinafter, the electronic device 400) according to various embodiments are described below.

According to various embodiments, the electronic device 400 (e.g., the electronic device 501 described above in connection with FIGS. 5A and 5B) may transfer power from the battery (e.g., the first battery 343*a* or the second battery 343*b*) provided in one structure (e.g., the first structure 312 or the second structure 313) (or one side) through the first power line 431 (Vbus line) to a component (e.g., the charging/discharging circuit) disposed in the other structure, based on a designated condition (e.g., the difference ΔA in capacity between the two batteries or a difference Δt in usage time). The electronic device 400 may control the current (or, power) that is output (or discharged) from the battery provided in one structure to a component of the other structure.

Figure 13:
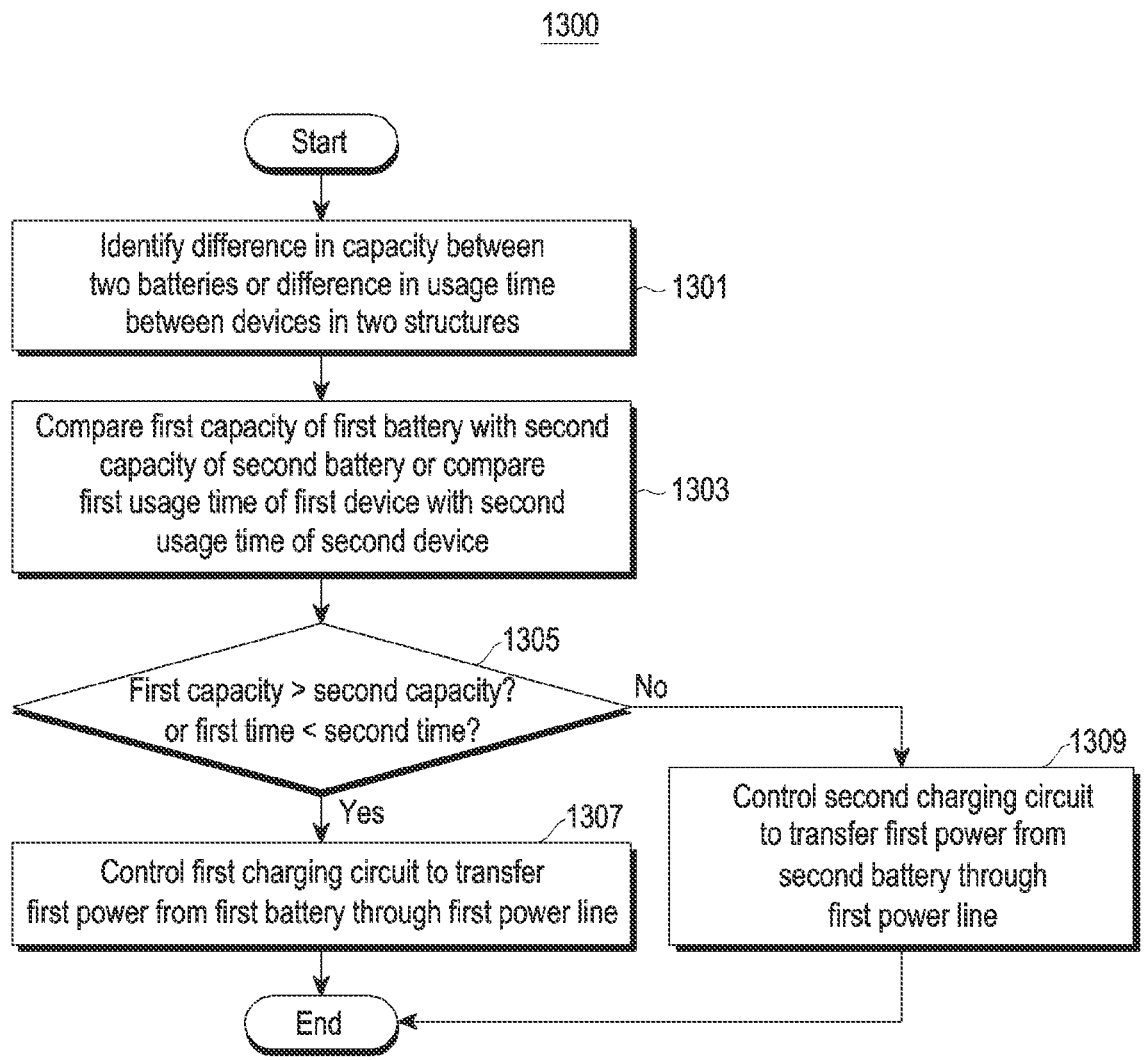
FIG. 13 is a flowchart illustrating an example of an operation of a wearable device according to various embodiments.

FIG. 13 is a flowchart 1300 illustrating an example of an operation of a wearable device according to various embodiments. According to various embodiments, the operations shown in FIG. 13 are not limited to the shown order but may rather be performed in other various orders. According to various embodiments, more or less operations than those of FIG. 13 may be performed. FIG. 13 is described below with reference to FIGS. 14 and 15.

Figure 14:
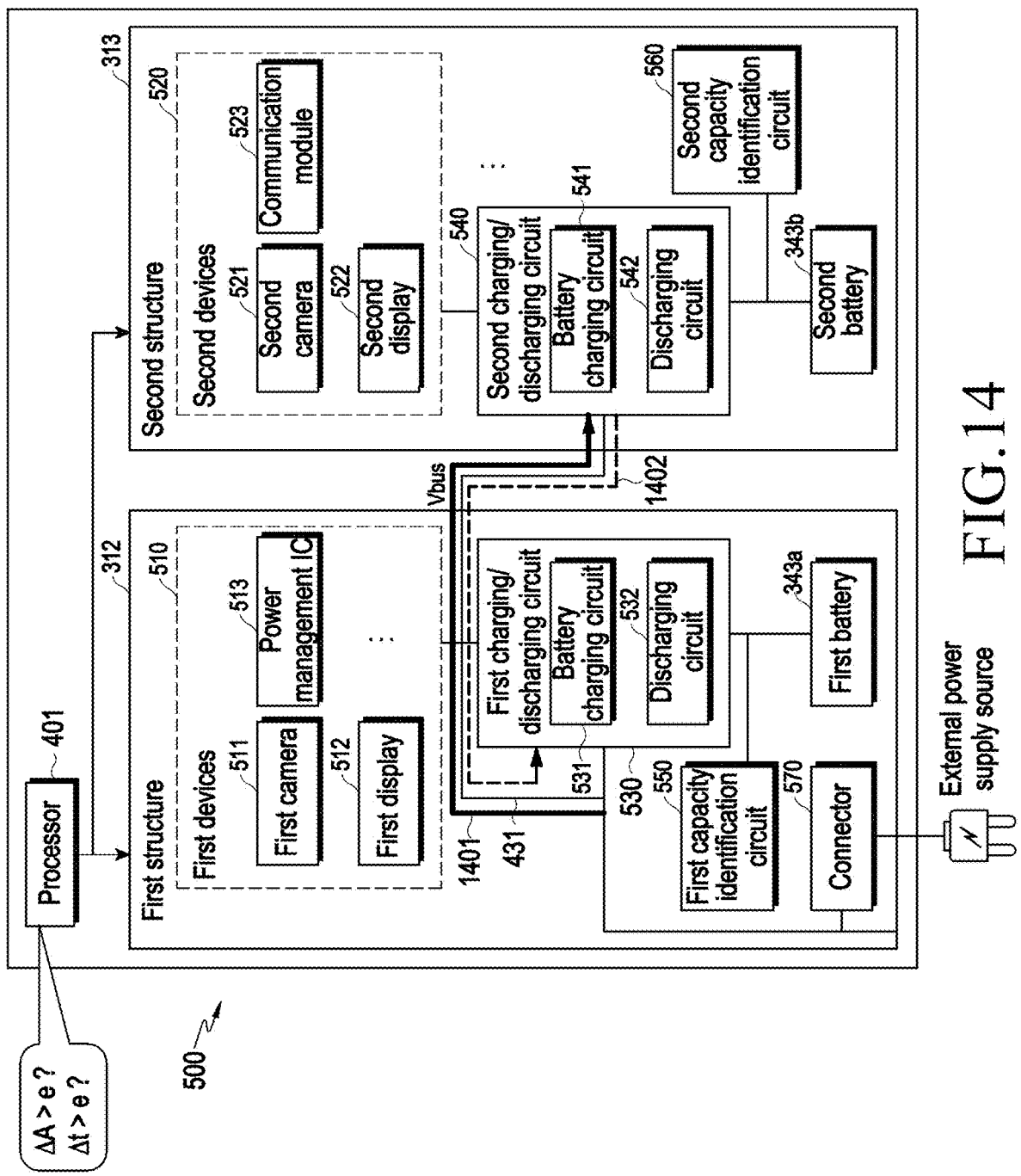
FIG. 14 is a view illustrating an example of an operation for controlling a current output from a battery of a wearable device including a first power line according to various embodiments.
Figure 15:
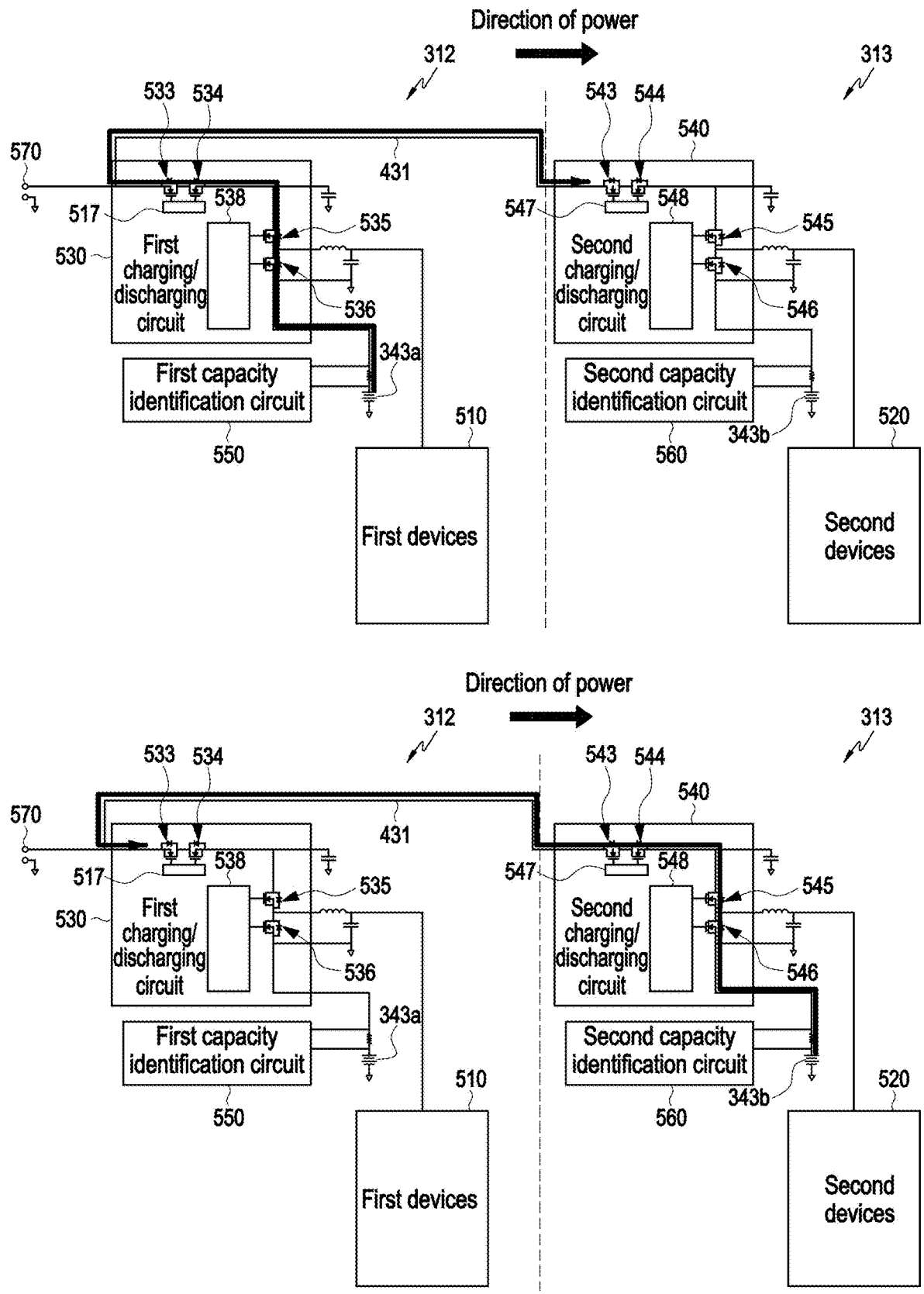
FIG. 15 is a view illustrating an example of an operation for controlling a current output from a battery of a wearable device including a first power line according to various embodiments.

FIG. 14 is a view illustrating an example of an operation for controlling a current output from a battery of a wearable device including a first power line 431 according to various embodiments. FIG. 15 is a view illustrating an example of an operation for controlling a current output from a battery of a wearable device including a first power line 431 according to various embodiments.

According to various embodiments, in operation 1301, the electronic device 400 may identify a difference in capacity between two batteries or a difference in usage time between the devices provided in the two structures (e.g., the first structure 312 or the second structure 313). For example, the electronic device 400 may perform an operation for reducing a difference in power between the devices (e.g., the first devices 510 and the second devices 520) disposed in the two structures and/or a difference in capacity between the batteries disposed in the two structures. To perform the operation of reducing the difference in power or the difference in capacity, the electronic device 400 may identify designated information (e.g., a difference in battery capacity or a difference in usage time) and control the amount of current (or power) output (or discharged) through each battery through the first power line 431 to the other structure based on the designated information. Described below are an operation for identifying a difference in capacity between the batteries disposed in the two structures and an operation for identifying a difference in usage time between the devices disposed in the two structures.

First, the operation of identifying a difference in capacity between the batteries (e.g., the first battery 343*a* and the second battery 343*b*) of the electronic device 400 is described below.

According to various embodiments, the electronic device 400 may identify the difference between the capacity of the first battery 343*a* disposed in the first structure 312 and the capacity of the second battery 343*b* disposed in the second structure 313. For example, as illustrated in FIG. 14, the electronic device 400 may identify a first capacity of the first battery 343*a* and a second capacity of the second battery 343*b* using the capacity identification circuits (e.g., the first capacity identification circuit 550 and the second capacity identification circuit 560) disposed in the first structure 312 or the second structure 313. The electronic device 400 may identify the difference between the first capacity of the first battery 343*a* and the second capacity of the second battery 343*b*. As another example, the electronic device 400 may identify the current (or power) transferred from the first battery 343*a* (or identify the current (or power) consumed by each of the first devices 510) to drive each of the first devices 510 disposed in the first structure 312 or identify the current (or power) transferred from the second battery 343*b* (or identify the current (or power) consumed by each of the second devices 520) to drive the second devices 520 disposed in the second structure 313.

An operation for identifying a difference in usage time between devices disposed in the structures (or both sides) of the electronic device 400 is described below.

According to various embodiments, the electronic device 400 may identify the usage time of the first devices 510 disposed in the first structure 312 and the usage time (or driving time) of the second devices 520 disposed in the second structure 313. The electronic device 400 may identify the usage time of each of the devices (e.g., the first devices 510 or the second devices 520) and sum the identified usage times to identify the usage time of the first devices 510 or the usage time of the second devices 520. For example, the electronic device 400 may identify the current (or power) consumed by each device and inversely calculate the usage time of the device based on a per-hour current consumption set for each device and the identified current consumption. As another example, if the amount of current consumed by one device is a first amount, and the amount of current consumed per hour by one device is a second amount/hour, the electronic device 400 may calculate the usage time by dividing the first amount by the second amount/hour. As another example, the electronic device 400 may identify the time during which current (or power) is transferred from each battery (e.g., the first battery 343*a* and the second battery 343*b*) to the devices (e.g., the first devices 510 and the second devices 520) and identify the identified time of current transfer as the usage time of the devices (e.g., the first devices 510 or the second devices 520). As another example, the electronic device 400 may identify a device (e.g., the first devices 510 or the second devices 520) corresponding to each application (e.g., controlled according to the execution and/or driving of the application) and may identify the per-application usage time (or driving time) as the usage time (or driving time) of the device corresponding to each application (e.g., some of the first devices 510 or some of the second devices 520). As another example, the electronic device 400 may identify the driving time of an application set to display a menu screen and identify the identified driving time as the usage time of some (e.g., the first display 512) among the first devices 510 corresponding to the identified application. The first capacity of the first battery 343*a* and the second capacity of the second battery 343*b* may differ from each other based on the operation mode of the electronic device 400 being set to the second mode, as described above in connection with FIGS. 9 to 12.

According to various embodiments, if summating the identified usage times of the first devices 510 or the second devices 520, the electronic device 400 may apply a weight associated with each of the devices (e.g., the first devices 510 or the second devices 520). For example, the weight may be set according to the power (e.g., power per hour) consumed by the device corresponding to the weight. As an example, the weight may be set to be proportional to the power consumption. For example, the electronic device 400 may identify that the usage time of one of the first devices is a first usage time, and the usage time of another of the first devices is a second usage time. The electronic device 400 may apply (e.g., multiply or add) the first weight corresponding to the first device to the first usage time and apply (e.g., multiply or add) the second weight corresponding to the second device to the second usage time and may summate the weight-applied usage times. As the power consumed by the first device is larger than the power consumed by the second device, the first weight may be larger than the second weight.

According to various embodiments, in operation 1303, the electronic device 400 may compare the first capacity of the first battery 343*a* with the second capacity of the second battery 343*b* or compare the first usage time of the first device with the second usage time of the second device. For example, the electronic device 400 may identify the difference in capacity between the batteries identified in operation 1301 or identify the difference in usage time between the devices. As the driving times of the devices having the above-described capacities of batteries differ as shown in Tables 1 and 2, different amounts of power (or current) may be consumed (or output) from the batteries.

TABLE 1

| first mode (vision mode) | | | | | |
|---|---|---|---|---|---|
| first structure 312 | | | second structure 313 | | |
| device | current consumption | usage time | device | current consumption | usage time |
| first camera | 0.3 W | | second camera | 0.3 W | |
| first display 512 | 0.6 W | | second display 522 | 0.6 W | |
| SOC + MEM + PMIC | 0.9 W | | communication module | 0.3 W | |
| Sum | 1.8 W | 1hr | Sum | 1.2 W | 1.5 hr |

TABLE 2

| second mode (info glass mode) | | | | | |
|---|---|---|---|---|---|
| first structure 312 | | | second structure 313 | | |
| device | current consumption | usage time | device | current consumption | usage time |
| first camera | | | second camera | | |
| first display 512 | | | second display 522 | 0.6 W | |
| SOC + MEM + PMIC | 0.3 W | | communication module | 0.1 W | |
| Sum | 0.3 W | 6 hr | Sum | 0.7 W | 1.5 hr |

According to various embodiments, if it is identified in operation 1305 that the first capacity is larger than the second capacity or that the first time is shorter than the second time, the electronic device 400 may control the first charging/discharging circuit 530 to transfer first power from the first battery 343*a* to the first power line 431 in operation 1307. For example, as illustrated in FIG. 14, the electronic device 400 may control to provide current (or power) from the first battery 343*a* through the first charging/discharging circuit 530 and the first power line 431 to a component (e.g., the second charging/discharging circuit 540) disposed in the second structure 313. The electronic device 400 may control the first charging/discharging circuit 530 (e.g., the function (OTG power supply function) of the discharging circuit 532) to output current from the first battery 343a through the first power line 431. The electronic device 400 may control the amount of current output through the first power line 431 (e.g., control the first charging/discharging circuit 530) based on a difference between the capacity of the first battery 343a and the capacity of the second battery 343b or a difference between the first time and the second time. For example, the electronic device 400 may control the amount of current output through the first power line 431 to be proportional to the difference (e.g., the difference in battery capacity or the difference in usage time). As another example, as illustrated in FIG. 15, the electronic device 400 may control the first to fourth MOSFETs 533, 534, 545, and 536 of the first charging/discharging circuit 530 (e.g., the discharging circuit 532 or 542) to turn on and may control to allow the voltage of one terminal (e.g., one terminal of the first MOSFET 533) of the first charging/discharging circuit 530 connected to the first power line 431 to increase. The current output from the first battery 343a may be output from the first charging/discharging circuit 530 through the first to fourth MOSFETs 533, 534, 545, and 536 and may be transferred through the first power line 431 to the second charging/discharging circuit 540 disposed in the second structure 313. Meanwhile, without limitations thereto, the electronic device 400 may identify the difference in battery capacity or the difference in usage time as a condition for triggering the operation of controlling the first charging/discharging circuit 530 to transfer first power from the first battery 343a through the first power line 431. The electronic device 400 may identify the difference in battery capacity (or difference in usage time) while performing the operation of controlling the first charging/discharging circuit 530 and, if the identified difference is less than a designated value, control the first charging/discharging circuit 530 to stop (or pause) the operation of providing current from the first battery 343a to the second charging/discharging circuit 540. According to various embodiments, the second charging/discharging circuit 540 receiving current (or power) from the first charging/discharging circuit 530 through the first power line 431 may charge the second battery 343b or drive some of the second devices 520 based on the received current. For example, the electronic device 400 may control the second charging/discharging circuit 540 (e.g., the battery charging circuit 541) to supplement the consumed power of the second battery 343b. As another example, the electronic device 400 may control the second charging/discharging circuit 540 (e.g., the battery charging circuit 541) to provide the power consumed by the second devices 520. According to various embodiments, if it is identified that the difference in capacity or the difference in usage time meets a designated condition, the electronic device 400 may control the first charging/discharging circuit 530 to transfer the first power from the first battery 343a through the first power line 431. The designated condition may include identifying that the difference in capacity (AA) or the difference in usage time (Δt) is greater than a designated threshold e.

According to various embodiments, if it is identified in operation 1305 that the first capacity is equal to or smaller than the second capacity and that the first time is equal to or longer than the second time, the electronic device 400 may control the second charging/discharging circuit 540 to transfer first power from the second battery 343b to the first power line 431 in operation 1309. For example, as illustrated in FIG. 14, the electronic device 400 may control to provide current (or power) from the second battery 343b through the second charging/discharging circuit 540 and the first power line 431 to a component (e.g., the first charging/discharging circuit 530) disposed in the second structure 312. As another example, as illustrated in FIG. 15, the electronic device 400 may control the fifth to eighth MOSFETs 533, 544, 545, and 546 of the second charging/discharging circuit 540 (e.g., the discharging circuit 532) to turn on and may control to allow the voltage of one terminal (e.g., one terminal of the fifth MOSFET 543) of the second charging/discharging circuit 540 connected to the first power line 431 to increase. The current output from the second battery 343b may be output from the second charging/discharging circuit 540 through the fifth to eighth MOSFETs 543, 544, 545, and 546 and may be transferred through the first power line 431 to the first charging/discharging circuit 530 disposed in the first structure 312. Operation 1309 of the electronic device 400 may be performed like operation 1307 of the electronic device 400 as described above, and no duplicate description thereof is given below. Meanwhile, without limitations thereto, even when it is identified that the first capacity is equal to or smaller than the second capacity or that the first time is equal to or longer than the second time, the electronic device 400 may perform operation 1309.

Examples of operations of a wearable device (hereinafter, the electronic device 400) according to various embodiments are described below.

According to various embodiments, the electronic device 400 (e.g., the electronic device 502 described above in connection with FIGS. 5C and 5D) may transfer power from the battery (e.g., the first battery 343a or the second battery 343b) provided in one structure (e.g., the first structure 312 or the second structure 313) (or one side) through the second power line 432 (Vsys line) to a component (e.g., the charging/discharging circuit) disposed in the other structure, based on a designated condition (e.g., the difference ΔA in capacity between the two batteries). The electronic device 400 may control the current (or, power) that is output (or discharged) from the battery provided in one structure to a component of the other structure.

Figure 16:
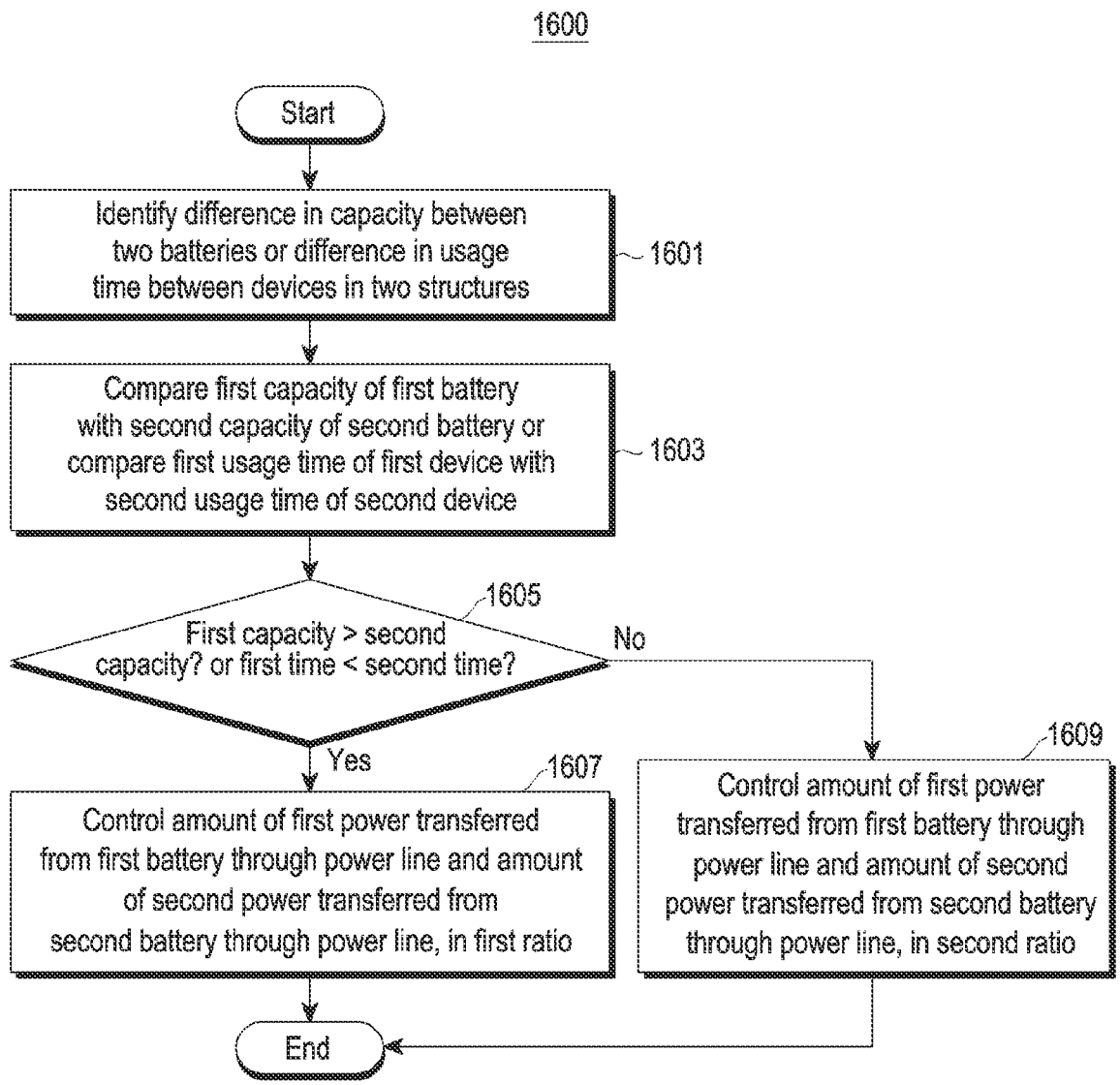
FIG. 16 is a flowchart illustrating an example of an operation of a wearable device according to various embodiments.

FIG. 16 is a flowchart 1600 illustrating an example of an operation of a wearable device according to various embodiments. According to various embodiments, the operations shown in FIG. 16 are not limited to the shown order but may rather be performed in other various orders. According to various embodiments, more or less operations than those of FIG. 16 may be performed. FIG. 16 is described below with reference to FIGS. 17 and 18.

Figure 17:
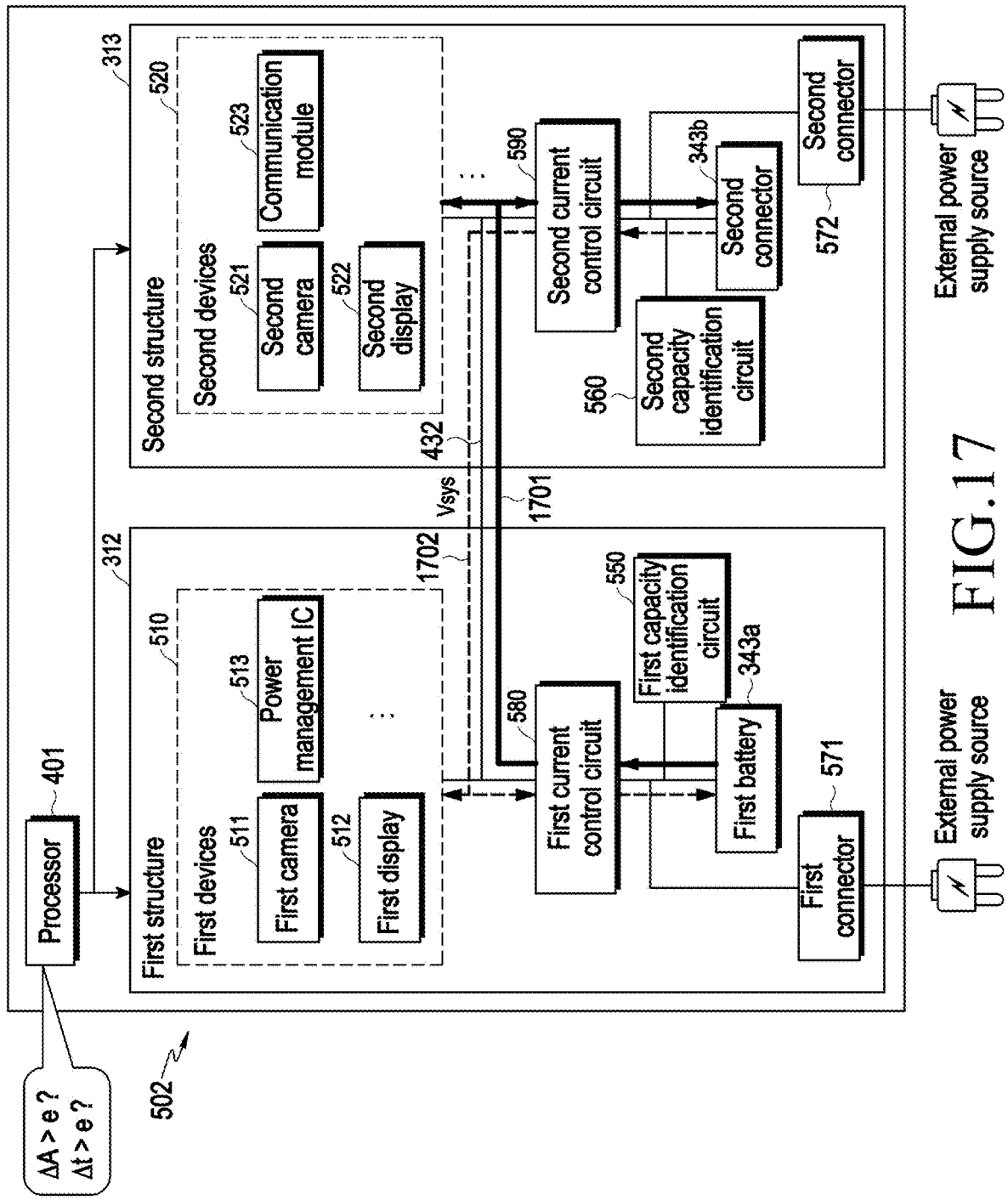
FIG. 17 is a view illustrating an example of an operation for controlling a current output from a battery of a wearable device including a second power line according to various embodiments.
Figure 18:
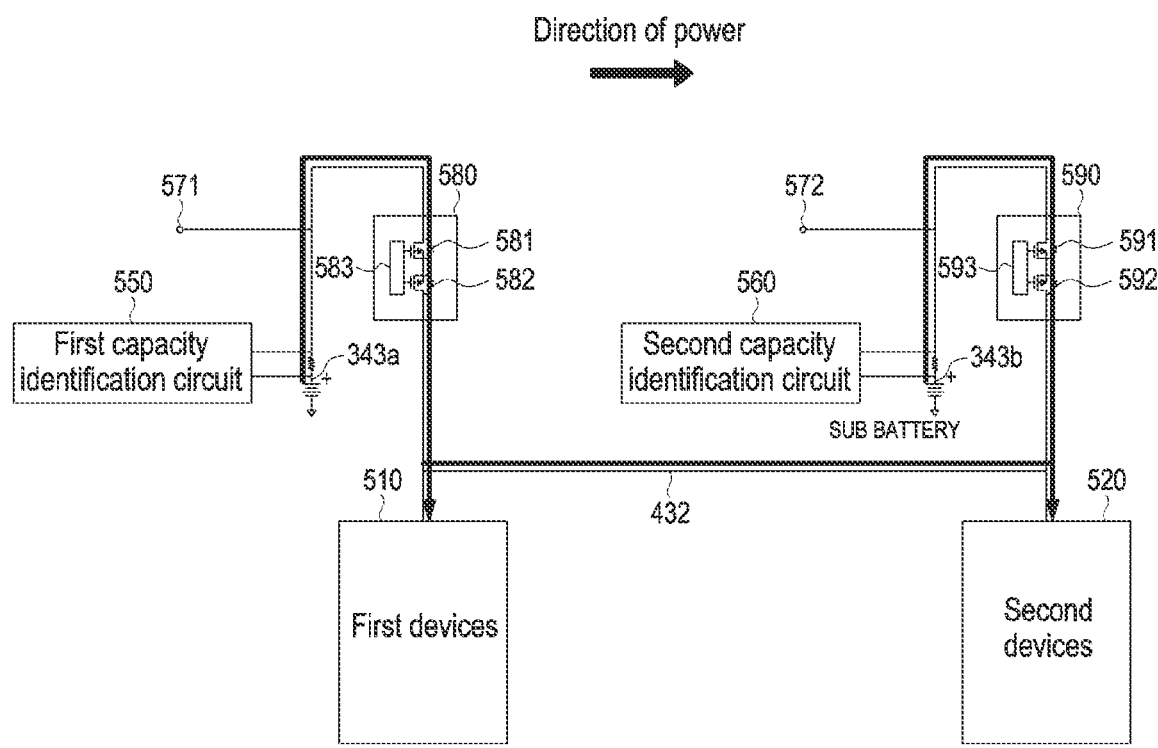
FIG. 18 is a view illustrating an example of an operation for controlling a current output from a battery of a wearable device including a second power line according to various embodiments.

FIG. 17 is a view illustrating an example of an operation for controlling a current output from a battery of a wearable device including a second power line 432 according to various embodiments. FIG. 18 is a view illustrating an example of an operation for controlling a current output from a battery of a wearable device including a second power line 432 according to various embodiments.

According to various embodiments, the electronic device 400 may identify a difference in capacity between the two batteries or a difference in usage time between the devices provided in the two structures in operation 1601. For example, the electronic device 400 may perform an operation for reducing a difference in power between the devices (e.g., the first devices 510 and the second devices 520) disposed in the two structures and/or a difference in capacity between the batteries disposed in the two structures. To perform the operation of reducing the difference in power or the difference in capacity, the electronic device 400 may identify designated information (e.g., a difference in battery capacity or a difference in usage time) and control the amount of current (or power) output (or discharged) through each battery through the first power line 431 to the other structure based on the designated information. An operation for identifying a difference in capacity between the batteries provided in the two structures of the electronic device 400 and an operation for identifying a difference in usage time between the devices provided in the two structures, as the designated information, may be performed in operation 1301 as described above, and no duplicate description is thus given.

According to various embodiments, in operation 1603, the electronic device 400 may compare the capacity of the first battery 343*a* with the capacity of the second battery 343*b* or compare the first usage time of the first device with the second usage time of the second device. For example, the electronic device 400 may identify the ratio of the capacity of the first battery 343*a* to the capacity of the second battery 343*b*. As another example, the electronic device 400 may identify the ratio of the first usage time of the first device to the second usage time of the second device.

According to various embodiments, if it is identified in operation 1605 that the first capacity is larger than the second capacity or that the first time is shorter than the second time, the electronic device 400 may control the amount of the first power transferred from the first battery 343*a* through the second power line 432 and the amount of the second power transferred from the second battery 343*b* through the second power line 432 in the first ratio in operation 1607. For example, as illustrated in FIG. 17, the electronic device 400 (e.g., the processor 401) may control the current control circuit (e.g., the first current control circuit 580 or the second current control circuit 590) provided in one structure (e.g., the first structure 312 or the second structure 313), thereby controlling the amount of current (e.g., 1701 or 1702) output from the battery (e.g., the first battery 343*a* or the second battery 343*b*) disposed in one structure through the current control circuit. The current output from the current control circuit of each structure may be provided to the devices of one structure or may be provided to the devices of the other structure through the second power line 432. As an example, as illustrated in FIG. 18, the electronic device 400 may turn on the MOSFETs (e.g., the first and second MOSFETs 581 and 582 and the third and fourth MOSFETs 591 and 592) included in the current control circuits 580 and 590, controlling to output current through the MOSFETs of the current control circuits 580 and 590 from one battery and controlling the magnitude of the gate voltages applied to the MOSFETs to thereby control the amount of the output current. In this case, the amount of the current 1701 output from the first current control circuit 580 may be controlled to be larger than the amount of the current 1702 output from the second current control circuit 590 based on the capacity of the first battery 343*a* being larger than the capacity of the second battery 343*b* (or the usage time of the first battery 343*a* being shorter than the usage time of the second battery 343*b*). The electronic device 400 may identify the difference in capacity between the batteries (or the difference in usage time) while performing the operation of controlling each current control circuit and, if the identified difference is less than a designated value, control the current control circuits 580 and 590 to allow the currents (e.g., the current 1701 output from the first current control circuit 580 and the current 1702 output from the second current control circuit 590) to be identical to each other. Examples of the operation of controlling the amount of current transfer, based on a difference in capacity between the batteries of the electronic device 400 (or a difference in usage time) are described below.

For example, the electronic device 400 may control the ratio of the amount of current output from the first battery 343*a* through the second power line 432 to the amount of current output from the second battery 343*b* through the second power line 432, in the ratio corresponding to the difference in capacity between the batteries (or the difference in usage time) as shown in Table 3 below. The electronic device 400 may previously store information about current ratios corresponding to ranges (e.g., 30% or more, 21% to 30%, 11% to 20%, and less than 10%) for the difference in capacity between the batteries (or difference in usage time). The electronic device 400 may identify the difference in capacity between the batteries, identify the current ratio corresponding to the difference in capacity between the batteries identified based on the stored information, and control each current control circuit (e.g., the first current control circuit 580 and the second current control circuit 590) to output current in the identified ratio. As an example, if the identified ratio is 8:2, the ratio of the gate voltages applied to the MOSFETs (e.g., the first and second MOSFETs 581 and 582) of the first current control circuit 580 to the gate voltages applied to the MOSFETs (e.g., the third and fourth MOSFETs 591 and 592) of the second current control circuit 590 may be 8:2.

TABLE 3

| Difference in capacity between batteries (capacity of first battery 343a − capacity of second battery 343b) | current ratio |
| --- | --- |
| 30% or more | 8:2 |
| 21% to 30% | 7:3 |
| 11% to 20% | 6:4 |
| less than 10% | 5:5 |

As another example, the electronic device 400 may control the ratio of the amount of current (or power) transferred from the first battery 343*a* through the second power line 432 to the amount of current (or power) transferred from the second battery 343*b* through the second power line 432, in the ratio corresponding to the capacity ratio or usage time ratio of the batteries. As an example, the electronic device 400 may control the ratio of the transferred current amounts to be proportional to the capacity ratio of the batteries or inversely proportional to the usage time ratio. For example, if the battery capacity ratio is a first ratio (e.g., the capacity ratio of the capacity of the first battery 343*a* to the capacity of the second battery 343*b* is 8:2), the electronic device 400 may control the ratio of the output current amounts in a second ratio corresponding to the first ratio (e.g., the ratio of the amount of current output from the first battery 343*a* to the amount of current output from the second battery 343*b* is 8:2). As another example, if the usage time ratio is a third ratio (e.g., the ratio of the usage time of the first battery 343*a* to the usage time of the second battery 343*b* is 2:8), the electronic device 400 may control the ratio of the output current amounts in a fourth ratio having an inverse relationship with the third ratio (e.g., the ratio of the amount of current output from the first battery 343*a* to the amount of current output from the second battery 343*b* is 8:2). According to various embodiments, if the designated condition for triggering the operation of controlling the above-described current amounts is met, the electronic device 400 may control the current control circuits (e.g., the first current control circuit 580 and the second current control circuit 590), thereby controlling the amount of the output current. For example, as described above in connection with FIGS. 10 and 12B, the electronic device 400 may control the amount of the output current by controlling the current control circuits (e.g., the first current control circuit 580 and the second current control circuit 590) based on identifying that the condition for triggering the operation of controlling the current is met while outputting (or discharging) the same amount of current from the first battery 343a and the second battery 343b and transferring it to each of the first devices 510 and the second devices 520. The designated condition may include identifying that the difference ΔA in capacity between the batteries (or the difference Δt in usage time) falls within designated ranges (e.g., 30% or more, 21% to 30%, and 11% to 20%). According to various embodiments, if it is identified that the first capacity is equal to or smaller than the second capacity and that the first time is equal to or longer than the second time in operation 1605, the electronic device 400 may control the amount of the first power transferred from the first battery 343a through the second power line 432 and the amount of the second power transferred from the second battery 343b through the second power line 432, in the second ratio, in operation 1609. For example, as illustrated in FIG. 17, the electronic device 400 (e.g., the processor 401) may control the current control circuit (e.g., the first current control circuit 580 or the second current control circuit 590) provided in one structure (e.g., the first structure 312 or the second structure 313), thereby controlling the amount of current (e.g., 1701 or 1702) output from the battery (e.g., the first battery 343a or the second battery 343b) disposed in one structure through the current control circuit. In this case, the amount of the current 1701 output from the first current control circuit 580 may be controlled to be smaller than the amount of the current 1702 output from the second current control circuit 590 based on the capacity of the first battery 343a being smaller than the capacity of the second battery 343b (or the usage time of the first battery 343a being longer than the usage time of the second battery 343b). Operation 1609 of the electronic device 400 may be performed like operation 1607 described above, and no detailed description thereof is given. Meanwhile, without limitations thereto, even when it is identified that the first capacity is equal to or smaller than the second capacity or that the first time is equal to or longer than the second time, the electronic device 400 may perform operation 1609.

According to various embodiments, there may be provided an electronic device (e.g., 400 of FIG. 4), comprising a first structure (e.g., 312) provided on a first side, a connector disposed in the first structure (e.g., 312) and configured to receive external power, a first charging/discharging circuit (e.g., 530) disposed in the first structure (e.g., 312) and electrically connected to the connector, a first battery (e.g., 343a) and at least one first device (e.g., 510) electrically connected to the first charging/discharging circuit (e.g., 530), a power line (e.g., 431, Vbus line), a second structure (e.g., 313) provided on a second side, a second charging/discharging circuit (e.g., 540) disposed in the second structure (e.g., 313) and electrically connected with the connector through the power line (e.g., 431, Vbus line), a second battery (e.g., 343b) and at least one second device (e.g., 520) electrically connected to the second charging/discharging circuit (e.g., 540), and a processor (e.g., 401) configured to control the first charging/discharging circuit (e.g., 530) to provide first power from the first battery (e.g., 343a) through the power line (e.g., 431, Vbus line) based on a first capacity of the first battery (e.g., 343a) and a second capacity of the second battery (e.g., 343b) meeting a first condition, and control the second charging/discharging circuit (e.g., 540) to provide second power from the second battery (e.g., 343b) through the power line (e.g., 431, Vbus line) based on the first capacity of the first battery (e.g., 343a) and the second capacity of the second battery (e.g., 343b) meeting a second condition different from the first condition.

According to various embodiments, there may be provided the electronic device (e.g., 400 of FIG. 4), wherein the processor (e.g., 401) is configured to control the first charging/discharging circuit (e.g., 530) to charge the first battery (e.g., 343a) based on the external power received from the connector, and control the second charging/discharging circuit (e.g., 540) to charge the second battery (e.g., 343b) based on the external power received from the connector through the power line (e.g., 431, Vbus line).

According to various embodiments, there may be provided the electronic device (e.g., 400 of FIG. 4), wherein the processor (e.g., 401) is configured to set an operation mode of the electronic device (e.g., 400 of FIG. 4), and perform at least one of a first operation to control the first charging/discharging circuit (e.g., 530) to transfer current from the first battery (e.g., 343a) to the at least one first device (e.g., 510) and a second operation to control the second charging/discharging circuit (e.g., 540) to transfer current from the second battery (e.g., 343b) to the at least one second device (e.g., 520), based on the set operation mode of the electronic device (e.g., 400 of FIG. 4).

According to various embodiments, there may be provided the electronic device (e.g., 400 of FIG. 4), wherein the operation mode includes a first operation mode and a second operation mode, and wherein the processor (e.g., 401) is configured to, if the operation mode is set to the first operation mode, control the first charging/discharging circuit (e.g., 530) to transfer a first current from the first battery (e.g., 343a) to the at least one first device (e.g., 510) and control the second charging/discharging circuit (e.g., 540) to transfer a second current from the second battery (e.g., 343b) to the at least one second device (e.g., 520), a difference in amount between the first current and the second current being a first difference, and if the operation mode is set to the second operation mode, control the first charging/discharging circuit (e.g., 530) to transfer a third current from the first battery (e.g., 343a) to the at least one first device (e.g., 510) and control the second charging/discharging circuit (e.g., 540) to transfer a fourth current from the second battery (e.g., 343b) to the at least one second device (e.g., 520), a difference in amount between the third current and the fourth current being a second difference larger than the first difference.

According to various embodiments, there may be provided the electronic device (e.g., 400 of FIG. 4), wherein the first charging/discharging circuit (e.g., 530) and the second charging/discharging circuit (e.g., 540) are electrically connected with each other through the power line (e.g., 431, Vbus line).

According to various embodiments, there may be provided the electronic device (e.g., 400 of FIG. 4) further comprising a first capacity identification circuit electrically connected to the first battery (e.g., 343a) and a second capacity identification circuit electrically connected to the second battery (e.g., 343b), wherein the processor (e.g., 401) is configured to identify the first capacity of the first battery (e.g., 343a) using the first capacity identification circuit, identify the second capacity of the second battery (e.g., 343b) using the second capacity identification circuit, control the first charging/discharging circuit (e.g., 530) to transfer a first current from the first battery (e.g., 343*a*) through the power line (e.g., 431, Vbus line) to the second charging/discharging circuit (e.g., 540) based on a difference between the first capacity and the second capacity meeting the first condition, and control the second charging/discharging circuit (e.g., 540) to transfer a second current from the second battery (e.g., 343*b*) through the power line (e.g., 431, Vbus line) to the first charging/discharging circuit (e.g., 530) based on the difference between the first capacity and the second capacity meeting the second condition.

According to various embodiments, there may be provided the electronic device (e.g., 400 of FIG. 4), wherein the processor (e.g., 401) is configured to, based on identifying that the first capacity is larger than the second capacity as the first condition, control the first charging/discharging circuit (e.g., 530) to transfer the first current through the power line (e.g., 431, Vbus line) to the second charging/discharging circuit (e.g., 540), an amount of the first current corresponding to the difference between the first capacity and the second capacity, and control the second charging/discharging circuit (e.g., 540) to charge the second battery (e.g., 343*b*) based on the received first current, based on identifying that the first capacity is smaller than the second capacity as the second condition, control the second charging/discharging circuit (e.g., 540) to transfer the second current through the power line (e.g., 431, Vbus line) to the first charging/discharging circuit (e.g., 530), an amount of the second current corresponding to the difference between the second capacity and the first capacity, and control the first charging/discharging circuit (e.g., 530) to charge the first battery (e.g., 343*a*) based on the received second current.

According to various embodiments, there may be provided the electronic device (e.g., 400 of FIG. 4), wherein the processor (e.g., 401) is configured to, based on identifying that the first capacity is larger than the second capacity as the first condition, control the first charging/discharging circuit (e.g., 530) so that as the difference between the first capacity and the second capacity increases, the amount of the first current increases, based on identifying that the first capacity is larger than the second capacity as the first condition, control the second charging/discharging circuit (e.g., 540) so that as the difference between the first capacity and the second capacity increases, the amount of the second current increases.

According to various embodiments, there may be provided the electronic device (e.g., 400 of FIG. 4), wherein the processor (e.g., 401) is configured to identify an occurrence of a designated first event, the occurrence of the designated first event including when the difference between the first capacity and the second capacity is a first threshold or more, and control the first charging/discharging circuit (e.g., 530) to transfer the first current or control the second charging/discharging circuit (e.g., 540) to transfer the second current based on identifying the occurrence of the designated first event.

According to various embodiments, there may be provided the electronic device (e.g., 400 of FIG. 4), wherein the processor (e.g., 401) is configured to identify an occurrence of a designated second event, the occurrence of the designated second event including when the difference between the first capacity and the second capacity is less than a second threshold, and stop controlling the first charging/discharging circuit (e.g., 530) to transfer the first current or controlling the second charging/discharging circuit (e.g., 540) to transfer the second current based on identifying the occurrence of the designated second event.

According to various embodiments, there may be provided the electronic device (e.g., 400 of FIG. 4), wherein the processor (e.g., 401) is configured to identify a first time when the first operation is performed and a second time when the second operation is performed, control the first charging/discharging circuit (e.g., 530) to transfer the first power based on a difference between the first time and the second time meeting a first condition, and control the second charging/discharging circuit (e.g., 540) to transfer the second power based on the difference between the first time and the second time meeting a second condition.

According to various embodiments, there may be provided an electronic device (e.g., 400 of FIG. 4), comprising a first structure (e.g., 312) provided on a first side, a first connector disposed in the first structure (e.g., 312) to receive first external power, a first battery (e.g., 343*a*) and at least one first device (e.g., 510) electrically connected to the first connector, a power line (e.g., 432, Vsys line), a second structure (e.g., 313) provided on a second side, a second connector disposed in the second structure (e.g., 313) to receive second external power, a second battery (e.g., 343*b*) and at least one second device (e.g., 520) electrically connected with the second connector, the first battery (e.g., 343*a*) electrically connected with the second battery (e.g., 343*b*) through the power line (e.g., 432, Vsys line), and a processor (e.g., 401) configured to control an amount of a first current transferred from the first battery (e.g., 343*a*) through the power line (e.g., 432, Vsys line) and an amount of a second current transferred from the second battery (e.g., 343*b*) through the power line (e.g., 432, Vsys line), based on a difference between a first capacity of the first battery (e.g., 343*a*) and a second capacity of the second battery (e.g., 343*b*).

According to various embodiments, there may be provided the electronic device (e.g., 400 of FIG. 4), wherein the first current is provided through the power line (e.g., 432, Vsys line) to the at least one second device (e.g., 520), and the second current is provided through the power line (e.g., 432, Vsys line) to the at least one first device (e.g., 510).

According to various embodiments, there may be provided the electronic device (e.g., 400 of FIG. 4), wherein the first connector is electrically connected to a third connector of an external electronic device (e.g., 400 of FIG. 4) implemented to provide the first external power, and the second connector is electrically connected to a fourth connector of the external electronic device (e.g., 400 of FIG. 4) implemented to provide the second external power.

According to various embodiments, there may be provided the electronic device (e.g., 400 of FIG. 4) further comprising a first capacity identification circuit electrically connected to the first battery (e.g., 343*a*) and a second capacity identification circuit electrically connected to the second battery (e.g., 343*b*), wherein the processor (e.g., 401) is configured to identify the first capacity of the first battery (e.g., 343*a*) using the first capacity identification circuit, identify the second capacity of the second battery (e.g., 343*b*) using the second capacity identification circuit, and transmit first information about the first capacity and second information about the second capacity to the external electronic device (e.g., 400 of FIG. 4), wherein the first external power and the second external power are received from the external electronic device (e.g., 400 of FIG. 4) based on transmission of the first information and the second information.

According to various embodiments, there may be provided the electronic device (e.g., 400 of FIG. 4), wherein the processor (e.g., 401) is configured to set an operation mode of the electronic device (e.g., 400 of FIG. 4), and perform at least one of a first operation to control the first charging/discharging circuit (e.g., 530) to transfer current from the first battery (e.g., 343*a*) to the at least one first device (e.g., 510) and a second operation to control the second charging/discharging circuit (e.g., 540) to transfer current from the second battery (e.g., 343*b*) to the at least one second device, based on the set operation mode of the electronic device (e.g., 400 of FIG. 4).

According to various embodiments, there may be provided the electronic device (e.g., 400 of FIG. 4) further comprising a memory storing information about ratios of the amount of the first current to the amount of the second current for each of a plurality of capacity ranges, wherein the processor (e.g., 401) is configured to identify a capacity range including a difference between the first capacity and the second capacity and identify a first ratio of the amount of the first current corresponding to the identified range to the amount of the second current among the ratios of the amount of the first current to the amount of the second current.

According to various embodiments, there may be provided the electronic device (e.g., 400 of FIG. 4) further comprising a first current control circuit (e.g., 580) disposed in the first structure (e.g., 312) and connected to the first battery (e.g., 343*a*) and the power line (e.g., 432, Vsys line) and a second current control circuit (e.g., 590) disposed in the second structure (e.g., 313) and connected to the second battery (e.g., 343*b*) and the power line (e.g., 432, Vsys line), wherein the processor (e.g., 401) controls the first current control circuit (e.g., 580) to control the amount of the first current transferred from the first battery (e.g., 343*a*) through the power line (e.g., 432, Vsys line) and control the second current control circuit (e.g., 590) to control the amount of the second current transferred from the second battery (e.g., 343*b*) through the power line (e.g., 432, Vsys line), based on the identified first ratio.

According to various embodiments, there may be provided the electronic device (e.g., 400 of FIG. 4), wherein the first ratio is set so that as the difference between the first capacity and the second capacity increases, the amount of the first current is larger than the amount of the second current.

According to various embodiments, there may be provided the electronic device (e.g., 400 of FIG. 4), wherein the processor (e.g., 401) is configured to identify an occurrence of a designated event, the occurrence of the designated event including when the difference between the first capacity and the second capacity is a threshold or more, control the first current control circuit (e.g., 580) to control the amount of the first current output from the first battery (e.g., 343*a*) through the power line (e.g., 432, Vsys line) and control the second current control circuit (e.g., 590) to control the amount of the second current output from the second battery (e.g., 343*b*) through the power line (e.g., 432, Vsys line) based on identifying the occurrence of the designated event.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device shaped as augmented reality (AR) glasses, comprising:
   a first lens frame provided on a first side;
   a connector disposed in the first lens frame and configured to receive external power;
   a power line;
   a first charging/discharging circuit disposed in the first lens frame and electrically connected to the connector through the power line, a first battery, and at least one first device electrically connected to the first charging/discharging circuit, wherein the first charging/discharging circuit includes a first on-the-go (QTG) circuit having an QTG power supply function for providing a first current to a second charging/discharging circuit;
   a second lens frame provided on a second side;
   the second charging/discharging circuit disposed in the second lens frame and electrically connected with the connector through the power line, a second battery, and at least one second device electrically connected to the second charging/discharging circuit, wherein the second charging/discharging circuit includes a second OTG circuit having an OTG power supply function for providing a second current to the first charging/discharging circuit, and wherein the first charging/discharging circuit and the second charging/discharging circuit are electrically connected to each other through the power line;
   a first capacity identification circuit electrically connected to the first battery;
   a second capacity identification circuit electrically connected to the second battery; and
   a processor configured to:
      in case that the electronic device is charging:
         control the first charging/discharging circuit to charge the first battery based on the external power received through the connector, and
         control the second charging/discharging circuit to charge the second battery through the power line, based on the external power received through the connector, and
      in case that the electronic device is discharging:
         identify a first remaining capacity of the first battery using the first capacity identification circuit,
         identify a second remaining capacity of the second battery using the second capacity identification circuit,
         control the first charging/discharging circuit to provide first power from the first battery, through the power line, based on the first remaining capacity of the first battery and the second remaining capacity of the second battery satisfying a first condition,
         control the second charging/discharging circuit to provide second power from the second battery, through the power line, based on the first remaining capacity of the first battery and the second remaining capacity of the second battery satisfying a second condition that is different from the first condition,
         control the first charging/discharging circuit to transfer the first current from the first battery via the first OTG circuit, through the power line, to the second charging/discharging circuit, based on a difference between the first remaining capacity and the second remaining capacity satisfying the first condition, and control the second charging/discharging circuit to transfer the second current from the second battery via the second OTG circuit, through the power line, to the first charging/discharging circuit, based on the difference between the first remaining capacity and the second remaining capacity satisfying the second condition.

2. The electronic device of claim 1, wherein the processor is further configured to:
set an operation mode of the electronic device, and
perform at least one of a first operation to control the first charging/discharging circuit to transfer current from the first battery to the at least one first device or a second operation to control the second charging/discharging circuit to transfer current from the second battery to the at least one second device, based on the set operation mode of the electronic device.

3. The electronic device of claim 2, wherein the operation mode includes a first operation mode and a second operation mode, and
wherein the processor is further configured to:
when the operation mode is set to the first operation mode, control the first charging/discharging circuit to transfer the first current from the first battery to the at least one first device and control the second charging/discharging circuit to transfer the second current from the second battery to the at least one second device, wherein a difference between the first current and the second current is a first difference, and
when the operation mode is set to the second operation mode, control the first charging/discharging circuit to transfer a third current from the first battery to the at least one first device and control the second charging/discharging circuit to transfer a fourth current from the second battery to the at least one second device, wherein a difference between the third current and the fourth current is a second difference, which is larger than the first difference.

4. The electronic device of claim 1, wherein the processor is further configured to:
based on identifying that the first remaining capacity is larger than the second remaining capacity as the first condition:
control the first charging/discharging circuit to transfer the first current, through the power line, to the second charging/discharging circuit, wherein the first current corresponds to the difference between the first remaining capacity and the second remaining capacity, and control the second charging/discharging circuit to charge the second battery based on the received first current, and
based on identifying that the first remaining capacity is smaller than the second remaining capacity as the second condition:
control the second charging/discharging circuit to transfer the second current, through the power line, to the first charging/discharging circuit, wherein the second current corresponds to the difference between the second remaining capacity and the first remaining capacity, and
control the first charging/discharging circuit to charge the first battery based on the received second current.

5. The electronic device of claim 4, wherein the processor is further configured to:
based on identifying that the first remaining capacity is larger than the second remaining capacity as the first condition, control the first charging/discharging circuit to increase the first current as the difference between the first remaining capacity and the second remaining capacity increases, or
based on identifying that the first remaining capacity is larger than the second remaining capacity as the first condition, control the second charging/discharging circuit to increase the second current as the difference between the first remaining capacity and the second remaining capacity increases.

6. The electronic device of claim 1, wherein the processor is further configured to:
identify an occurrence of a designated first event, the occurrence of the designated first event including when the difference between the first remaining capacity and the second remaining capacity is greater than or equal to a first threshold, and
control the first charging/discharging circuit to transfer the first current or control the second charging/discharging circuit to transfer the second current based on identifying the occurrence of the designated first event.

7. The electronic device of claim 6, wherein the processor is further configured to:
identify an occurrence of a designated second event, the occurrence of the designated second event including when the difference between the first remaining capacity and the second remaining capacity is less than a second threshold; and
stop the first charging/discharging circuit from transferring the first current or stop the second charging/discharging circuit from transferring the second current based on identifying the occurrence of the designated second event.

* * * * *